US008687938B2

(12) United States Patent
Kodama et al.

(10) Patent No.: US 8,687,938 B2
(45) Date of Patent: Apr. 1, 2014

(54) VIDEO RECORDING SYSTEM, VIDEO RECORDING APPARATUS, AND VIDEO RECORDING METHOD

(75) Inventors: Satomi Kodama, Hiroshima (JP);
Naohisa Motomura, Hiroshima (JP);
Shinji Takeyama, Hiroshima (JP)

(73) Assignee: Panasonic Corporation, Osaka (JP)

( * ) Notice: Subject to any disclaimer, the term of this patent is extended or adjusted under 35 U.S.C. 154(b) by 1029 days.

(21) Appl. No.: 12/414,045

(22) Filed: Mar. 30, 2009

(65) Prior Publication Data

US 2009/0245758 A1    Oct. 1, 2009

Related U.S. Application Data

(60) Provisional application No. 61/040,785, filed on Mar. 31, 2008.

(51) Int. Cl.
*H04N 5/94* (2006.01)
*H04N 9/88* (2006.01)
*H04N 5/76* (2006.01)

(52) U.S. Cl.
USPC ............. 386/83; 386/263; 386/265; 386/291; 386/292; 386/298

(58) Field of Classification Search
USPC .................................. 386/83, 263, 265, 298
See application file for complete search history.

(56) References Cited

U.S. PATENT DOCUMENTS

| 8,160,424 | B2* | 4/2012 | Cha et al. ................... 386/263 |
| 2002/0066113 | A1 | 5/2002 | Utsunomiya et al. |
| 2003/0004727 | A1* | 1/2003 | Keiller ........................ 704/275 |
| 2005/0102698 | A1 | 5/2005 | Bumgardner et al. |
| 2006/0034587 | A1 | 2/2006 | Yokota et al. |
| 2006/0093325 | A1 | 5/2006 | Imai et al. |
| 2006/0204207 | A1* | 9/2006 | Gilge ............................ 386/46 |
| 2006/0239642 | A1* | 10/2006 | Yuasa et al. ................... 386/83 |
| 2006/0280444 | A1 | 12/2006 | Kawakami et al. |
| 2007/0011357 | A1 | 1/2007 | Watanabe et al. |

(Continued)

FOREIGN PATENT DOCUMENTS

| EP | 1763174 | 3/2007 |
| JP | 2001-318881 | 11/2001 |

(Continued)

OTHER PUBLICATIONS

OCAP 1.0 Profile OC-SP-OCAP 1.0-I16-050803, pp. iii, v, 1.

(Continued)

*Primary Examiner* — Carl Colin
*Assistant Examiner* — John Elmore
(74) *Attorney, Agent, or Firm* — Greenblum & Bernstein, P.L.C.

(57) ABSTRACT

A content can be recorded for certain in a video recording system including a video recording apparatus and a video recording and transmitting apparatus. The video recording apparatus includes: a recording control unit that starts recording the content when a period of time indicated by scheduled recording information starts; and a message transmitting unit that transmits recording-state information to the video recording and transmitting apparatus at regular intervals. The video recording and transmitting apparatus includes: a recording-state monitoring unit that determines whether or not the continued reception of a signal has been suspended during the period of time; and a recording control unit that starts recording the content when the recording-state monitoring unit determines that the continued reception of the signal has been suspended.

19 Claims, 55 Drawing Sheets

105 Terminal-to-terminal network communication system

(56) References Cited

U.S. PATENT DOCUMENTS

| | | | |
|---|---|---|---|
| 2007/0022208 A1 | 1/2007 | Hashimoto et al. | |
| 2007/0058924 A1 | 3/2007 | Yeh | |
| 2007/0140651 A1 | 6/2007 | Hashimoto et al. | |
| 2007/0154172 A1 | 7/2007 | Watanabe | |
| 2007/0171198 A1 | 7/2007 | Yokozawa | |
| 2008/0104202 A1* | 5/2008 | Barrett et al. | 709/219 |
| 2009/0094661 A1* | 4/2009 | Boger | 725/134 |
| 2009/0226149 A1 | 9/2009 | Shibata et al. | |

FOREIGN PATENT DOCUMENTS

| | | |
|---|---|---|
| JP | 2002-298501 | 10/2002 |
| JP | 2005-311479 | 11/2005 |
| JP | 2008-035394 | 2/2006 |
| JP | 2006-155860 | 6/2006 |
| JP | 2006-279225 | 10/2006 |
| JP | 2007-194974 | 8/2007 |
| JP | 2007-335979 | 12/2007 |

OTHER PUBLICATIONS

OCAP Digital Video Recorder (DVR) OC-SP-OCAP-DVR-I03-070509, pp. ii-iii, 1-2, 9-16.
OCAP Home Networking Extension OC-SP-OCAP-HNEXT1.0-I01-050519, pp. ii-iii, 1-3.
English language Abstract of JP 2002-298501, Oct. 11, 2002.
English language Abstract of JP 2007-194974, Aug. 2, 2007.
English language Abstract of JP 2002-29850, Oct. 11, 2002.
English language Abstract of JP 2001-318881, Nov. 16, 2001.
OCAP 1.0 Profile, OC-SP-OCAP 1.0-I16-050803, pp. 163-166.
OCAP Digital Video Recorder (DVR), OC-SP-OCAP-DVR-I03-070509, pp. 14-15.
OCAP Home Networking Extension, OC-SP-OCAP-HNEXT 1.0-I01-050519, pp. 23-72.
Japan Office Action, mailed Aug. 27, 2013, for corresponding Japanese Patent Application No. 2010-519302.

* cited by examiner

105 Terminal-to-terminal network communication system

FIG. 5

| Channel information 1000 | | | |
|---|---|---|---|
| Channel identifier 1001 | Channel name 1002 | Tuning information 1003 | Program number 1004 |
| 1 | Channel 1 | 150MHz, ….. | 101 |
| 2 | Channel 2 | 156MHz, ….. | 102 |
| 3 | TV 3 | 216MHz, ….. | 103 |
| 4 | TV Japan | 222MHz, ….. | 104 |

| Recording information management table | |
|---|---|
| 000 | Scheduled recording information d11 |
| | Recorded content information d111 |
| 001 | Scheduled recording information d12 |
| | Recorded content information d121 |
| | Recorded content information d122 |
| | Recorded content information d123 |
| 002 | Scheduled recording information d13 |
| | Recorded content information d131 |
| 003 | Scheduled recording information d14 |

1201 Record identifiers

FIG. 8

| Scheduled recording information d12 | |
|---|---|
| Recording start time | 2007/4/1  15:00 |
| Recording end time | 2007/4/1  16:00 |
| Channel identifier | 1 |
| Program number | 101 |
| Recording state | INCOMPLETE |

| Recorded content information d121 | |
|---|---|
| Recording destination | volume A |
| Recording size | 300 Mbyte |
| Recording time | 00:25 |
| Recording bit rate | high |
| Media identifier | TS_121 |

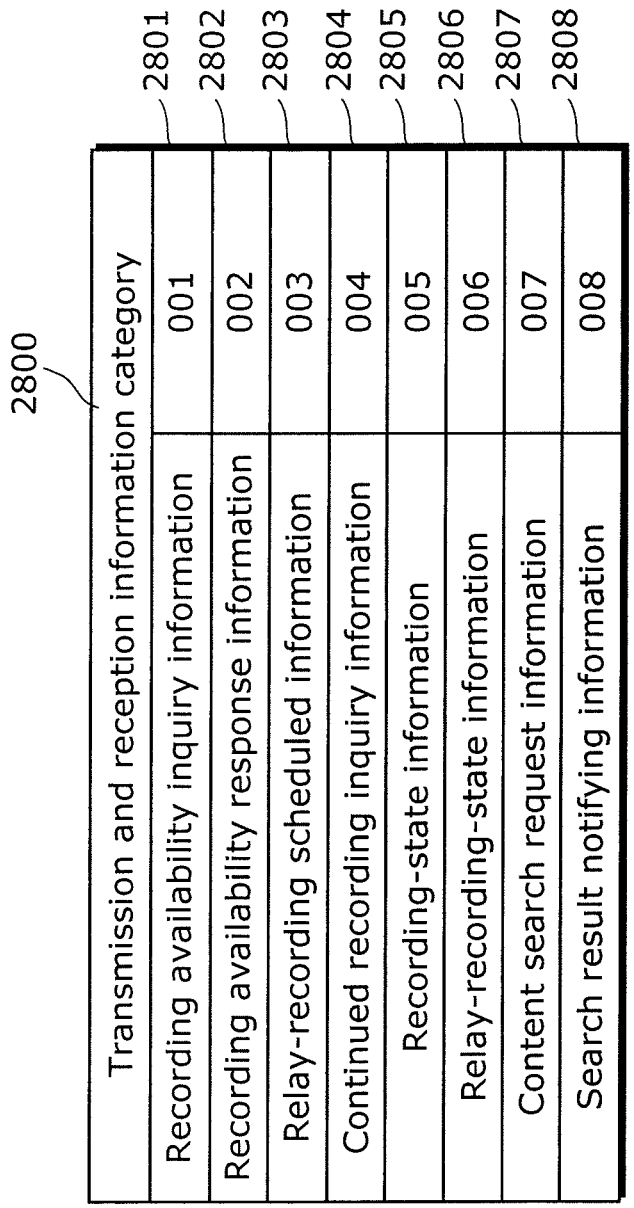

| Transmission and reception information category | |
|---|---|
| Recording availability inquiry information | 001 |
| Recording availability response information | 002 |
| Relay-recording scheduled information | 003 |
| Continued recording inquiry information | 004 |
| Recording-state information | 005 |
| Relay-recording-state information | 006 |
| Content search request information | 007 |
| Search result notifying information | 008 |

FIG. 19

Recording availability inquiry information 2801

| Information ID | 001 | 2901 |
|---|---|---|
| Request ID | 001 | 2902 |
| Transmission terminal ID | 002 | 2903 |
| Recording start time | 2007/4/2  15:00 | 2904 |
| Recording end time | 2007/4/2  16:00 | 2905 |
| Channel identifier | 1 | 2906 |

FIG. 20

Recording availability response information 2802

| Information ID | 002 | 3000 |
|---|---|---|
| Request ID | 001 | 3001 |
| Transmission terminal ID | 004 | 3002 |
| Recording availability | Possible | 3003 |

FIG. 21

Relay-recording scheduled information 2803

| | | |
|---|---|---|
| Information ID | 003 | 3100 |
| Request ID | 010 | 3102 |
| Transmission terminal ID | 002 | 3103 |
| Recording start time | 2007/4/2  15:00 | 3104 |
| Recording end time | 2007/4/2  16:00 | 3105 |
| Channel identifier | 1 | 3106 |
| Record identifier | 002 | 3107 |

FIG. 22

Continued recording inquiry information 2804

| Information ID | 004 |
|---|---|
| Request ID | 101 |
| Transmission terminal ID | 004 |
| Record identifier | 002 |

Recording-state information 2805

| Information ID | 005 |
|---|---|
| Request ID | 101 |
| Transmission terminal ID | 002 |
| Recording state | IN_PROGRESS |

Relay-recording-state information 2806

| Information ID | 006 |
|---|---|
| Request ID | 010 |
| Transmission terminal ID | 004 |
| Relay-requesting-terminal record identifier | 002 |
| Relay-destination-terminal record identifier | 001 |
| Recording state | IN_PROGRESS |

Content search request information 2807

| Information ID | 007 |
|---|---|
| Request ID | 100 |
| Transmission terminal ID | 002 |
| Record identifier | 002 |
| Inquired terminal ID | 004 |

Search result notifying information 2808

| Information ID | 008 | — 5000 |
|---|---|---|
| Request ID | 100 | — 5001 |
| Transmission terminal ID | 004 | — 5002 |
| Content presence-or-absence information | Presence | — 5003 |
| Record identifier | 001 | — 5004 |
| Recording start time | 2007/4/2 15:30 | — 5005 |
| Recording end time | 2007/4/2 16:00 | — 5006 |
| Recording time | 00:30 | — 5007 |

FIG. 28

| Scheduled recording information d21 | |
|---|---|
| Recording start time | 2007/4/2 15:30 |
| Recording end time | 2007/4/2 16:00 |
| Channel identifier | 1 |
| Program number | 101 |
| Recording state | COMPLETE |

| Recorded content information d211 | |
|---|---|
| Recording destination | volumeB |
| Recording size | 400Mbyte |
| Recording time | 00:30 |
| Recording bit rate | high |
| Media identifier | TS_211 |
| Division recording information dd21 | |

| Scheduled recording information d13 | |
|---|---|
| Recording start time | 2007/4/2 15:00 |
| Recording end time | 2007/4/2 16:00 |
| Channel identifier | 1 |
| Program number | 101 |
| Recording state | INCOMPLETE |
| Relay-recording requested terminal ID | 004 |

FIG. 31

| Recorded content information d131 ||
|---|---|
| Recording destination | volume A |
| Recording size | 300 Mbyte |
| Recording time | 00:25 |
| Recording bit rate | high |
| Media identifier | TS_131 |
| Division recording information dd13 ||

| Division recording information dd13 |||
|---|---|---|
| Presence/absence of relay recording | Presence | — |
| Presence/absence of anterior division | Absence | — |
| Presence/absence of posterior division | Presence | Division-recording identification information d13A |

FIG. 33

| Division-recording identification information d13A ||
|---|---|
| Terminal ID | 004 |
| Record identifier | — |

FIG. 34

| Relay recording service information sd13 | | |
|---|---|---|
| Play list file name | 002.m3u | |
| Track number | 1 | 2 |
| Terminal ID | 002 | 004 |
| Record identifier | 002 | 001 |
| Program number | 101 | 101 |
| Recording start time | 2007/4/2 15:00 | 2007/4/2 15:30 |
| Recording end time | 2007/4/2 16:00 | 2007/4/2 16:00 |
| Recording time | 00:25 | 00:30 |

4801, 4802, 4803, 4804, 4805, 4806, 4807, 4808, 4809, 4810

5100 Relay recording play list

| Relay-recording scheduled information | |
|---|---|
| Record identifier | 003 |
| Recording start time | 2007/4/2  15:00 |
| Recording end time | 2007/4/2  16:00 |
| Channel identifier | 1 |
| Requesting terminal ID | 002 |
| Relay-requesting-terminal record identifier | 002 |
| Request ID | 010 |

| Division recording information dd21 | | |
|---|---|---|
| Presence/absence of relay recording | Presence | — |
| Presence/absence of anterior division | Presence | Division-recording identification information d21B |
| Presence/absence of posterior division | Absence | — |

| Division-recording identification information d21B | |
|---|---|
| Terminal ID | 002 |
| Record identifier | 002 |

2601
2602

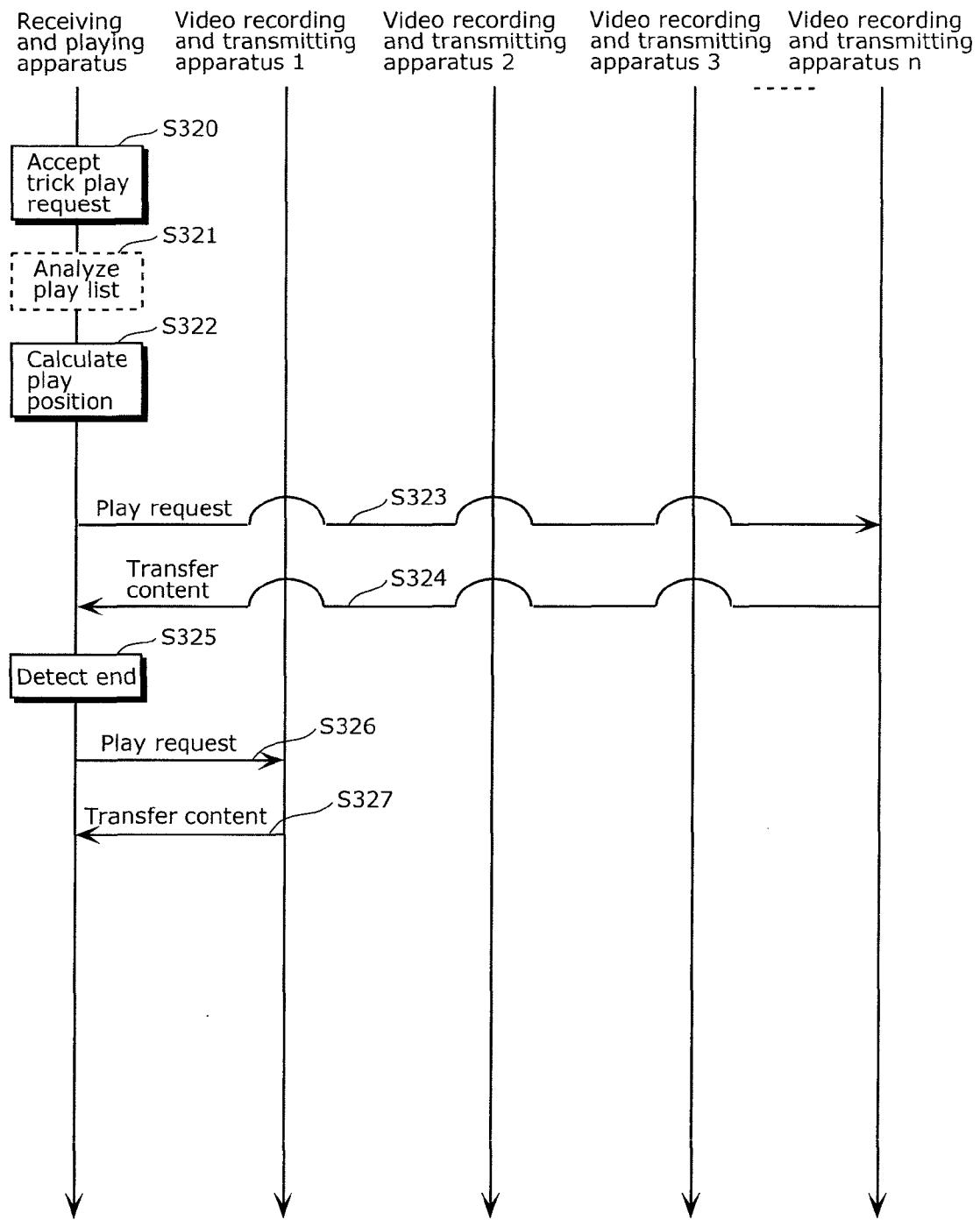

VIDEO RECORDING SYSTEM, VIDEO RECORDING APPARATUS, AND VIDEO RECORDING METHOD

CROSS REFERENCE TO RELATED APPLICATION

This application claims the benefit of U.S. Provisional Application No. 61/040,785 filed on Mar. 31, 2008.

BACKGROUND OF THE INVENTION (1) Field of the Invention

The present invention relates to a video recording apparatus that mainly stores multimedia contents, and in particular to a technique of a video recording system that allows video recording apparatuses that are connected via a network to share a function.

(2) Description of the Related Art

Broadcast waves can be transmitted from broadcast stations by superimposing data and application programs (hereinafter referred to simply as applications) as well as video and audio thereon. The data including a program guide and weather forecast may be displayed using a resident application installed in every broadcast receiving terminal by the terminal manufacturer. On the other hand, as for the superimposition of applications on broadcast waves and transmission of the resulting broadcast waves, Europe has laid down the Digital Video Broadcasting-Multimedia Home Platform (DVB-MHP) specification, and it has become possible to use applications created by broadcasting companies as operational user interfaces of broadcast receiving terminals. Furthermore, the United States has laid down the OpenCable Application Platform (OCAP) specification (OCAP Specification OC-SP-OCAP 1.0-I16-050803 cited as Non Patent Citation 1 herein) based on the DVB-MHP specification. The OCAP Specification provides similar functions in the cable broadcast environment, and the operation thereof has commenced. In these specifications, the applications superimposed on broadcast waves are written in the Java™ language. The broadcast receiving terminals are provided with various Application Program Interfaces (APIs) for turning, graphics display, and playing video. The applications superimposed on the broadcast waves call these APIs to control such functions and display contents to users, for example.

Furthermore, North America has laid down the OCAP Digital Video Recording (DVR) Extension specification (OCAP-DVR Specification OC-SP-OCAP-DVR-I03-070509 cited as Non Patent Citation 2 herein) which is the OCAP specification added with recording and playing functions. The OCAP DVR terminals can record a broadcast content on a recording medium that supports high random access, such as a hard disk. Furthermore, when playing a broadcast content, the OCAP DVR terminals implement trick play functions, such as fast forward, reverse, pause, slow, and skip, which can play the broadcast content at any speed, and a function which can play the broadcast content from any position. Here, the Java applications downloaded from broadcast waves to each of the OCAP DVR terminals can be used to record contents and implement trick play of the contents. In other words, the APIs are provided on the OCAP DVR terminals for video recording and trick play. The Java applications call the APIs to control each function, and show the user the played video contents. Furthermore, a combination of video, audio, and an application program to be executed in synchronization with the video and the audio is defined as a service in the OCAP DVR terminals. When the broadcast receiving terminals start such service, the application programs are executed in synchronization with video and audio. Even in the case of an interruption in the video recording process due to resource coordination and other reasons, the OCAP DVR terminals have functions capable of resuming the recording process as soon as possible and of playing the video as a content. Thereby, the user can record and view video of a television program that is desired to be recorded as long as possible. Furthermore, the OCAP DVR terminals have a function of temporarily reserving devices when recording is scheduled in the terminals.

With advances in widespread use of video recording and playing terminals and in network environments within households, such as the Internet, there is an increasing demand to use the video contents seamlessly in the households. More specifically, for example, assume a case where a video recording and playing apparatus having a video recording function is placed in a living room, and records a video content. Before going to bed, the user can view the video content using a home network by a video playing apparatus that is placed in a bedroom and does not have the video recording function, such as a television set. To be more specific, such application is specified in the Digital Living Network Alliance (DLNA) Guidelines. The DLNA Guidelines use video contents in a terminal connected via a network and on the terminal, using the UPnP (Universal Plug and Play) specification.

To achieve such a home AV network environment, North America is currently in the process of laying down the OCAP Home Networking (HN) Extension specification (OCAP Home Network Extension specification OC-SP-OCAP-HNEXT1.0-I01-050519 cited as Non Patent Citation 3 herein). This specification defines the APIs dedicated for controlling recording and playing operations and capable of calling the Java applications. As described above, use of the functions of the home AV network environment enables some terminals connected to the network to perform processes with a terminal, such as remote scheduled recording and streaming play (the processes in which a terminal transmits a recorded content to other terminals, and then the other terminals receive and play the recorded content). In such an environment, there is no need to place the recording and playing terminal in each room. Instead, a recording and playing terminal having higher functions has only to be placed in one room such as a living room, and inexpensive playing-only terminals can be placed in rooms such as bedrooms and children's rooms.

With regard to the OCAP DVR terminals, recording and playing terminals have been introduced which implement a function of resuming recording from the timing when the recording can be resumed. Even in the case where the recording is interrupted because of the lack of resources or the power is shut down, the recording can be resumed from the timing when the resources can be reserved again by themselves or when the power is turned on. However, whether or not recording is resumed is not certain because there is no guarantee that the resources may be reserved again or the power may be turned on, and how long the recording is interrupted cannot be predicted even when the resumption of recording is possible.

Patent Citation 1 describes that another recording and playing terminal present on the network takes over the recording when the recording is interrupted due to the lack of resources (Japanese Unexamined Patent Application Publication No. 2007-194974). Assume a case where a recorded content is divided into sections and the sections are respectively stored by recording and playing terminals. When the divided content is viewed by a playing terminal on the home network, the user needs to reselect a corresponding one of the recording and playing terminals.

Furthermore, Patent Citations 2 and 3 describe a method in which recording that has been performed by a recording and playing terminal is taken over by another recording and playing terminal due to the lack in capacity of a storage region included in the recording and playing terminal that has originally started the recording. This processing is performed through dividing the content into two sections and recording the sections respectively by the two recording and playing terminals, and the divided sections are played as if they were one single content (Japanese Unexamined Patent Application Publication No. 2002-298501 referred to as Patent Citation 2; and Japanese Unexamined Patent Application Publication No. 2001-318881 referred to as Patent Citation 3). Assume a case where a recording and playing terminal has been recording a content in response to the request. When the recording is interrupted due to the lack in capacity of the storage region, the recording and playing terminal requests another recording and playing terminal on the network to take over the recording. However, the aforementioned method cannot be applied when the power of the other recording and playing terminal that has first received the request is shut down and the recording cannot be taken over.

SUMMARY OF THE INVENTION

Thus, the present invention has been conceived in order to solve the aforementioned problem and has an object of providing a video recording apparatus, a video recording system, and a method for recording video that allow another video recording apparatus to take over the recording even when the power of the video recording apparatus (recording and playing terminal) that is currently recording is shut down in a home network environment.

In order to achieve the aforementioned object, the video recording system according to the present invention is a video recording system for recording a content that has been broadcasted or distributed, the video recording system includes a first video recording apparatus and a second video recording apparatus that are connected to each other via a network, the first video recording apparatus including: a recording registration unit configured to accept scheduled recording information indicating a period of time during which the content is to be recorded; a first recording control unit configured to start recording the content when the period of time indicated by the scheduled recording information starts; a scheduled information transmitting unit configured to transmit relay-recording scheduled information to the second video recording apparatus, the relay-recording scheduled information notifying the second video recording apparatus of the period of time indicated by the scheduled recording information; and a signal transmitting unit configured to continue to transmit a signal to the second video recording apparatus during the period of time indicated by the scheduled recording information, and the second video recording apparatus including: a receiving unit configured to receive the relay-recording scheduled information and the signal that have been transmitted from the first video recording apparatus; a partner-recording-state monitoring unit configured to determine whether or not the receiving unit has suspended the continued reception of the signal during a period of time indicated by the relay-recording scheduled information; and a second recording control unit configured to start recording the content when the partner-recording-state monitoring unit determines that the receiving unit has suspended the continued reception of the signal.

For example, when the power of the first video recording apparatus is shut down, the first video recording apparatus suspends the recording of a content, and suspends transmission of the signal to the second video recording apparatus. According to the present invention, the second video recording apparatus determines whether or not the first video recording apparatus has suspended the transmission of the signal during a period of time when the signal is to be recorded. When determining that the first video recording apparatus has suspended the transmission of the signal, the second video recording apparatus starts recording the content in replacement of the first video recording apparatus. Thus, even when the power of the first video recording apparatus is shut down, the second video recording apparatus can take over the recording of the content. In other words, the second video recording apparatus can perform relay recording, thus enabling recording a content for certain, for example, a content that has been broadcasted from a broadcast station or a content that has been distributed via the Internet.

Furthermore, the first video recording apparatus further includes a first own recording state monitoring unit configured to monitor a recording state of the first video recording apparatus, and the signal transmitting unit is configured to continue to transmit the signal by transmitting, at regular intervals, recording-state information indicating the recording state identified through monitoring of the first own recording state monitoring unit. For example, the partner-recording-state monitoring unit included in the second video recording apparatus is further configured to transmit continued recording inquiry information for inquiring the recording state of the first video recording apparatus to the first video recording apparatus at regular intervals, and the signal transmitting unit included in the first video recording apparatus is configured to transmit the recording-state information each time the signal transmitting unit receives the continued recording inquiry information.

Thereby, since the recording condition of the first video recording apparatus is notified to the second video recording apparatus at regular intervals, the second video recording apparatus can start recording the content according to the state. Furthermore, since a signal continues to be transmitted with the regular transmission of the recording-state information, the configuration of the first video recording apparatus can be simplified without transmitting a particular signal from the first video recording apparatus to the second video recording apparatus.

Furthermore, the partner-recording-state monitoring unit included in the second video recording apparatus is further configured to register a listener with the first video recording apparatus, the listener notifying the second video recording apparatus of the recording state of the first video recording apparatus, and the signal transmitting unit included in the first video recording apparatus is configured to transmit the recording-state information at regular intervals using the listener.

Thereby, the first video recording apparatus in which the listener is registered can independently transmit the recording-state information to the second video recording apparatus at regular intervals without issuing any request.

Furthermore, the video recording system further includes a playing apparatus configured to play the content, the playing apparatus being connected to the first video recording apparatus and the second video recording apparatus via the network, the playing apparatus including: a scheduled recording unit configured to transmit the scheduled recording information to the first video recording apparatus; a network control unit configured, when the content is divided into a first section and a second section so that the first video recording apparatus records the first section and the second video recording apparatus records the second section, to request the first video recording apparatus to transfer the first section and request the second video recording apparatus to transfer the second section to obtain the divided content; and a service managing unit configured to play the divided content.

Thereby, the user can operate the playing apparatus to perform remote scheduled recording on the first video recording apparatus so that the divided content can be appropriately played.

Furthermore, the first video recording apparatus further includes a relay-recording content managing unit configured, when the content is divided into the first section and the second section so that the first video recording apparatus records the first section and the second video recording apparatus records the second section, to generate a list indicating information of the first and second sections of the divided content, and to transmit the list to the playing apparatus.

Thereby, the playing apparatus can easily identify, with reference to the list, video recording apparatuses in which the sections of the content are respectively recorded, and easily obtain the divided content from the identified video recording apparatuses to play the content.

Furthermore, the first video recording apparatus further includes a checking unit configured to transmit video-recording availability inquiry information to the second video recording apparatus, and to check whether or not the second video recording apparatus can record the content, based on a response from the second video recording apparatus to the recording availability inquiry information, the recording availability inquiry information inquiring whether or not the content can be recorded during the period of time indicated by the scheduled recording information, the second video recording apparatus further includes a relay-recording control unit configured to determine whether or not the second recording control unit can record the content during the period of time indicated by the scheduled recording information upon receipt of the recording availability inquiry information, and to transmit recording availability response information to the first video recording apparatus in response to the recording availability inquiry information, the recording availability response information indicating a result of the determination, and the scheduled information transmitting unit included in the first video recording apparatus is configured to transmit the relay-recording scheduled information to the second video recording apparatus when the checking unit determines that the content can be recorded.

Thereby, after checking that the second video recording apparatus is an apparatus that can perform relay recording, the first video recording apparatus transmits the relay-recording scheduled information and schedules the relay recording. Thus, the content can be recorded for certain.

Furthermore, the checking unit included in the first video recording apparatus is configured to check whether or not the content can be recorded at a scheduled recording time when the recording registration unit accepts the scheduled recording information, and at a pre-recording time that is after the scheduled recording time and before start of the period of time indicated by the scheduled recording information, the scheduled information transmitting unit is configured to transmit the relay-recording scheduled information in the case where the checking unit determines that the content can be recorded at the scheduled recording time, the second video recording apparatus further includes a recording device setting unit configured, when the receiving unit receives the relay-recording scheduled information, to temporarily reserve resources necessary for use in recording the content by setting a priority to the resources, and the recording device setting unit is configured to formally reserve the resources by giving a higher priority to the resources that have been temporarily reserved, when the checking unit included in the first video recording apparatus determines at the pre-recording time that the content can be recorded.

For example, when recording is scheduled and it is obvious that the second video recording apparatus can perform the relay recording during a period of time indicated by the scheduled recording information, there are cases where the relay recording becomes impossible immediately before starting the recording. However, since the present invention makes it possible to check whether or not relay recording is possible at the scheduled recording time and at the pre-recording time, the relay recording can be appropriately performed. Furthermore, when it is checked that the relay recording is possible at the scheduled recording time, in other words, at the time of temporarily reserving resources to the second video recording apparatus and checking immediately before starting the recording (x minutes before) by the first video recording apparatus that the relay recording is possible, formal scheduling of the relay recording, that is, formal reservation of the resources to the second video recording apparatus is performed. Thus, after the temporary scheduling, a lower priority is given to the resources. Thus, when the resources are necessary for another important processing, the resources can be used for the processing. Then, immediately after starting the recording, the resources are reserved for certain, preventing the resources from being used for another processing. As a result, the content can be recorded for certain.

Furthermore, the signal transmitting unit included in the first video recording apparatus is configured to transmit the recording-state information indicating that the recording is completed to the second recording apparatus in the case where the first own recording state monitoring unit identifies a state in which the recording is completed when the period of time indicated by the scheduled recording information ends, and the recording device setting unit included in the second video recording apparatus is configured to release the resources that have been temporarily reserved, when the second video recording apparatus receives the recording-state information indicating that the recording is completed.

Thereby, when the recording according to the scheduled recording information is completed without the power of the first video recording apparatus being shut down, the resources temporarily reserved to the second video recording apparatus are released. Thus, after the recording is completed, the resources can be freely used for purposes other than the recording according to the scheduled recording information.

Furthermore, the video recording system further includes a third video recording apparatus connected to the network, wherein the scheduled information transmitting unit is configured to transmit the relay-recording scheduled information to the third video recording apparatus when the checking unit determines at the pre-recording time that the content cannot be recorded.

Thereby, when it is obvious immediately before starting the recording by the first video recording apparatus that the second video recording apparatus cannot perform relay recording during a period of time indicated by the scheduled recording information, the apparatus that performs relay recording can be changed from the second video recording apparatus to the third video recording apparatus. Thus, the content can be recorded for certain.

Furthermore, the video recording system further includes a third video recording apparatus connected to the network, wherein the checking unit included in the first video recording apparatus is further configured to transmit the recording availability inquiry information to the third video recording apparatus, and to check whether or not the content can be recorded based on a response from the third video recording apparatus to the recording availability inquiry information, and the scheduled information transmitting unit included in the first video recording apparatus is configured to transmit the relay-recording scheduled information to the second video recording apparatus when the checking unit determines that the third video recording apparatus cannot record the content and the second video recording apparatus can record the content.

Thereby, since the first video recording apparatus inquires of the second and third video recording apparatuses about whether or not to be able to perform relay recording during a period of time indicated by the scheduled recording information and transmits relay-recording scheduled information to one of the second and third video recording apparatuses that can perform relay recording. Thus, a video recording apparatus that can perform relay recording can be appropriately selected, and the content can be recorded for certain.

Furthermore, the video recording system further includes a third video recording apparatus connected to the network, wherein the second video recording apparatus further includes: a next-generation scheduled information transmitting unit configured to transmit the relay scheduled recording information to the third video recording apparatus; a next-generation recording start information transmitting unit configured to transmit recording start information to the third video recording apparatus, the recording start information indicating that the second recording control unit has started recording the content; and a next-generation signal transmitting unit configured to continue to transmit the signal to the third video recording apparatus during a period of time between a time when the second recording control unit has started recording the content and a time when the period of time indicated by the relay scheduled recording information ends, and the third video recording apparatus including: a next-generation receiving unit configured to receive the relay-recording scheduled information and the signal that have been transmitted from the second video recording apparatus; a next-generation partner-recording-state monitoring unit configured to determine whether or not the next-generation receiving unit has suspended the continued reception of the signal during a period of time between a time when the third video recording apparatus has received the recording start information and a time when the period of time indicated by the relay scheduled recording information ends; and a next-generation recording control unit configured to start recording the content when the next-generation partner-recording-state monitoring unit determines that the next-generation receiving unit has suspended the continued reception of the signal.

Thereby, when the power of the second video recording apparatus that takes over the recording by the first video recording apparatus is shut down as in the first video recording apparatus, the third video recording apparatus can take over the recording of the content by the second video recording apparatus. In other words, the second-generation relay recording becomes possible, and the content can be recorded for certain.

Furthermore, the signal transmitting unit included in the first video recording apparatus is configured to transmit the recording-state information indicating that the recording is interrupted to the second video recording apparatus, when the first own recording state monitoring unit identifies a state in which the recording is interrupted, and the second recording control unit included in the second video recording apparatus is further configured to start recording the content when the second video recording apparatus receives the recording-state information indicating that the recording is interrupted.

For example, when the remaining capacity in a recording medium of the first video recording apparatus, such as the hard disk becomes less, the video recording and transmitting apparatus 1 suspends the recording. Here, when the recording by the first video recording apparatus is interrupted, the first video recording apparatus notifies the second video recording apparatus of the state, and the second video recording apparatus takes over the recording in replacement of the first video recording apparatus according to the present invention. Thus, even when the recording by the first video recording apparatus is interrupted for a factor other than the power shutdown in the video recording apparatus, the second video recording apparatus can perform relay recording and the content can be recorded for certain.

Furthermore, the second video recording apparatus further includes: a second own recording state monitoring unit configured to monitor a recording state of the second recording control unit; and a relay-recording control unit configured to determine whether or not the recording state of the first video recording apparatus returns from a state being interrupted to a recording possible state based on the recording-state information transmitted from the signal transmitting unit included in the first video recording apparatus, and to transmit relay-recording-state information to the first video recording apparatus when the recording state returns to the recording possible state, the relay-recording-state information indicating that a state identified by the second own recording state monitoring unit is a state being recorded.

For example, when the first video recording apparatus returns from a state being interrupted to a recording possible state, it tries to continue to record the content according to the scheduled recording information. Here, when the first video recording apparatus returns to the recording possible state, the second video recording apparatus transmits relay-recording scheduled information indicating that the second video recording apparatus is recording a content. Thus, the first video recording apparatus can determine that the continued recording is not necessary by transmitting the relay-recording scheduled information, and prevent the same content from being recorded by the first and second video recording apparatuses.

Furthermore, the signal transmitting unit included in the first video recording apparatus is configured to transmit the recording-state information indicating that the recording is completed to the second video recording apparatus when the first own recording state monitoring unit identifies a state in which the recording ends when the period of time indicated by the scheduled recording information ends, and the second video recording apparatus further includes a relay-recording control unit configured to abandon the relay-recording scheduled information received by the receiving unit when the second video recording apparatus receives the recording-state information indicating that the recording is completed.

Thereby, when the first video recording apparatus completes the recording according to scheduled recording information, relay-recording scheduled information received by the second video recording apparatus is abandoned. Thus, improper processing based on the unnecessary relay-recording scheduled information can be prevented.

Here, the present invention can be embodied not only as such a video recording system as above, but also as: a method for performing processing in the video recording system; a video recording apparatus included in the video recording system; a method for processing the video recording apparatus; a program for causing the video recording apparatus to perform the processing; and a recording medium that stores the program.

The video recording system can continue to record a content by another recording and playing apparatus on the network, when the power of the video recording apparatus (recording and playing apparatus) that is recording the content is shut down. Furthermore, when recording is interrupted due to exhaustion of resources in a home network environment, another video recording apparatus takes over the recording so that the recording can be resumed in a shorter period of interruption time. Furthermore, a recording content that is stored by video recording apparatuses by dividing the content into sections can be played as if the divided sections were a single content. Furthermore, trick play in playing the content (forwarding, rewinding, skip, and other modes) can also be supported. Furthermore, a recorded content that is stored with such division can be easily restored as one content.

FURTHER INFORMATION ABOUT TECHNICAL BACKGROUND TO THIS APPLICATION

The disclosure of U.S. Provisional Application No. 61/040,785 filed on Mar. 31, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 illustrates an example of channel information according to the present invention;

FIG. 7 illustrates an example of the recording information management table;

FIG. 8 illustrates an example of scheduled recording information;

FIG. 9 illustrates an example of recorded content information;

FIG. 18 illustrates an example of the categories of transmission and reception information;

FIG. 19 illustrates an example of recording availability inquiry information;

FIG. 20 illustrates an example of recording availability response information;

FIG. 21 illustrates an example of the relay-recording scheduled information;

FIG. 22 illustrates the example of continued recording inquiry information;

FIG. 23 illustrates an example of recording-state information;

FIG. 24 illustrates an example of the relay-recording-state information;

FIG. 25 illustrates an example of content search request information;

FIG. 26 illustrates an example of search result notifying information;

FIG. 28 illustrates an example of scheduled recording information;

FIG. 29 illustrates another example of recorded content information;

FIG. 30 illustrates another example of scheduled recording information;

FIG. 31 illustrates another example of recorded content information;

FIG. 32 illustrates an example of division recording information generated by the relay-recording control unit;

FIG. 33 illustrates an example of division-recording identification information included in the division recording information;

FIG. 34 illustrates an example of relay recording service information to be stored by the video recording and transmitting apparatus;

FIG. 37 illustrates another example of the division recording information;

FIG. 38 illustrates another example of the division-recording identification information;

FIG. 45 shows a flowchart when the video recording and transmitting apparatus 102b replies to an inquiry from the video recording and transmitting apparatus 102a;

FIG. 49 shows a flowchart when the video recording and transmitting apparatus 102b starts recording video according to the recording-state information from the video recording and transmitting apparatus 102a;

FIG. 52 shows a flowchart of the operations in the video recording and transmitting apparatus 102a;

FIG. 67 illustrates a sequence diagram showing the operations of the video recording system when the receiving and playing apparatus performs trick play of a content.

DESCRIPTION OF THE PREFERRED EMBODIMENT

Embodiment

Hereinafter, an embodiment of the present invention will be described with reference to the drawings.

1. Configuration of the Apparatus

A video recording system, a video recording apparatus, and a video recording method according to Embodiment of the present invention will be described with reference to the drawings. Although the present invention aims at recording and playing a content that has been transmitted and received to and from any medium, Embodiment is exemplified by use of a cable TV broadcasting system. In the cable TV broadcasting system, the multimedia data receiving apparatus of the present invention is generally referred to as a terminal. Such terminals include a video recording apparatus, a playing apparatus, and a video recording and playing apparatus that has functions of both the video recording apparatus and the playing apparatus.

In Embodiment, a terminal characterized by a video recording function is referred to as a video recording apparatus (or video recording terminal), and a terminal characterized by a playing function is referred to as a playing apparatus (or playing terminal).

Furthermore, a video recording apparatus characterized by a function of transmitting a content is referred to as a video recording and transmitting apparatus, and a playing apparatus characterized by a function of receiving a content is referred to as a receiving and playing apparatus.

Figure 1:
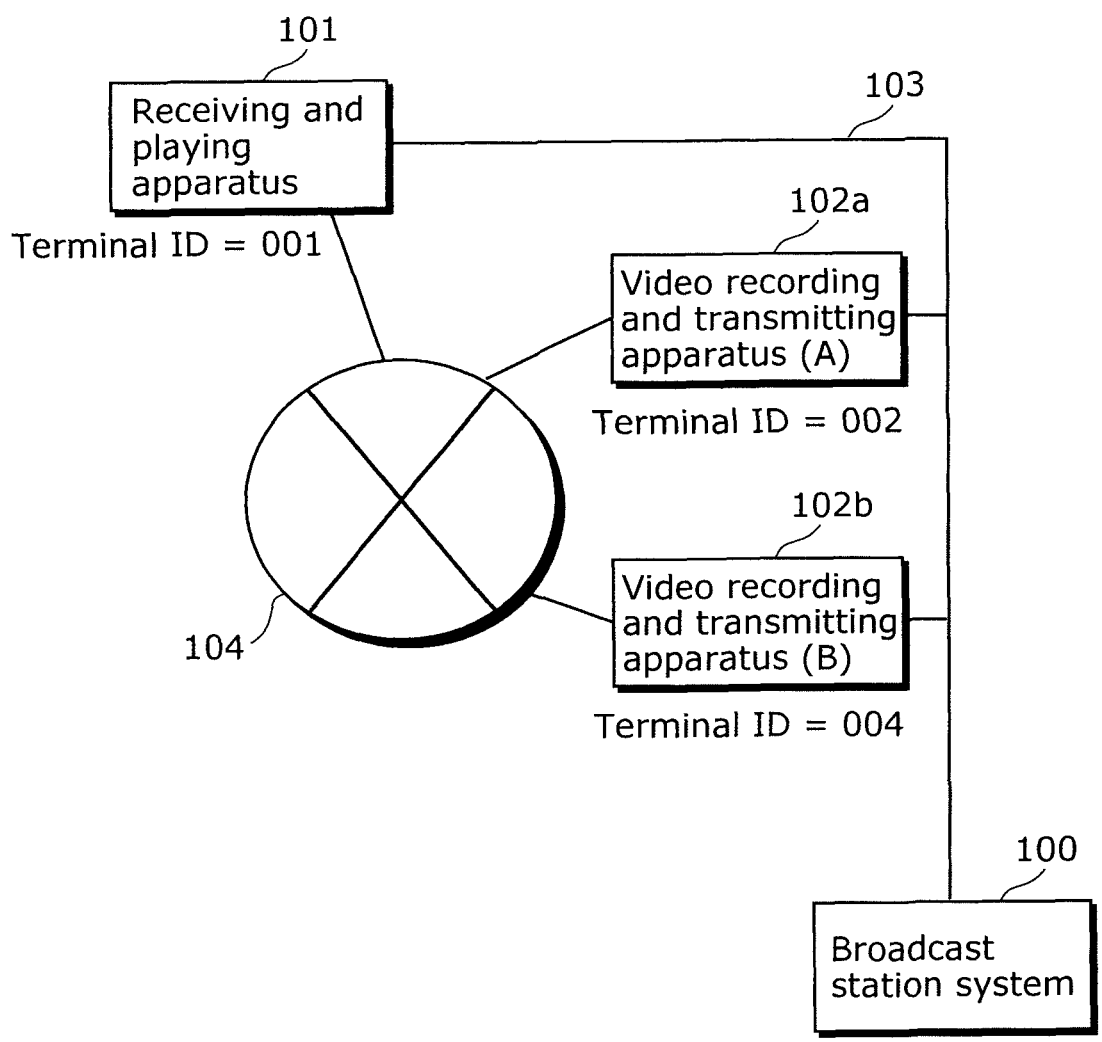
FIG. 1 illustrates an example of the configuration of the terminal-to-terminal network communication system.

FIG. 1 illustrates an example of a configuration of a terminal-to-terminal network communication system according to Embodiment of the present invention. This configuration represents a multimedia content communication system.

A terminal-to-terminal network communication system 105 includes a receiving and playing apparatus 101, video recording and transmitting apparatuses 102a and 102b, a broadcast station system 100, and a network 104. The video recording and transmitting apparatuses 102a and 102b represent video recording apparatuses according to the present invention, and the receiving and playing apparatus 101 represents a playing apparatus according to the present invention. The video recording and transmitting apparatuses 102a and 102b and the receiving and playing apparatus 101 are connected to the network 104 (for example, a home network), and can mutually communicate with an available apparatus (the video recording and transmitting apparatuses 102a and 102b, and the receiving and playing apparatus 101 that are available in a household in this example) via the network 104.

Furthermore, a cable 103 connects the broadcast station system 100 to each of the apparatuses. Furthermore, an apparatus to be connected to the network 104 has a terminal ID in Embodiment. The terminal ID is identification information that uniquely identifies a terminal from among terminals to be connected to the network 104. In the terminal-to-terminal network communication system 105 exemplified in FIG. 1, the receiving and playing apparatus 101 has a terminal ID "001", the video recording and transmitting apparatus 102a has a terminal ID "002", and the video recording and transmitting apparatus 102b has a terminal ID "004".

Here, the video recording system according to the present invention includes the video recording and transmitting apparatuses 102a and 102b, and the network 104 in Embodiment.

The video recording and transmitting apparatuses 102a and 102b in Embodiment are, for example, Set Top Boxes (STB) each of which includes a network interface and a storage region for storing multimedia data, and which receives a digital broadcast. Since the video recording and transmitting apparatuses 102a and 102b are the same video recording and transmitting apparatuses, a video recording and transmitting apparatus 102 is representatively used to describe both of the apparatuses. The receiving and playing apparatus 101 and the video recording and transmitting apparatus 102 are connected to the broadcast station system 100 via the cable 103. In addition, the video recording and transmitting apparatus 102 stores, in the storage region, the multimedia data of a digital broadcast content received from the broadcast station system 100.

In addition, the video recording and transmitting apparatus 102 receives, through the network 104, a request transmitted from the receiving and playing apparatus 101. Subsequently, the video recording and transmitting apparatus 102 transmits, to the receiving and playing apparatus 101 via the network 104, a content of a digital broadcast, information and attributes stored for each content, or multimedia data that is received in response to the request. Alternatively, the video recording and transmitting apparatus 102 records a content of a digital broadcast received from the broadcast station system 100 in response to the request from the receiving and playing apparatus 101. Although the video recording and transmitting apparatus 102 uses a Hypertext Transfer Protocol (HTTP) that is a necessary protocol in the DLNA, as the communication protocol used when outputting multimedia data via the network 104, the same effect can be achieved even with other protocols.

Furthermore, the video recording and transmitting apparatus 102 stores the content of the digital broadcast received from the broadcast station system 100 in response to the request from the receiving and playing apparatus 101. These contents are provided to the receiving and playing apparatus 101 (remote scheduled recording).

Here, the video recording and transmitting apparatus 102 may provide all multimedia contents stored in the storage region, and may also provide multimedia contents within a range set according to an application downloaded from the broadcast station 100.

The receiving and playing apparatus 101 transmits to the video recording and transmitting apparatus 102 a transmission request for a list of contents that can be provided, and a transmission request for multimedia data and a content attribute. Furthermore, in response to the request, the receiving and playing apparatus 101 receives data from the video recording and transmitting apparatus 102 and presents the data to the user. Furthermore, the receiving and playing apparatus 101 transmits a request for scheduled recording to the video recording and transmitting apparatus 102 (remote scheduled recording).

The receiving and playing apparatus 101 transmits to the video recording and transmitting apparatus 102 a transmission request for a list of contents that can be provided, and a transmission request for multimedia data and a content attribute in response to the request from the user. Furthermore, in response to the request, the receiving and playing apparatus 101 receives data from the video recording and transmitting apparatus 102 and presents the data to the user. The receiving and playing apparatus 101 is an apparatus implemented according to the DLNA laid-out guidelines, for example. Since details of DLNA-compliant devices are described in the guidelines issued by the DLNA, their description will be omitted.

The network 104 is a home network established in the household, and is an Internet Protocol (IP) network configured of the Ethernet™, a wireless LAN, and so on.

The video recording and transmitting apparatus 102 and the receiving and playing apparatus 101 can search for other apparatuses connected to the network 104, and obtain a function held by each of the apparatuses. Furthermore, the receiving and playing apparatus 101 issues a transmission request for a list of contents that can be provided to the video recording and transmitting apparatus 102. Subsequently, upon reception of the request, the video recording and transmitting apparatus 102 searches for the contents that can be provided, and replies to the receiving and playing apparatus 101, with the list.

Receiving the provided content list, the receiving and playing apparatus 101 presents the list to the user. Then, the receiving and playing apparatus 101 requests the video recording and transmitting apparatus 102 to transmit data of the content selected by the user. The video recording and transmitting apparatus 102 reads the requested content data from the storage region, and transmits the data to the receiving and playing apparatus 101 that has requested the data. Upon receipt the content data, the receiving and playing apparatus 101 displays the data to the user.

Furthermore, in the case of remote scheduled recording, the receiving and playing apparatus 101 issues a request for remote scheduled recording to the video recording and transmitting apparatus 102, and the video recording and transmitting apparatus 102 records the received digital broadcast content according to the request.

Since this series of operations can be carried out using a method defined by the DLNA and the UPnP, detailed description will be omitted. The detailed description regarding the method defined by the DLNA and the UPnP will be omitted.

Although the receiving and playing apparatus 101 and the video recording and transmitting apparatuses 102a and 102b are respectively connected to the broadcast station system 100 in the terminal-to-terminal network communication system 105, the present invention is applicable to the terminal-to-terminal network communication system 105 even when only the video recording and transmitting apparatuses 102a and 102b are respectively connected to the broadcast station system 100, or when constituent elements of the terminal-to-terminal network communication system 105 are respectively connected to the broadcast station system 100.

Although the receiving and playing apparatus 101 and the video recording and transmitting apparatuses 102a and 102b are different terminals with one another in the terminal-to-terminal network communication system 105, the present invention is applicable to the terminal-to-terminal network communication system 105 even when one terminal includes both a function of the video recording and transmitting apparatus 102 and a function of the receiving and playing apparatus 101. More specifically, even when a function of the receiving and playing apparatus 101 is added to functions of the video recording and transmitting apparatus 102a, or when a function of the receiving and playing apparatus 101 is added to functions of the video recording and transmitting apparatus 102a, the present invention is applicable to the terminal-to-terminal network communication system 105.

The video recording and transmitting apparatus 102 and the receiving and playing apparatus 101 will be hereinafter described in detail.

Figure 2:
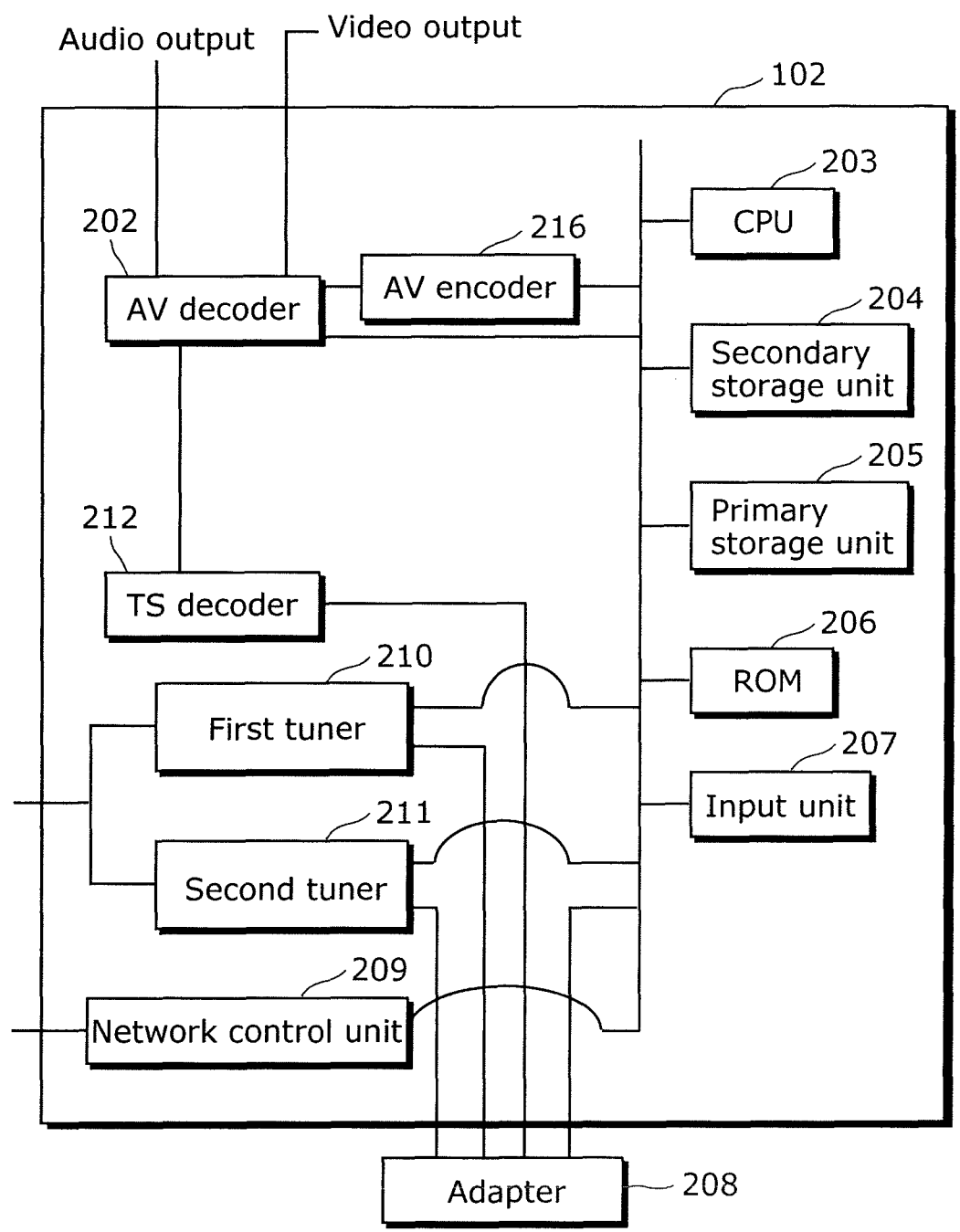
FIG. 2 illustrates an example of a hardware configuration of the video recording and transmitting apparatus.

FIG. 2 is a block diagram illustrating a general hardware configuration of the video recording and transmitting apparatus 102 for use in Embodiment. Here, since Embodiment describes constituent elements included in both the video recording and transmitting apparatus 102a and 102b as examples, the elements are labeled with common numerals.

Furthermore, when a constituent element included in the video recording and transmitting apparatus 102a or 102b is particularly described, "a" or "b" is added to the end of the numeral of the element described in FIG. 2 (For example, when a first tuner included in the video recording and transmitting apparatus 102a is described, the first tuner is named as a first tuner 210a, and when a first tuner included in the video recording and transmitting apparatus 102b is described, the first tuner is named as a first tuner 210b). The same numbering holds true for FIGS. 4, 6, 13, 16, and 17.

The video recording and transmitting apparatus 102 includes a first tuner 210, a second tuner 211, a TS demultiplexer (hereinafter referred to as TS decoder) 212, an AV decoder 202, an AV encoder 216, a CPU 203, a secondary storage unit 204, a primary storage unit 205, a ROM 206, an input unit 207, an adapter 208, and a network control unit 209. Generally, the video recording and transmitting apparatus includes tuners. Although the video recording and transmitting apparatus 102 includes 2 tuners of the first tuner 210 and the second tuner 211, it may include more than 3 tuners or only one tuner.

The first tuner 210 and the second tuner 211 are devices that demodulate a broadcast signal to be transmitted from the broadcast station system 100 and be modulated, according to tuning information, such as a frequency specified by the CPU 203. MPEG-2 transport streams which can be obtained as a result of the demodulation of a signal performed by one of the first tuner 210 and the second tuner 211 are transferred to the TS decoder 212 via the adapter 208 having a decryption function.

The TS decoder 212 is a device that has a function of sorting out Packetized Elementary Stream (PES) packets and MPEG-2 sections each of which satisfies a specified condition, in the MPEG-2 transport streams, on the basis of a Packet Identification (PID), a section filtering condition, and so on specified by the CPU 203. This sorting function is called packet filtering. The TS decoder 212 includes 2 kinds of filter devices of a PID filter and a section filter.

The TS decoder 212 receives MPEG-2 transport streams. The MPEG-2 transport streams are supplied from the adapter 208 or the secondary storage unit 204. The TS decoder 212 transmits a PES packet obtained by performing packet filtering on the input MPEG-2 transport stream. The PES packet is supplied to the AV decoder 202 and the primary storage unit 205. The video and audio PES packets sorted by the TS decoder 212 are provided to the AV decoder 202. Furthermore, the MPEG-2 section sorted by the TS decoder 212 is Direct Memory Access (DMA) transferred to the primary storage unit 205, and is used in a program to be executed by the CPU 203. The input source and output destination of the TS decoder 212 are controlled by the CPU 203 according to an instruction from the software.

The AV decoder 202 is a device that has a function of decoding a coded video elementary stream (ES) and a coded audio ES. The AV decoder 202 extracts a coded video ES and a coded audio ES from a PES packet that is transferred from the TS decoder 212 and that transmits audio and image information, and decodes the coded video ES and the coded audio ES. In the case of playing a service, the audio signal and video signal obtained though decoding by the AV decoder 202 are respectively transmitted as an audio output to a speaker that is not illustrated and as an video output to a display device, such as a cathode-ray tube, a liquid crystal display, and an organic Electro-Luminescence (EL) display that are not illustrated. In the case of recording a service, the audio signal and video signal obtained though decoding by the AV decoder 202 are respectively transmitted to the AV encoder 216, and the output from the AV encoder 216 is recorded by, for example, the secondary storage unit 204. The encoding format of the AV encoder 216 may be anything as long as the AV decoder 202 can perform decoding using the encoding format. The CPU 203 controls an output path of the AV encoder 216 according to an instruction from the software.

The CPU 203 runs programs operated on the video recording and transmitting apparatus 102. The CPU 203 runs programs stored in the ROM 206. Alternatively, the CPU 203 runs programs downloaded from a broadcast signal or through a network and held in the primary storage unit 205. Alternatively, the CPU 203 runs programs downloaded from a broadcast signal or through a network and held in the secondary storage unit 204. According to the instructions of the running programs, the CPU 203 controls the first tuner 210, second tuner 211, TS decoder 212, AV decoder 202, secondary storage unit 204, primary storage unit 205, ROM 206, input unit 207, adapter 208, AV encoder 216, and network control unit 209. Furthermore, the CPU 203 can control the adapter 208 though communication with not only a device present within the video recording and transmitting apparatus 102 but also a device within the adapter 208.

The secondary storage unit 204 is a storage device in which data is not deleted even when power of the video recording and transmitting apparatus 102 is shut down. The secondary storage unit 204 stores configuration information and recoded contents to be described later.

The primary storage unit 205 is a device that has a function of temporarily storing information according to an instruction from the CPU 203 or a DMA-transferable device, and includes a RAM or another memory.

The ROM 206 is a read-only memory device, and specifically includes a ROM, a CD-ROM, or a DVD, and others. The ROM 206 stores a program executed by the CPU 203.

The input unit 207 includes, for example, a front panel or a remote control signal receiver, accepts an input from the user, and notifies the CPU 203 of an input signal corresponding to the input.

Figure 3:
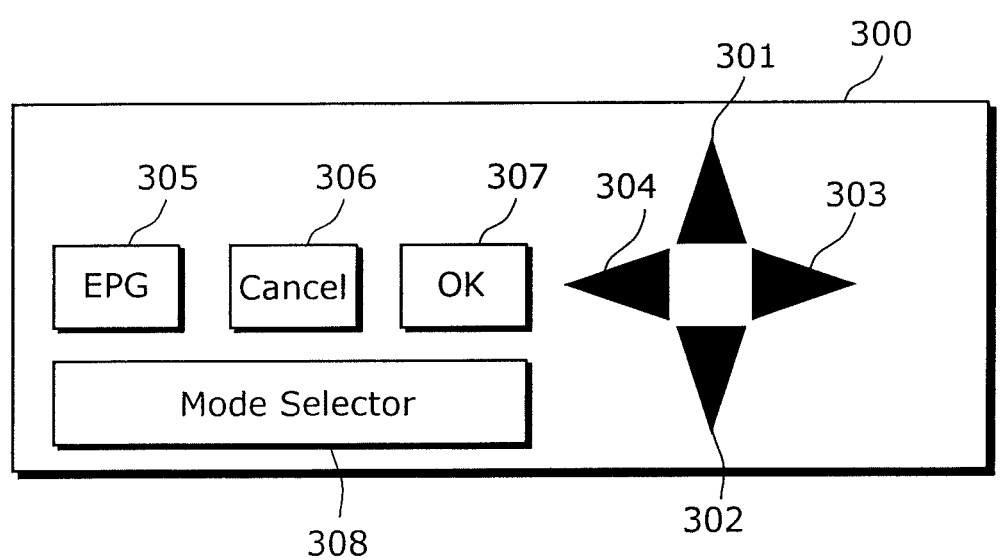
FIG. 3 illustrates an example of an external view of the input unit configured of a front panel in the hardware configuration of the video recording and transmitting apparatus and the receiving and playing apparatus.

FIG. 3 illustrates an example of an external view of the input unit 207 configured of a front panel 300. The front panel 300 includes, for example, 7 buttons. The 7 buttons includes an up-cursor button 301, a down-cursor button 302, a right-cursor button 303, a left-cursor button 304, an EPG button 305, a cancel button 306, an OK button 307, and a mode selector 308. When the user presses down a button, an identifier of the pressed button is notified to the CPU 203.

The adapter 208 decrypts the MPEG-2 transport streams which have been encrypted and includes at least one descrambler. The adapter 208 decrypts a TS packet that has been encrypted and specified by the CPU 203, in the MPEG-2 transport streams which have been transmitted from the first tuner 210 or the second tuner 211, and transmits the decrypted TS packet to the TS decoder 212. Furthermore, the adapter 208 performs format conversion on data transmitted in another frequency band.

The network control unit 209 handles any input and output data obtained through the network 104. The network 104 may be configured of any physical layers and logical layers. In Embodiment, MoCA is used as such a physical layer, for example. Furthermore, the HTTP, TCP, and IP are used as such logical layers, and each of the logical layers is implemented by the software. MoCA is a standard for building an IP network on an RF coaxial cable. For example, in Embodiment, the network control unit 209 receives an HTTP request in the TCP/IP packet format, and transmits, as an HTTP response, a result obtained by the software processing according to the request.

Although an example of the hardware configuration of the video recording and transmitting apparatus 102 that is an example of the video recording apparatus of the present invention is hereinbefore described with reference to FIG. 2, main functions of the video recording apparatus of the present invention, that is, control of recording a service and a service via the network (remote scheduled recording), control of playing the recorded service, and providing a service via the network will be described hereinafter.

Recording a service by the video recording apparatus of the present invention corresponds to recording video, audio, a Java program, and synchronization information of the Java program that are included in the service, on any recording medium, such as a hard disk, a Blu-ray Disc (BD), a DVD, and a Secure Digital (SD) memory card. Such a recording medium is exemplified as the secondary storing unit 204 in FIG. 2. Playing a recorded service corresponds to, for example, playing and executing video, audio, and a Java program that are recorded on a recording medium, according to the synchronization information. The result of playing the recorded service is necessary to be almost the same as the result of receiving a broadcast wave and directly playing the service.

Here, providing a service via a network (the network 104 in the case of FIG. 1) corresponds to providing video, audio, a Java program, and synchronization information of the Java program that are included in the service via the network for playing the service by another terminal, not playing the recorded service by the own terminal itself.

Figure 4:
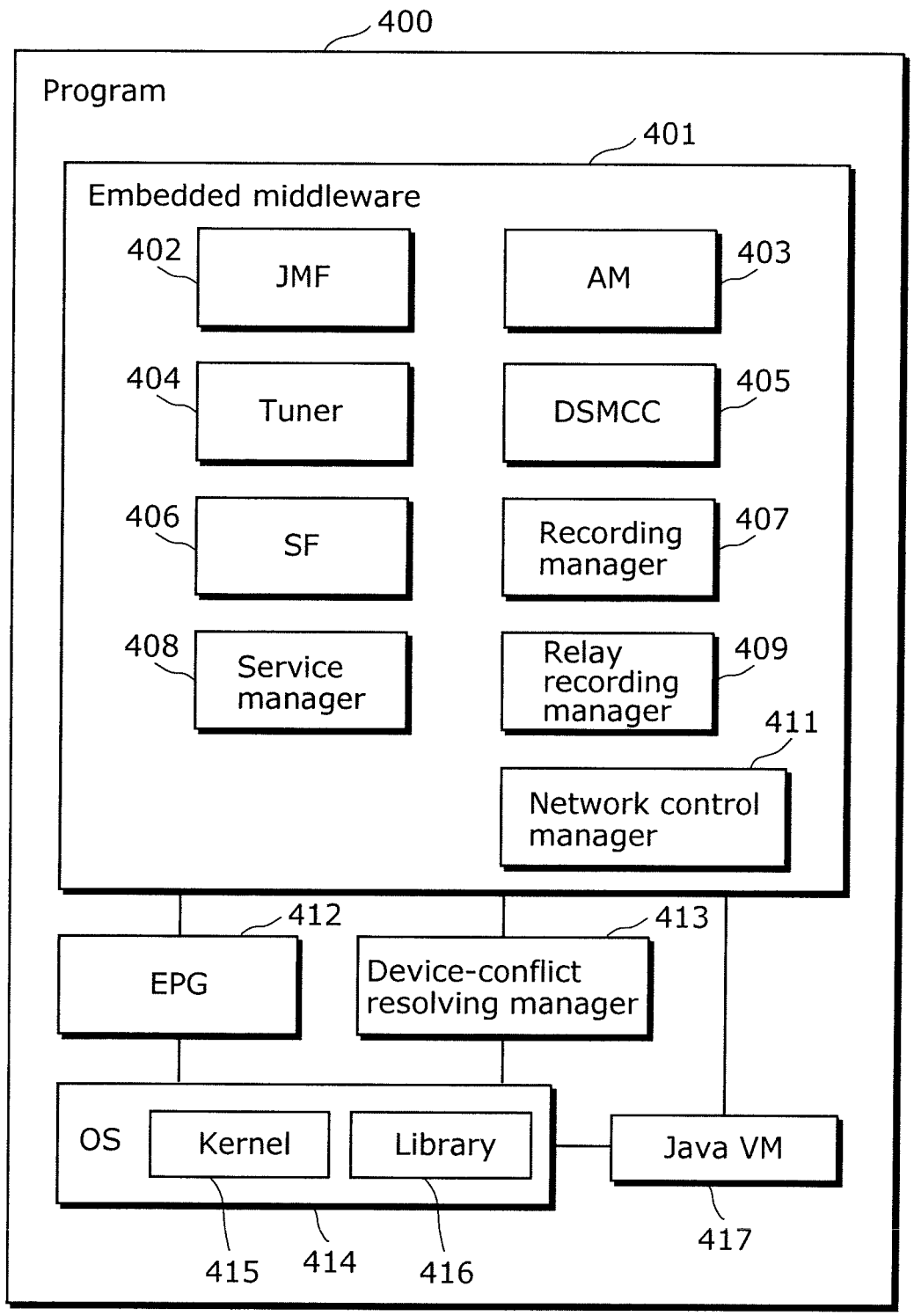
FIG. 4 illustrates an example of a software configuration of the video recording and transmitting apparatus.

FIG. 4 illustrates an exemplary configuration of a program run by the video recording and transmitting apparatus 102. A program 400 is a program that is necessary for: control of recording a service using a Java program; control of recording a service via the network (remote scheduled recording); control of playing the recorded service; and providing a service via the network. The program 400 is a Java program that is downloaded, and is the software to be operated on a video recording and transmitting apparatus in Embodiment. The program 400 is the software stored in the ROM 206.

The program 400 includes an OS 414 that is a sub-program, a Java VM 417, and embedded middleware 401, Electronic Program Guide (EPG) 412, and a device-conflict resolving manager 413.

The OS 414 is an Operating System, and an example thereof is Linux and Windows™. The OS 414 includes other sub-programs, for example, a kernel 415 that runs the Java VM 417 and a library 416 to be used by the sub-programs for controlling the constituent elements of the video recording and transmitting apparatus 102. The kernel 415 is a known technique, and thus the detailed description is omitted.

The library 416 provides a tuning function that controls a tuner, such as the first tuner 210 and the second tuner 211. The library 416 receives tuning information including a frequency from other sub-programs or a tuner 404 to be described later, and transfers the tuning information to the first tuner 210 and the second tuner 211. For example, when the library 416 transfers the tuning information to the first tuner 210, the first tuner 210 demodulates a MPEG-2 transport stream according to the tuning information, and transfers the demodulated MPEG-2 transport stream via the adapter 208 to the TS decoder 212. As a result, other sub-programs can control the first tuner 210 via the library 416. For example, when the library 416 transfers the tuning information to the second tuner 211, the second tuner 211 demodulates a MPEG-2 transport stream according to the tuning information, and transfers the demodulated MPEG-2 transport stream via the adapter 208 to the TS decoder 212. As a result, other sub-programs can control the second tuner 211 via the library 416.

Furthermore, the library 416 provides channel information for uniquely identifying a channel.

FIG. 5 illustrates an example of channel information. The channel information 1000 is transmitted from the broadcast station system 100 using the Out of Band (OOB) signaling or the In-band signaling. The received data is converted in tabular form in the adapter 208, and is stored in a temporary storing unit 205 that can be accessed by the library 216.

In FIG. 5, a column 1001 describes channel identifiers, a column 1002 describes channel names, a column 1003 describes tuning information, and a column 1004 describes program numbers for designating television programs. For example, a row 1005 shows service information including 1 as the channel identifier, Channel 1 as the channel name, "150 MHz . . . " as the tuning information, and 101 as the program number.

Furthermore, the library 416 also provides a function of controlling read and write of data to and from the secondary storage unit 204 and network protocol stacks, such as the HTTP/TCP/IP. Furthermore, the library 416 determines a status of its own terminal (video recording and transmitting apparatus 102). Here, the statuses of the terminal include turning off, stand-by, and a broadcast service being viewed. However, the statuses are not limited to such. In addition, the library 416 can set a control parameter to each of the constituent elements of the hardware illustrated in FIG. 2.

The Java VM 417 is a Java virtual machine that sequentially analyzes and runs programs written in the Java™ language. The programs written in the Java language are compiled into intermediate codes called byte codes that are independent of hardware. The Java VM 417 is an interpreter that sequentially analyzes and runs the intermediate codes. Furthermore, the Java VM 417 can call and be called by another subprogram not written in the Java™ language, through the JNI (Java™ Native Interface). Such a configuration is a beneficial mechanism in such an operation of the OCAP specification as where, for example, various manufacturing companies develop the embedded middleware 401 and the terminals run the same downloaded Java program transmitted from the broadcast station system 100.

The embedded middleware 401 includes a JMF 402, an application manager (AM) 403, the tuner 404, a DSMCC 405, an SF 406, a recording manager 407, a service manager 408, a relay recording manager 409, and a network control manager 411.

The tuner 404 controls the first tuner 210 and the second tuner 211 of the video recording and transmitting apparatus 102. When the Java programs transfer tuning information including a frequency to the tuner 404, the tuner 404 calls the tuning function of the library 416 using the tuning information to control the operations of the first tuner 210 and the second tuner 211.

The SF 406 transmits the specified packet ID to the TS decoder 212, while transmitting data obtained as a result of the filtering to other programs.

The DSMCC 405 accesses a file system with a DSMCC object carousel.

The AM 403 is an application manager that provides a function of managing execution and end of the Java program included in a service. The AM 403 extracts the Java program that is multiplexed onto a specified channel of the specified MPEG-2 transport stream, transfers to the Java VM 417 necessary file data included in the extracted Java programs, according to the synchronization information multiplexed to other channel, and causes the Java VM 417 to execute the extracted Java programs. Furthermore, the AM 403 terminates the Java programs executed by the Java VM 417, according to the synchronization information.

Extracting data such as a file system from a TS packet in the MPEG-2 transport streams and storing the data in the primary storage unit 205 or the secondary storage unit 204 is called downloading.

The JMF 402 controls playing video and audio included in a service. More specifically, the JMF 402 causes the AV decoder 202 to transmit a particular video ES and a particular audio ES from the MPEG-2 transport streams that are provided from the TS decoder 212.

The audio ES and video ES decoded by the AV decoder 202 are outputted from a speaker and a display device that are not illustrated, respectively as an audio output and a video output.

The recording manager 407 has a function of recording the MPEG-2 transport streams including a specified service in the secondary storage unit 204, and a function of managing relay recording registration to be described later.

Figure 6:
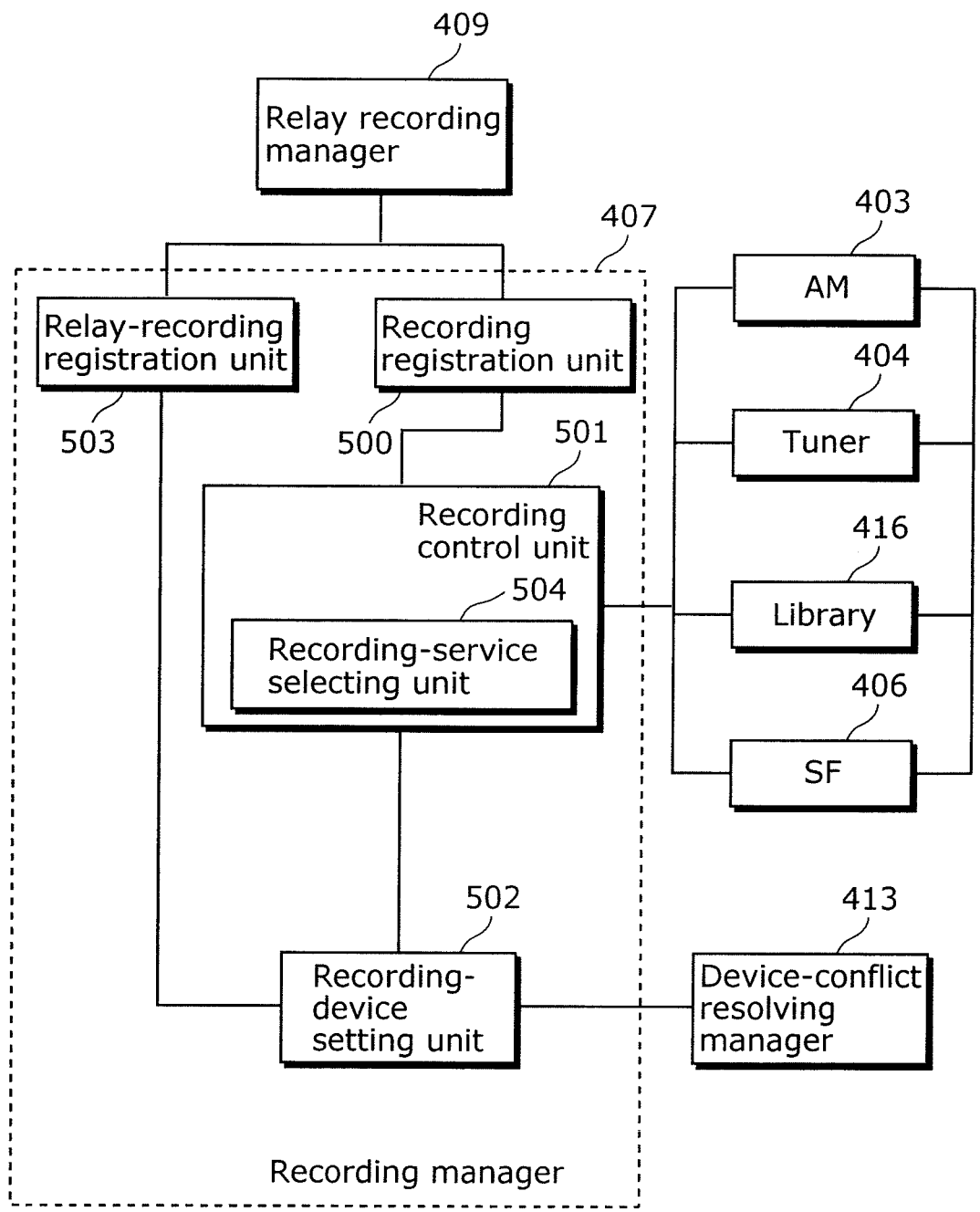
FIG. 6 illustrates an example of the internal configuration of the recording manager included in the video recording and transmitting apparatus.

FIG. 6 illustrates an example of an internal configuration of the recording manager 407. The recording manager 407 includes a recording registration unit 500, a video-recording control unit 501, a recording-device setting unit 502, and a relay-recording registration unit 503. The video-recording control unit 501 includes a recording-service selecting unit 504. A service to be recorded is specified by: the user who uses the video recording apparatus (video recording and transmitting apparatus 102) through the input unit 207; the Java application programs to be run on the video recording apparatus using the Java APIs; a program written in a non-Java™ language; another terminal (or the Java programs to be run on another terminal) to be connected via the network 104 using the network control unit 209.

The recording registration unit 500 accepts a request for recording a service corresponding to an input channel identifier, during a time period between a recording start time and a recording end time specified by the input. Here, input information including the channel identifier, the recording start time, and the recording end time is referred to as scheduled recording information. Furthermore, the recording registration unit 500 also accepts a request for registered recording from the program written in a non-Java™ language. For example, the recording registration unit 500 can specify a channel identifier, a recording start time, and a recording end time through the EPG 412. Furthermore, the recording registration unit 500 also accepts a request for registered recording from another terminal to be connected to the network 104 via the network control unit 209. For example, the network control manager 411 controls the recording registration unit 500 to accept a request for registered recording including a channel identifier, a recording start time, and a recording end time that are received by the network control unit 209 via the network 104 from the receiving and playing apparatus 101 connected to the network 104, so that recording specified by the receiving and playing apparatus 101 can be scheduled.

Once recording is registered, the video-recording registration unit 500 holds scheduled recording information, and waits a predetermined time before the recording start time. Here, immediately after the recording registration, the recording registration unit 500 may also request the recording device setting unit 502 to temporarily reserve devices to be used for recording. At the predetermined time before the recording start time, the recording registration unit 500 requests the recording device setting unit 502 to reserve devices to be used for recording. Then, the recording registration unit 500 requests the recording control unit 501 to record a service by providing the specified channel identifier, recording start time, and recording end time. Here, the predetermined time is anytime, but desirably needs to be set to have enough room for completing preprocesses of the recording to be described hereinafter by the recording control unit 501.

The recording device setting unit 502 reserves devices to be used for recording a service during a period of time from a recording start time to a recording end time for each scheduled recording (registered recording). Here, the devices are devices to be used for recording a service, such as the first tuner 210, the secondary storage unit 204, the AV decoder 202, and the TS decoder 212. Such devices are reserved when a device reservation request is issued to the device-conflict resolving manager 413.

The recording control unit 501 records a service in the secondary storage unit 204 using the set devices, based on the specified channel identifier, recording start time, and recording end time. The recording control unit 501 includes the recording-service selecting unit 504. The recording-service selecting unit 504 obtains tuning information corresponding to the channel identifier, from the channel information held in the library 416 using the channel identifier as a key.

For example, the recording control unit 501 reserves, within the secondary storage unit 204, a storage region for recording the MPEG-2 transport streams from a specified recording start time to a recording end time. The reserved storage region is provided with a media identifier. Next, the recording-service selecting unit 504 obtains the tuning information corresponding to the channel identifier. When the recording-service selecting unit 504 provides tuning information to the tuner 404, the tuner 404 starts tuning. Here, the tuning information is information that can identify a frequency and a modulation format, for example. Furthermore, the recording control unit 501 obtains necessary data from the MPEG-2 transport streams using the SF 406. Then, the recording control unit 501 sets an output destination of each hardware constituent element (such that an output from the AV decoder 202 is inputted to the AV encoder 216 while an output from the AV encoder 216 is inputted to the storage region reserved in the secondary storage unit 204).

Then, all ESs included in a service corresponding to a specified channel identifier (coded video ES and audio ES) are recorded onto the storage region previously reserved within the secondary storage unit 204.

When there is no need for the AV encoder 216 to perform coding, data outputted from the AV decoder 215 may directly be recorded onto the secondary storage unit 204. Furthermore, when recording the data onto the secondary storage unit 204, the MPEG-2 transport streams onto which the video ES, the audio ES, and necessary information are multiplexed using a multiplexer that is not illustrated may be recorded onto the secondary storage unit 204.

Here, when the input of the MPEG-2 transport streams is interrupted before the end of the specified recording end time, the recording control unit 501 temporarily terminates recording of the MPEG-2 transport streams. Then, each time the MPEG-2 transport stream is inputted again before the end of the specified recording end time, the recording control unit 501 newly starts recording a service and records the MPEG-2 transport stream in the secondary storage unit 204. The recording control unit 501 can detect the interruption and resumption of the input of the MPEG-2 transport streams, for example, from interruption and resumption of the input to the TS decoder 212. The recording control unit 501 always monitors input of the MPEG-2 transport streams to the TS decoder 212, using the functions of the library 416.

At the specified recording end time, the recording control unit 501 suspends the tuning operations in the tuner 404, and stops writing the MPEG-2 transport stream in the secondary storage unit 204.

Furthermore, the recording control unit 501 creates, for example, a recording information management table 1200 illustrated in FIG. 7 as management information of the MPEG-2 transport streams recorded onto the secondary storage unit 204. The details will be described hereinafter.

Figure 10:
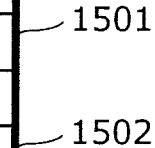
FIG. 10 illustrates an example of recorded content information.
Figure 11:
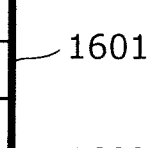
FIG. 11 illustrates an example of recorded content information.

FIG. 7 illustrates an example of a recording information management table for managing recording information that is recorded onto the secondary storage unit 204 and others. A recording information management table 1200 holds record identifiers 1201 as well as scheduled recording information and recorded content information that is information relating to a content recorded according to the scheduled recording information, for each of the record identifiers 1201. One of the record identifiers 1201 identifies one scheduled recording information. One of the record identifiers 1201 may identify a plurality of the recorded content information or none of such. FIG. 8 illustrates an example of scheduled recording information d12, and FIGS. 9 to 11 illustrate examples of recorded content information d121 to d123. Here, all of these information are associated with a record identifier 001 among the record identifiers 1201.

FIG. 8 illustrates an example of the scheduled recording information. FIG. 8 shows the scheduled recording information d12 associated with the record identifier 001 among the record identifiers 1201. The scheduled recording information d12 includes a recording start time 1301, a recording end time 1302, a channel identifier 1303, a program number 1304, and a recording state 1305. The recording start time 1301 is a time of starting recording a service, while the recording end time 1302 is a time of ending recording the service. The channel identifier 1303 is a channel identifier specified as a recorded object. The program number 1304 is a program number for specifying Program Map Table (PMT) in the MPEG-2 transport streams. The recording state 1305 is a state of recording a service. The recording state will be described later.

FIG. 9 illustrates an example of recorded content information. FIG. 9 shows the recorded content information d121 associated with the record identifier 001 of the record identifiers 1201. The recorded content information d121 includes a recording destination 1401, a recording size 1402, a recording time 1403, a recording bit rate 1404, and a media identifier 1405. The media identifier 1405 identifies a MPEG-2 transport stream recorded as a service. The recording destination 1401 is a destination on which a service is recorded, and a location where the MPEG-2 transport stream identified by the media identifier 1405 is stored. The recording size 1402 indicates a data size when data corresponding to the MPEG-2 transport stream identified by the media identifier 1405 is actually recorded. The recording time 1403 indicates a time length during which a service is actually recorded in a medium indicated by the media identifier 1405. The recording bit rate 1404 indicates a bit rate at which a MPEG-2 transport stream identified by the media identifier 1405 is actually recorded.

The recorded content information d121 is generated, for example, when the recording starts. Here, the MPEG-2 transport stream indicated by the media identifier 1405 (MPEG-2 transport stream corresponding to TS_121 in this case) is stored in a region reserved in the secondary storage unit 204 (a volume A in this case).

In this case, the recorded content information d121 is managed as the recorded content information corresponding to the record identifier 001 in the recording information management table 1200. The recording size 1402 and the recording time 1403 may be changed accordingly after starting the recording.

In the case of the record identifier 001, while the recording time is 1 hour calculated from the fact that the recording start time is 2007/4/1 15:00 and the recording end time is 2007/4/1 16:00 as in FIG. 8, the length of TS_121 is only 00:25 in FIG. 9. This indicates that the input of the MPEG-2 transport streams is interrupted for some reasons after starting the recording of the MPEG-2 transport streams and at a time when 00:25 has passed.

In this case, the recording is temporarily suspended, and at the same time, the recording of TS_121 is also suspended. Then, when the input of the MPEG-2 transport streams has resumed before the recording end time of recording the service (time indicated by the recording end time 1302 included in the scheduled recording information d12 in the case of FIG. 8), recorded content information d122 including information in which another media identifier is allocated to a MPEG-2 transport stream in which input has resumed (TS_122 in this case) is generated, while recording of the MPEG-2 transport stream is started.

FIG. 10 illustrates an example of recorded content information d122.

The recorded content information d122 has a structure, for example, as illustrated in FIG. 10, and is managed as recorded content information corresponding to the record identifier 001 among the record identifiers 1201 in the recording information management table 1200. In the case of FIG. 10, another media identifier TS_122 is allocated to the MPEG-2 transport stream in which input has resumed, and the time length of the MPEG-2 transport stream that corresponds to the media identifier and that is actually recorded is indicated as 00:02. In other words, the state indicates that the input of the MPEG-2 transport streams is interrupted for some reasons after 00:02 although the recording has resumed.

Then, before the end of the specified recording end time, the input of the MPEG-2 transport streams has resumed, the recorded content information d123 including the information to which another media identifier TS_123 is allocated is generated, and the MPEG-2 transport stream in which input has resumed are recorded.

FIG. 11 illustrates an example of recorded content information d123.

The recorded content information d123 has a structure, for example, as illustrated in FIG. 11, and is managed as recorded content information corresponding to the record identifier 001 of the record identifiers 1201 in the recording information management table 1200.

When playing a service, the media identifiers TS_121, TS_122, and TS_123 respectively included in the recorded content information d121, d122, and d123 that correspond to the record identifier 001 of the record identifiers 1201 are identified. By reproducing the MPEG-2 transport streams corresponding to the identified media identifiers in an order of the recording, the MPEG-2 transport streams are successively reproduced as if they were one television program.

Furthermore, the recording registration unit 500 manages a state transition according to these recording states, and updates the recording state 1305 of the scheduled recording information d12 in FIG. 8 based on a recording state transition.

Figure 12:
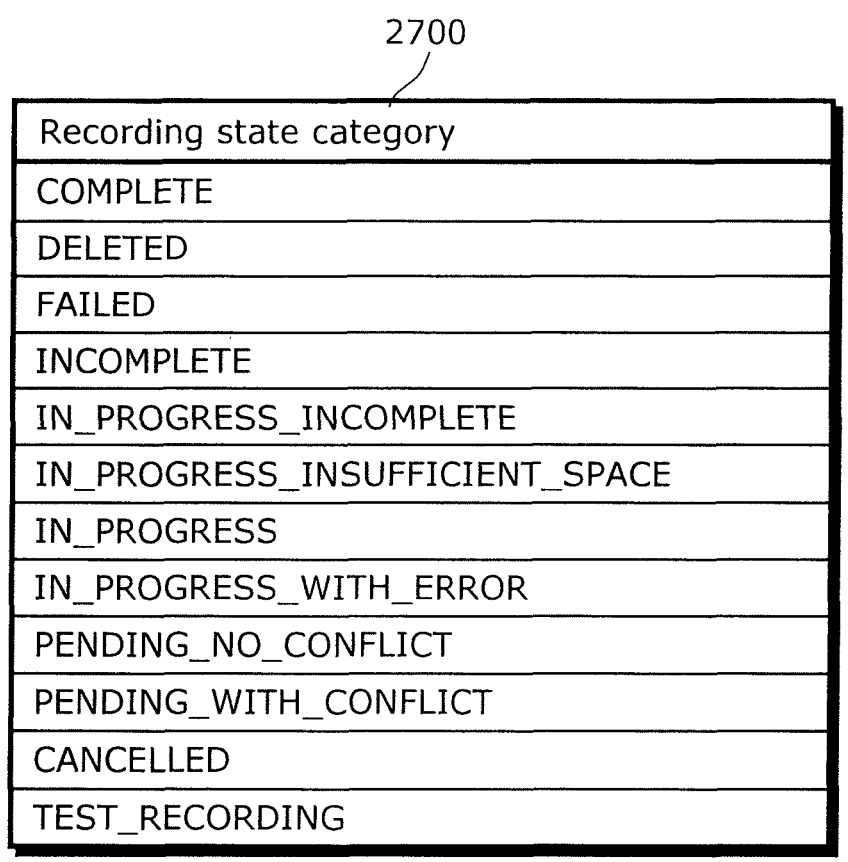
FIG. 12 illustrates the categories of recording states.

The categories of such recording states may be exemplified in FIG. 12.

FIG. 12 illustrates the categories of recording states defined for the OCAP DVR terminals. The recording states transit to each state according to a state of the continued recording. For more details of the state transition, the OCAP DVR Specification should be referred to. Since the categories of the state transition include a state at a pre-recording time, the recording registration unit 500 manages the state transition in Embodiment. However, the recording control unit 501 may manage the state transition. Although scheduled recording information is updated according to the state transition so that a part of scheduled recording information includes information of a recording state in Embodiment for the same reason above, the scheduled recording information may be managed as a part of recorded content information and updated according to the state transition.

In FIG. 12, for example: "COMPLETED" indicates a state in which content recording is completed; "DELETED" indicates a state in which a recorded content is deleted; "FAILED" indicates a state in which content recording ends in failure; "INCOMPLETE" indicates a state in which recording is incomplete; "IN_PROGRESS_INCOMPLETE" indicates a state in which divided-content recording is in progress; "IN_PROGRESS_INSUFFICIENT_SPACE" indicates a state in which recording a content in a storage region with an insufficient capacity is in progress; "IN_PROGRESS" indicates a state in which recording is in progress; "IN_PROGRESS_WITH_ERROR" indicates a state in which recording is interrupted before a recording end time; "PENDING_NO_CONFLICT" indicates a state in which no conflict occurs in a device necessary for recording, a predetermined time before a recording start time; "PENDING_WITH_CONFLICT" in which a conflict occurs in a device necessary for recording, a predetermined time before the recording start time; "CANCELLED" indicates a state in which (scheduled) recording is cancelled; and "TEST_RECORDING" indicates a state in which test recording is being performed.

The relay recording registration unit 503 temporarily reserves devices within the recording time upon receipt of scheduled recording information, such as a channel identifier, a recording start time, and a recording end time, a terminal ID of a video recording apparatus that has requested the scheduled relay recording, a corresponding record identifier, and a request ID for transmitting and receiving information to and from other video recording apparatuses on the network. Furthermore, the input information is stored. The operations of the relay recording registration unit 503 will be described in detail when operations of the relay recording manager 409 are described.

The service manager 408 manages playing of a service in the MPEG-2 transport streams that have been recorded in the secondary storage unit 204, or a service in the MPEG-2 transport streams to be inputted from the adapter 208. Furthermore, the service manager 408 manages playing of a service in the MPEG-2 transport streams to be received from the broadcast station system 100.

The following describes the operations for managing playing a service in the recorded MPEG-2 transport streams. The service manager 408 reserves devices to be used for playing a recorded service, and obtains a channel identifier corresponding to an object to be reproduced by a terminal corresponding to a specified record identifier, and information included in the recorded content information associated with the specified record identifier (for example, information of a recording destination and a series of media identifiers), with reference to scheduled recording information and recorded content information in the recording information management table 1200 created by the recording manager 407 as in FIG. 7.

Furthermore, the service manager 408 identifies a MPEG-2 transport stream identified by an initial media identifier from among the MPEG-2 transport streams stored in the secondary storage unit 204 as a recording destination, and instructs the library 416 to transmit the identified MPEG-2 transport stream from the secondary storage unit 204 to the TS decoder 212. Then, when the JMF 402 is provided with a channel identifier corresponding to an object to be reproduced, video and audio are multiplexed onto the MPEG-2 transport stream outputted from the secondary storage unit 204, and the service manager 408 starts playing the video and audio.

Furthermore, when providing the AM 403 with the channel identifier corresponding to an object to be reproduced, the service manager 408 starts and finishes executing the Java programs according to an Application Information Table (AIT) that is multiplexed onto the MPEG-2 transport stream. Then, the playing of the service is continued to the end of the MPEG-2 transport stream outputted from the secondary storage unit 204. When reproduction of the MPEG-2 transport stream identified by the media identifier ends and a MPEG-2 transport stream identified by the next media identifier is present, reproduction of the MPEG-2 transport stream identified by the next media identifier is started. Since the setting of the hardware and notification to the JMF 402 are completed, the MPEG-2 transport stream to be read from the secondary storage unit 204 has only to be changed. These processes are repeated until the playing of the MPEG-2 transport streams corresponding to all of the media identifiers recorded in recording a service of the specified channel identifier end.

In contrast, the following describes a case of managing playing of a service in the MPEG-2 transport streams to be received from the broadcast station system 100. In this case, the service manager 408 reserves devices to be used for playing a broadcast service, gives an instruction to each of the constituent elements of the hardware via the library 416, and starts playing the video and audio that are multiplexed onto the MPEG-2 transport stream, by providing the JMF 402 with the channel identifier corresponding to an object to be reproduced. Furthermore, when providing the channel identifier to be reproduced to the AM 403, the service manager 408 starts and finishes executing the Java programs according to the AIT that is multiplexed onto the MPEG-2 transport stream.

The network control manager 411 has a function of responding to a message coming from outside the terminal (the video recording and transmitting apparatus 102) via the network 104.

Figure 13:
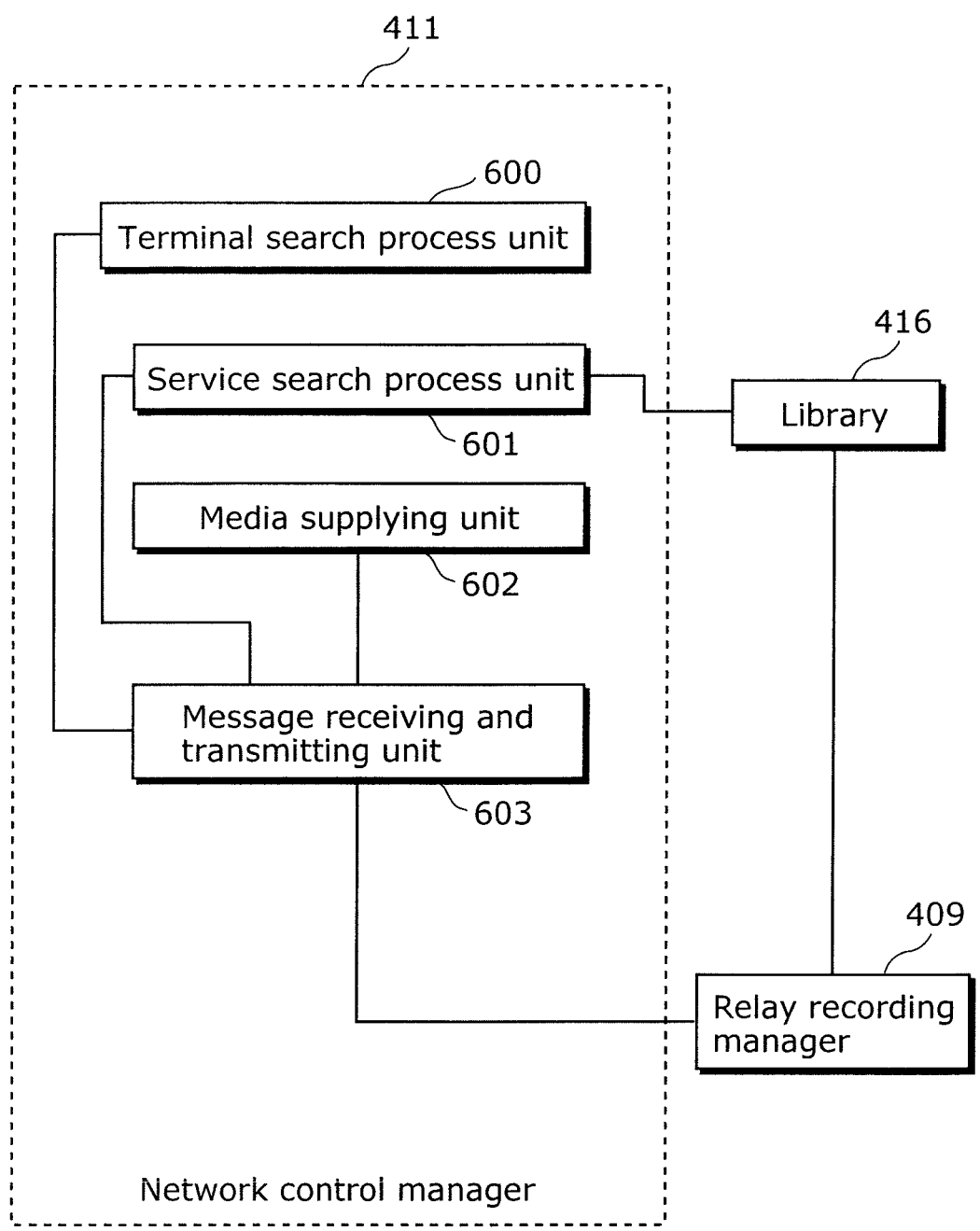
FIG. 13 illustrates an example of the configuration of the network control manager stored by the video recording and transmitting apparatus.

FIG. 13 illustrates a configuration of the network control manager 411. The network control manager 411 includes a terminal search process unit 600, a service search process unit 601, a media supplying unit 602, and a message receiving and transmitting unit 603.

The message receiving and transmitting unit 603 receives a message coming from outside the terminal via the network 104, and issues a process request to the terminal search process unit 600, the service search process unit 601, the media supplying unit 602, the device-conflict resolving manager 413, and the relay recording manager 409 according to the details of the message. The network control unit 209 included in a terminal (the video recording and transmitting apparatus 102) receives a signal modulated according to the MoCA standard and demodulates it to extract an IP packet sequence. The IP packets are transferred to a network protocol included in the library 416. According to the network protocol, a TCP packet is extracted by unarchiving the extracted IP packet sequence according to the TCP/IP protocol specification. Furthermore, an HTTP message is extracted by unarchiving the TCP packet according to the HTTP protocol specification. Conversely when the message receiving and transmitting unit 603 transmits a message, it IP-packetizes the message according to the HTTP/TCP/IP protocol using the library 416. Then, the network control unit 209 modulates the obtained IP packet according to the MoCA standard, and transmits the IP packet to a destination terminal.

In Embodiment, the DLNA specification is used for communication between terminals via the network 104. The DLNA is the acronym of Digital Living Network Alliance, and is a common specification used for reciprocal connection and control of home appliances via a network. The DLNA applies the UPnP specification for checking appliances on the network and for obtaining services. The UPnP is the acronym of Universal Plug and Play and is a common specification used for controlling terminals connected via a network. With the DLNA and UPnP, the HTTP protocol is applied for exchanging messages via a network. Then, commands defined by the DLNA and UPnP are packed into a HTTP message according to a specification, and the HTTP message is transmitted and received between terminals. For more details, the DLNA specification and UPnP specification should be referred to.

The message receiving and transmitting unit 603 transfers a command to one of the terminal search process unit 600, the service search process unit 601, the media supplying unit 602, the device-conflict resolving manager 413, and the relay recording manager 409, in response to the commands packed in the received HTTP message. One of the terminal search process unit 600, the service search process unit 601, the media supplying unit 602, the device-conflict resolving manager 413, and the relay recording manager 409 processes the command transferred from the message receiving and transmitting unit 603, and returns the result to the message receiving and transmitting unit 603. Then, the message receiving and transmitting unit 603 packs the result in the HTTP message according to the DLNA specification and UPnP specification, and transmits the HTTP message to a terminal to which the result should be transmitted. In Embodiment, a command included in an HTTP message received by the message receiving and transmitting unit 603 indicates (1) a process request category and (2) a terminal identifier of a terminal which has transmitted the message. Furthermore, the command may include other information as necessary.

The process request category may take any form as long as it is information that can identify a process request. When transferring the command of a program that executes a process to, for example, the media supplying unit 602, the message receiving and transmitting unit 603 also transfers the above indication of a process request category and an terminal identifier of the terminal which has transmitted the message. A process request here is a request for a process directly instructed by the user of a video recording apparatus or by a Java program of a video recording apparatus, or a request for a process that requires a terminal for playing, recording and/or streaming-transmission instructed by a different terminal via the network 104. The process requests handled by the message receiving and transmitting unit 603 are process requests issued from another terminal via the network 104, and include a process executed by a process execution program of the media supplying unit 602.

Furthermore, the message receiving and transmitting unit 603 transmits and receives commands to and from the relay recording manager 409 to perform relay recording. The details will be described later when the relay recording manager 409 is explained.

The terminal search process unit 600 processes a terminal search command. The terminal search command is, for example, a command for obtaining information on a terminal connected to the network 104. In receipt of the command, for example, the terminal search process unit 600 packs, in an HTTP message, information including a category of its own terminal including the terminal search process unit 600, and returns the HTTP message that packs the terminal search command to the terminal. When the HTTP message received by the message receiving and transmitting unit 603 is unarchived and the command included in the HTTP message is determined to be a terminal search command, the message receiving and transmitting unit 603 transfers the command to the terminal search process unit 600. Then, the terminal search process unit 600 checks which function its own terminal has, generates a response command indicating the result, and returns the response command to the message receiving and transmitting unit 603. The terminal search process unit 600 checks whether or not the terminal includes a recording function by checking whether or not the terminal includes hardware (for example, a secondary storage unit) including a recording function, and by checking information indicating the functions of the terminal (for example, recording function). The message receiving and transmitting unit 603 packs the response command in the HTTP message according to the DLNA specification and UPnP specification, and returns the HTTP message to a terminal that has transmitted the command.

The service search process unit 601 processes a recorded-service obtaining command for notifying other terminals of a recorded service held by its own terminal. When receiving the command, for example, the service search process unit 601 packs, in an HTTP message, information including the recorded service recorded in the secondary storage unit 204 of its own terminal, and returns the HTTP message including the recorded-service obtaining command to the terminal that has transmitted the HTTP message. For example, when the HTTP message received by the message receiving and transmitting unit 603 is unarchived and the command included in the HTTP message is determined to be a recorded-service obtaining command, the message receiving and transmitting unit 603 transfers the command to the service search process unit 601.

When a transmission terminal that transmits the HTTP message intends to perform relay recording, the service search process unit 601 obtains recorded-service information from the relay recording manager 409 (more specifically, a relay-recording content managing unit 702 to be described later), and returns the obtained information to the message receiving and transmitting unit 603 as a response command.

Furthermore, when the transmission terminal intends to view the recorded service recorded in its own terminal, the service search process unit 601 obtains the service recorded in the secondary storage unit 204 from the recording manager 407, and returns the service to the message receiving and transmitting unit 603 as a response command.

Figures 35, 36:
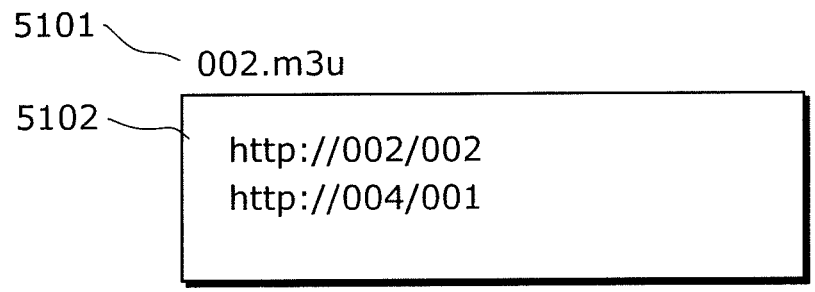
FIG. 35 illustrates an example of a relay recording play list.
FIG. 36 illustrates another example of the relay-recording scheduled information.

The recorded service information is a combination of, for example, the record identifiers 1201 of recorded services included in the recording information management table 1200 in FIG. 7; the channel identifier, the program number, the recording start time, the recording end time, and the recording time that are included in the scheduled recording information and that are associated with the record identifiers 1201; and a relay recording play list file name 5101 as shown in FIG. 35 to be described later. The relay recording play list will be described in detail later when the relay recording manager is explained.

Since the relay recording play list may be or may not be present, it is included in the combination of the recorded service information when being present. The service search process unit 601 returns combinations of information on all services recorded in a video recording apparatus to the message receiving and transmitting unit 603 as a list. In other words, as long as 2 services have been already recorded in the video recording and transmitting apparatus 102, the service search process unit 601 returns the response command including the information on the 2 services, to the message receiving and transmitting unit 603.

When a recorded service indicated by one record identifier includes recorded contents and the recorded contents are to be recorded by the same terminal, or when a recorded service indicated by one record identifier includes recorded contents and MPEG-2 transport streams each identified by a media identifier included in the recorded content information corresponding to at least 2 recorded contents out of the recorded contents are to be recorded by different terminals (in other words, when each information is recorded in a secondary storage device of a terminal, separately), the service search process unit 601 returns a sum of length of the recorded contents identified by the media identifiers each indicated in the recording content information corresponding to the record identifier to the message receiving and transmitting unit 603 as a media length. The message receiving and transmitting unit 603 packs the information in the HTTP message according to the DLNA specification and UPnP specification, and transmits the HTTP message to the terminal that has transmitted the command.

The service search process unit 601 included in the video recording and transmitting apparatus 102 does not basically include a recorded service that has been taken over in the relay recording, in a list to be returned to a terminal that has issued an inquiry. However, the service search process unit 601 may return recorded service information that has been taken over in the relay recording to a terminal that has issued an inquiry, and may return the information added with division recording information in that case.

Although a play list for relay recording is provided as a part of recorded service information here, the play list may be managed as a play list for use normally in the UPnP specification and may be provided to a terminal that has issued an inquiry.

The media supplying unit 602 includes a function of obtaining, from the secondary storage unit 204, media corresponding to recorded services requested by other terminals connected to the network 104, in other words, a part of or all of the MPEG-2 transport streams included in the recorded services, and of transmitting the MPEG-2 transport streams to a terminal that has issued the request as a play list.

For example, when the message receiving and transmitting unit 603 determines that a command included is a command for obtaining a part of or all of the MPEG-2 transport streams as a result of unarchiving the received HTTP message, the message receiving and transmitting unit 603 transfers the command to the media supplying unit 602.

For example, when a command indicates the record identifier 001 of a recorded service, and first and last byte positions that are desirably obtained, and the command is a command for obtaining a corresponding portion of the recorded MPEG-2 transport streams, the message receiving and transmitting unit 603 transfers the command to the media supplying unit 602.

The media supplying unit 602 obtains the media identifiers 1405, 1502, and 1602 respectively in the recorded content information d121 to d123 that correspond to the record identifier 001, with reference to the recording information management table 1200 in FIG. 7, for example. The media identifiers 1405, 1502, and 1602 indicate files of the recorded MPEG-2 transport streams. For example, when accepting the command for the media supplying unit 602, the media supplying unit 602 concatenates the MPEG-2 transport streams each identified by the media identifiers 1405, 1502, and 1602, and the concatenated MPEG-2 transport streams are stored in the primary storage unit 205. When there is only one media identifier indicated in the recorded content information corresponding to a record identifier, such concatenation is obviously not necessary. The media supplying unit 602 obtains TS packet data indicated from the first byte position to the last byte position indicated by the command, from a file corresponding to the concatenated MPEG-2 transport streams through accessing the file using the library 416, and returns the obtained information to the message receiving and transmitting unit 603.

Although the command indicates the record identifier 001 of the recorded service and first and last byte positions as an example of the command for obtaining the corresponding portion of the recorded MPEG-2 transport streams in the aforementioned case, the present invention is not limited to this. For example, the command may indicate a record identifier of a recorded service, a playing time, and the size.

For example, when the command for obtaining the corresponding portion of the recorded MPEG-2 transport streams indicates the record identifier 001 of the recorded service, the playing time "00:26", and the size "100 Mbyte", the command indicates a request for obtaining the MPEG-2 transport stream corresponding to the size "100 Mbyte" from the play position of the playing time "00:26" of the record identifier 001.

Upon acceptance of the command by the media supplying unit 602, the media supplying unit 602 checks the record identifier with the recorded content information d121, d122, and d123. As a result, the media supplying unit 602 identifies the playing position of "00:26" in the MPEG-2 transport stream corresponding to the media identifier "TS_122" of the recorded content information d122, obtains TS packet data indicated in the identified playing position and having the size indicated by the command through accessing the file using the library 416, and returns the obtained information to the message receiving and transmitting unit 603. The message receiving and transmitting unit 603 packs the information returned by the media supplying unit 602 (a part of the MPEG-2 transport streams or all byte data) according to the DLNA specification and UPnP specification, and returns the HTTP message to a terminal that has transmitted the command. The media supplying unit 602 further includes a function of transmitting a broadcast service and a video on demand (VoD) service that are received by a video recording apparatus to a terminal that has issued a request, in response to the request from the terminal.

The EPG 412 is the acronym of electric program guide, and includes a function of allowing the user to select a television program to be recorded or played.

Furthermore, the EPG 412 includes a function of selecting a broadcast service and playing the service. Since the functions are generally well known and are not so relevant to the present invention, they are simply described hereinafter.

When a television program is recorded, the EPG 412 displays a broadcast program list, and allows the user to select a television program to be desirably recorded.

Figure 14:
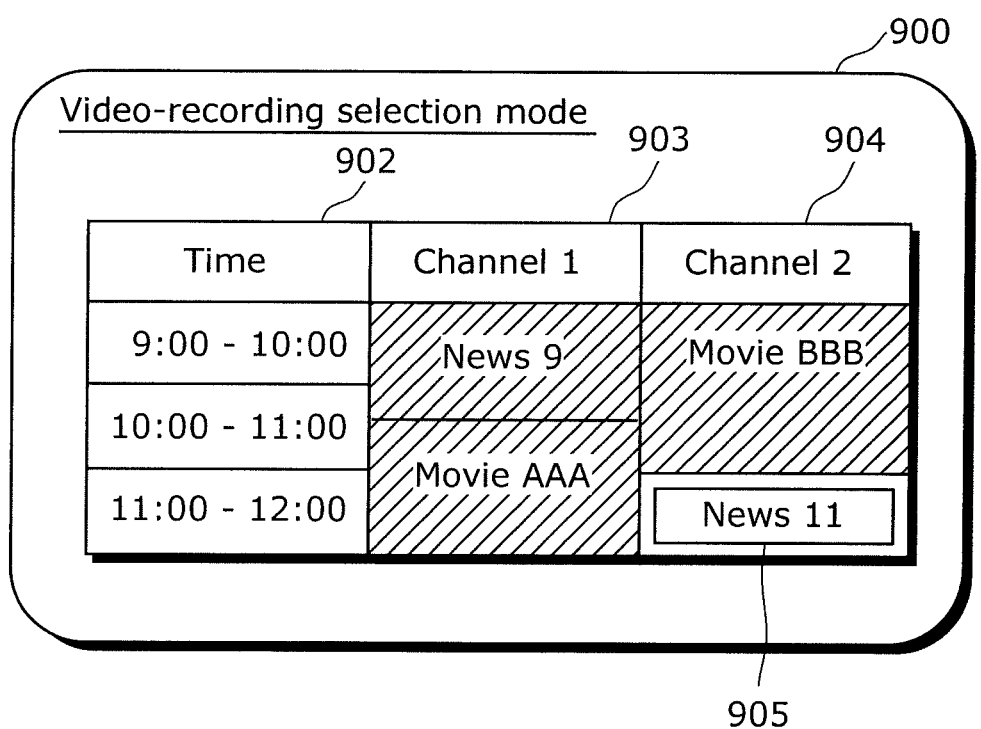
FIG. 14 illustrates an example of the EPG executed by the video recording and transmitting apparatus.

FIG. 14 illustrates an example of a displayed screen for a user to select a television program to be desirably recorded. A time period 902 and channels 903 and 904 are displayed in a grid pattern to enable the user to view a list of television programs that can be recorded in each time in the channels 903 and 904. The user can shift a focus 905 on the screen using the up-cursor button 301, the down-cursor button 302, the right-cursor button 303, and the left-cursor button 304 included in the input unit 207 of the video recording and transmitting apparatus 102. When the user further presses the OK button 307, the television program indicated by the focus 905 is selected as an object to be recorded. The EPG 412 knows the channel identifier of the selected television program by obtaining it from the library 416. Thus, upon selection of a television program to be recorded by the user, the EPG 412 notifies the recording registration unit 500 included in the recording manager 407 of the channel identifier, the broadcast start time, and the broadcast end time of the television program.

In contrast, when a recorded television program is played, the EPG 412 displays a recorded broadcast program list, and allows the user to select a television program to be desirably played.

Figure 15:
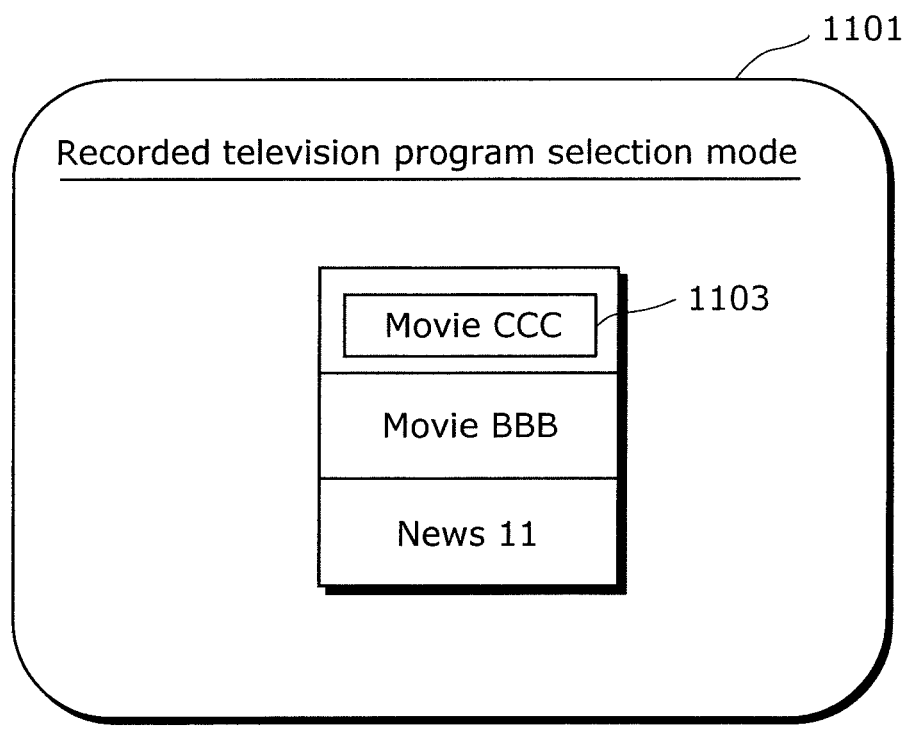
FIG. 15 illustrates another example of the EPG executed by the video recording and transmitting apparatus.

FIG. 15 illustrates an example of a displayed screen for a user to select a recorded television program. On the screen, the television programs recorded in the secondary storing unit 204 are displayed in a list. The user can shift a focus 1103 on the screen using the up-cursor button 301 and the down-cursor button 302 included in the input unit 207 of the video recording and transmitting apparatus 102. When the user further presses the OK button 307, the television program indicated by the focus 1103 is selected as an object to be played.

The EPG 412 knows the record identifier of the selected television program by obtaining it from the recording manager 407. Thus, upon selection by the user of a television program to be played, the EPG 412 notifies the service manager 408 of the record identifier of the television program. The service manager 408 reads the television program from the secondary storing unit 204 based on the information, and plays the television program.

The relay recording manager 409 includes a function of performing relay recording in the case of remote scheduled recording, and managing information relating to the relay recording. Thus, when the received HTTP message is a command for instructing the remote scheduled recording, the message receiving and transmitting unit 603 transfers the command to the relay recording manager 409. Then, the relay recording manager 409 transfers the information to the recording registration unit 500, and obtains an identifier identifying the scheduled recording. Next, the relay recording manager 409 returns the identifier to the message receiving and transmitting unit 603. The message receiving and transmitting unit 603 packs the information including the identifier returned by the relay recording manager 409, in an HTTP message according to the DLNA specification and UPnP specification, and returns the HTTP message to a terminal that has transmitted the command.

Figure 16:
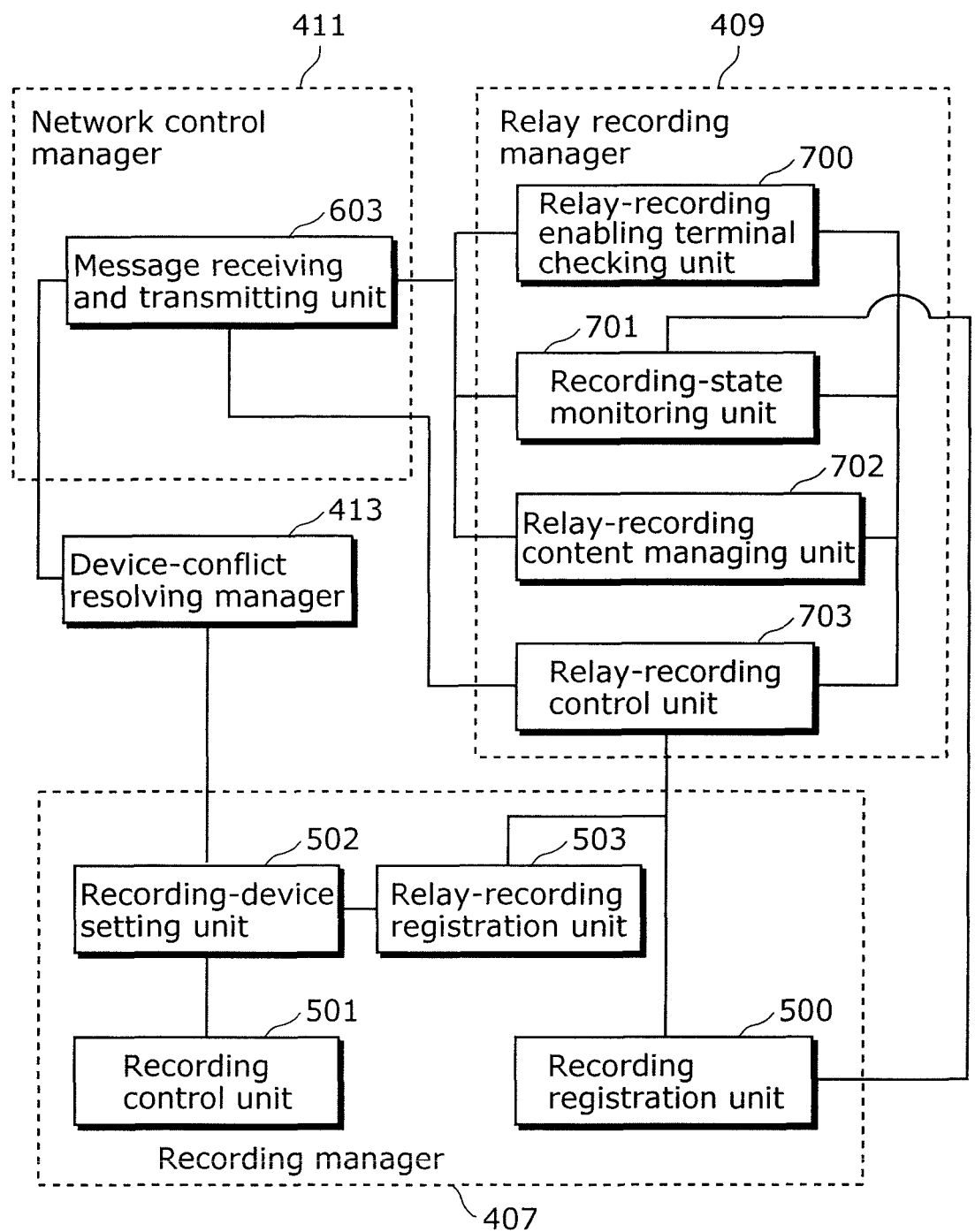
FIG. 16 illustrates an example of the configuration of the relay recording manager stored by the video recording and transmitting apparatus.

FIG. 16 illustrates an example of a configuration of the relay recording manager 409.

As illustrated in FIG. 16, the relay recording manager 409 includes a relay-recording enabling terminal checking unit 700, a recording-state monitoring unit 701, a relay-recording content managing unit 702, and a relay-recording control unit 703. The details of each of the constituent elements are described using the terminal-to-terminal network communication system 105 illustrated in FIG. 1 as an example.

The constituent elements of the relay recording manager 409 are described by assuming the video recording and transmitting apparatus 102a as a video recording apparatus that requests relay recording and the video recording and transmitting apparatus 102b as a video recording apparatus to be a relay-recording destination.

Figure 17:
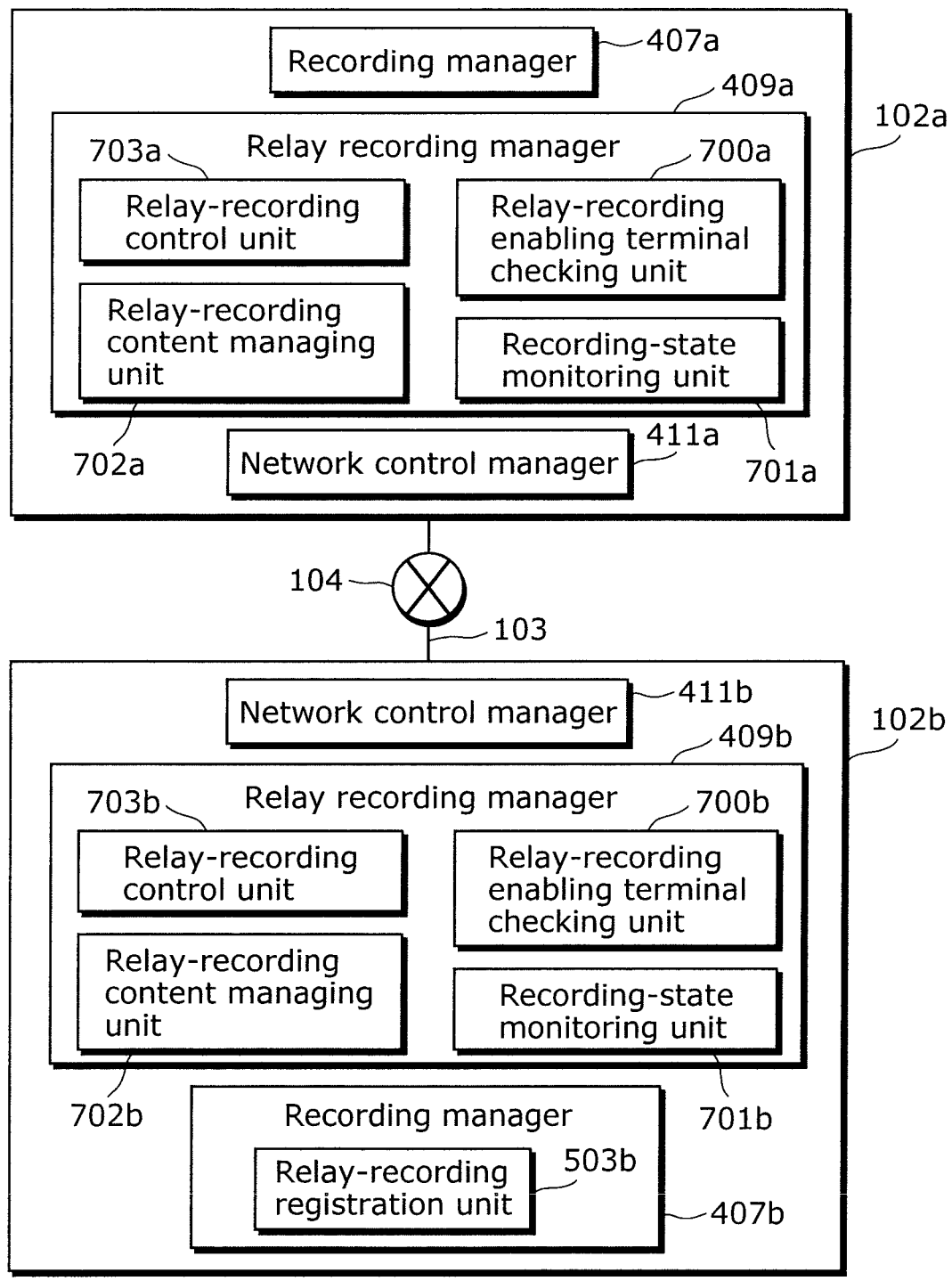
FIG. 17 illustrates an example of a configuration of software that is relevant to the relay recording and that is stored by each of the video recording and transmitting apparatuses on the network.

FIG. 17 illustrates a configuration relevant to the relay recording between the video recording and transmitting apparatuses 102a and 102b. In other words, FIG. 17 illustrates an example of the configuration of the relay recording manager 409 and other processing units relevant to the relay recording between the video recording and transmitting apparatuses 102a and 102b. Since the video recording and transmitting apparatuses 102a and 102b are both video recording apparatuses, each includes the relay recording manager 409 in FIG. 16. FIG. 17 illustrates the processing units indispensable to the relay recording performed by the video recording apparatuses 102a and 102b.

First, information to be transmitted and received (transmission and reception information) between the video recording and transmitting apparatus 102a and the video recording and transmitting apparatus 102b will be described for performing the relay recording.

FIG. 18 illustrates an example of categories of transmission and reception information.

FIG. 18 shows that information IDs are allocated to each information, such as: 001 to recording availability inquiry information 2801; 002 to recording availability response information 2802; 003 to relay-recording scheduled information 2803; 004 to continued recording inquiry information 2804; 005 to recording-state information 2805; 006 to relay-recording-state information 2806; 007 to content search request information 2807; and 008 to search result notifying information 2808. The information IDs of the transmission and reception information are not limited to these. As long as the information can be identified as unique information, any information may be used.

FIGS. 19 to 26 illustrate examples of such transmission and reception information. FIG. 19 illustrates an example of the recording availability inquiry information 2801. FIG. 20 illustrates an example of the recording availability response information 2802. FIG. 21 illustrates an example of the relay-recording scheduled information 2803. FIG. 22 illustrates an example of the continued recording inquiry information 2804. FIG. 23 illustrates an example of the recording-state information 2805. FIG. 24 illustrates an example of the relay-recording-state information 2806. FIG. 25 illustrates an example of the content search request information 2807. FIG. 26 illustrates an example of the search result notifying information 2808. Each information in FIGS. 19 to 26 holds an information ID for identifying an information category. The information IDs correspond to the IDs 001 to 008 shown in FIG. 18. Furthermore, each information in FIGS. 19 to 26 also holds a request ID for transmitting and receiving information to and from other video recording apparatuses on the network 104. Furthermore, each information also holds a transmission terminal ID of the terminal that has transmitted information. Hereinafter, information held other than the information ID, the request ID, and the transmission terminal ID will be described.

FIG. 19 illustrates the example of the recording availability inquiry information 2801. The recording availability inquiry information 2801 is information for which the video recording and transmitting apparatus 102a that requests relay recording inquires of other video recording apparatuses on the network whether or not relay recording is possible. The recording availability inquiry information 2801 includes: an information ID 2901 for identifying its own information (FIG. 18 shows that 001 indicates the recording availability inquiry information 2801); a request ID 2902; a transmission terminal ID 2903 (the terminal in this case is the video recording and transmitting apparatus 102a and FIG. 1 shows the transmission terminal ID of the video recording and transmitting apparatus 102a as 002); a recording start time 2904; a recording end time 2905; and a channel identifier 2906. The recording start time 2904, the recording end time 2905, and the channel identifier 2906 are scheduled recording information to be transmitted by the receiving and playing apparatus 101 to perform remote scheduled recording.

The video recording and transmitting apparatus 102a packs the recording availability inquiry information 2801 in FIG. 19, in an HTTP message according to the DLNA specification and UPnP specification, and returns the HTTP message to a video recording apparatus that includes a recording function (the video recording and transmitting apparatus 102b in this case) in order to perform relay recording.

Upon receipt of the recording availability inquiry information 2801 from the video recording and transmitting apparatus 102a via the network 104, the video recording and transmitting apparatus 102b (more specifically, a relay recording manager 409b) determines whether or not the relay recording is possible, and transmits the resulting information that is the recording availability response information 2802 to a message receiving and transmitting unit 603b. The message receiving and transmitting unit 603b packs the recording availability response information 2802 in an HTTP message according to the DLNA specification and UPnP specification, and returns the HTTP message to the video recording and transmitting apparatus 102a that requests relay recording.

FIG. 20 illustrates the example of the recording availability response information 2802. The recording availability response information 2802 is information to be notified by a video recording apparatus that has received the recording availability inquiry information 2801 to a video recording apparatus that inquires whether or not relay recording is possible.

The recording availability response information 2802 includes: an information ID 3000 for identifying its own information (FIG. 18 shows that 002 indicates the recording availability inquiry information 2802); a request ID 3001; a transmission terminal ID 3002 (the terminal in this case is the video recording and transmitting apparatus 102b and FIG. 1 shows the terminal ID of the video recording and transmitting apparatus 102b as 004); information 3003 indicating whether or not relay recording can be taken over (information indicating that relay recording is possible in the case of FIG. 20).

When the video recording and transmitting apparatus 102a that requests relay recording (more specifically, a relay recording manager 409a) receives the recording availability response information 2802 indicating that the relay recording is possible as shown in FIG. 20 from the video recording and transmitting apparatus 102b via the network, the video recording and transmitting apparatus 102a transmits the relay-recording scheduled information 2803 that is information for registering the relay recording to the message receiving and transmitting unit 603b so that the video recording and transmitting apparatus 102b can perform relay recording in case recording is interrupted due to a malfunction occurring inside its own terminal, such as power shutdown. The message receiving and transmitting unit 603a packs the relay-recording scheduled information 2803 in an HTTP message according to the DLNA specification and UPnP specification, and returns the HTTP message to the video recording and transmitting apparatus 102b to be a relay-recording destination.

FIG. 21 illustrates the example of the relay-recording scheduled information 2803. The relay-recording scheduled information 2803 includes: an information ID 3100 for identifying its own information (FIG. 18 shows that 003 indicates the relay-recording scheduled information 2803); a request ID 3102; a transmission terminal ID 3103 (the terminal in this case is the video recording and transmitting apparatus 102a and FIG. 1 shows the terminal ID of the video recording and transmitting apparatus 102a as 002); a recording start time 3104; a recording end time 3105; a channel identifier 3106; and a record identifier 3107. The recording start time 3104, the recording end time 3105, and the channel identifier 3106 are information identical to those in the recording availability inquiry information 2801.

Furthermore, the record identifier 3107 is a record identifier allocated to a content corresponding to scheduled recording information by a video recording apparatus identified by the transmission terminal ID 3101. In this case, the record identifier 3107 indicates that a content to be recorded according to scheduled recording information d13 corresponding to the record identifier 002 is subject to the relay recording, in the recording information management table 1200 in FIG. 7.

When the video recording and transmitting apparatus 102b to be a relay-recording destination (more specifically, a relay recording manager 409b) receives the relay-recording scheduled information 2803, it enters standby mode for a time period between the recording start time 3104 and the recording end time 3105 included in the relay-recording scheduled information 2803 while reserving resources necessary for recording a service identified by the channel identifier 3106, such as a tuner.

Here, the video recording and transmitting apparatus 102b to be a relay-recording destination generates the continued recording inquiry information 2804 that is information inquiring whether or not the recording is continued in a video recording apparatus that has requested the relay recording (the video recording and transmitting apparatus 102a in this case). Then, the message receiving and transmitting unit 603b packs the continued recording inquiry information 2804 in an HTTP message according to the DLNA specification and UPnP specification, and returns the HTTP message to a video recording apparatus that has requested the relay recording (the video recording and transmitting apparatus 102a in this case).

FIG. 22 illustrates the example of the continued recording inquiry information 2804. The continued recording inquiry information 2804 is inquiry information for checking whether or not the video recording apparatus that has requested the relay recording continues to record a service. The continued recording inquiry information 2804 includes: an information ID 3200 for identifying its own information (FIG. 18 shows that 004 indicates the continued recording inquiry information 2804); a request ID 3201; a transmission terminal ID 3203 (the terminal in this case is the video recording and transmitting apparatus 102b and FIG. 1 shows the terminal ID of the video recording and transmitting apparatus 102b as 004); and a record identifier 3204.

The record identifier 3204 is a record ID of a content registered to be recorded by a video recording apparatus that has requested relay recording. In this case, the record identifier 3204 indicates an identifier of a content to be recorded according to the scheduled recording information corresponding to the record identifier 002 in the recording information management table 1200 in FIG. 7.

When the video recording and transmitting apparatus 102a that requests relay recording (more specifically, the relay recording manager 409a) receives the continued recording inquiry information 2804 in FIG. 22 via the network 104, the video recording and transmitting apparatus 102a generates the recording-state information 2805 for notifying a current recording state. Then, the message receiving and transmitting unit 603a packs the continued recording inquiry information 2804 in an HTTP message according to the DLNA specification and UPnP specification, and returns the HTTP message to a video recording apparatus that has requested the relay recording (the video recording and transmitting apparatus 102b in this case).

FIG. 23 illustrates the example of the recording-state information 2805. The recording-state information 2805 is information for notifying a current recording state by a video recording apparatus that has received the continued recording inquiry information 2804. The recording-state information 2805 includes: an information ID 3300 for identifying its own information (FIG. 18 shows that 005 indicates the recording-state information 2805); a request ID 3301; a transmission terminal ID 3302 (the terminal in this case is the video recording and transmitting apparatus 102a and FIG. 1 shows the terminal ID of the video recording and transmitting apparatus 102a as 002); and a recording state 3303. The example shown in FIG. 23 includes information "IN_PROGRESS" indicating that the video recording and transmitting apparatus 102a is recording a service. The recording state 3303 varies according to a state of recording in the video recording and transmitting apparatus 102a.

In the aforementioned example, the video recording and transmitting apparatus 102a that requests relay recording receives the continued recording inquiry information 2804, and returns the recording-state information 2805 to the video recording and transmitting apparatus 102b to be a relay-recording destination. However, the present invention is not limited to this. For example, when recording is interrupted in the video recording and transmitting apparatus 102a that requests relay recording, the video recording and transmitting apparatus 102a may generate the recording-state information 2805 and return it to the video recording and transmitting apparatus 102b to be a relay-recording destination.

When the recording state 3303 included in the recording-state information 2805 transmitted via the network 104 from the video recording and transmitting apparatus 102a that requests relay recording indicates that the video recording and transmitting apparatus 102a cannot record a service, the video recording and transmitting apparatus 102b to be a relay-recording destination (more specifically, the relay recording manager 409b) reserves resources necessary for recording a service identified by the channel identifier 3106, such as a tuner, and takes over the recording (performs relay recording) that should originally be done by the video recording and transmitting apparatus 102a.

Here, the video recording and transmitting apparatus 102b to be a relay-recording destination (more specifically, the relay recording manager 409b) generates the relay-recording-state information 2806 that is information for notifying the video recording apparatus that requests the relay recording of a state of the relay recording when recording of the video recording and transmitting apparatus 102a that requests the relay recording is interrupted and the video recording and transmitting apparatus 102b takes over the recording. Then, the message receiving and transmitting unit 603b packs the relay-recording-state information 2806 in an HTTP message according to the DLNA specification and UPnP specification, and returns the HTTP message to a video recording apparatus that has requested the relay recording (the video recording and transmitting apparatus 102a in this case).

FIG. 24 illustrates the example of the relay-recording-state information 2806. The relay-recording-state information 2806 includes: an information ID 3500 for identifying its own information (FIG. 18 shows that 006 indicates the relay-recording-state information 2806); a request ID 3501; a transmission terminal ID 3502 (the terminal in this case is the video recording and transmitting apparatus 102b and FIG. 1 shows the terminal ID of the video recording and transmitting apparatus 102b as 004); a relay-requesting-terminal record identifier 3503 (002 in FIG. 24); a relay-destination-terminal record identifier 3504; and a recording state 3503.

The relay-requesting-terminal record identifier 3503 is a record ID of a content registered to be recorded by a video recording apparatus that has requested relay recording. The relay-destination-terminal record identifier 3504 is a record ID of a content registered to be recorded by a video recording apparatus that requests relay recording in order to continue the recording. In FIG. 24, the relay-destination-terminal record identifier 3504 indicates that the content indicated by the recorded content information corresponding to the record identifier 001 is a recorded content to be taken over, in the recording information management table 1200 held in the video recording and transmitting apparatus 102b.

The recording state 3505 represents a recording state of a content identified by the relay-destination-terminal record identifier 3504, and indicates that the recorded content identified by the record identifier 001 (MPEG-2 transport stream) is being recorded in the case of FIG. 24. The recording state varies according to a recording state.

In Embodiment, when the recording state included in the recording-state information 2805 to be transmitted via the network 104 from the video recording and transmitting apparatus 102a that requests relay recording indicates that the video recording and transmitting apparatus 102a cannot record a service, the video recording and transmitting apparatus 102b that takes over the recording (more specifically, the relay recording manager 409b) performs relay recording. Furthermore, assuming the power shutdown in the video recording and transmitting apparatus 102a that requests relay recording, unless receiving the recording-state information 2805 after a predetermined time from the transmission of the continued recording inquiry information 2804, for example, the video recording and transmitting apparatus 102b that takes over the recording determines that the video recording and transmitting apparatus 102a cannot continue the recording due to the power shutdown and performs the relay recording.

The video recording and transmitting apparatus 102a that has suspended the recording generates the content search request information 2807 that is information inquiring whether or not a relay-recorded content is present. Then, the message receiving and transmitting unit 603a packs the content search request information 2807 in an HTTP message according to the DLNA specification and UPnP specification, and returns the HTTP message to a video recording apparatus that has accepted a request for the relay recording (the video recording and transmitting apparatus 102b in this case).

FIG. 25 illustrates the example of the content search request information 2807. The content search request information 2807 is information inquiring about whether or not another relay-recorded content is present, when such a content is present in the video recording and transmitting apparatus 102b. The content search request information 2807 includes: an information ID 4900 for identifying its own information (FIG. 18 shows that 007 indicates the content search request information 2807); a request ID 4901; a transmission terminal ID 4902 (the terminal in this case is the video recording and transmitting apparatus 102a and FIG. 1 shows the terminal ID of the video recording and transmitting apparatus 102a as 002); a record identifier 4903; and an inquired terminal ID 4904. The record identifier 4903 is a record identifier identifying a recorded content to be desirably confirmed whether or not to be relay-recorded. In this example, the record identifier 4903 corresponds to 002 in the recording information management table 1200 held by the video recording and transmitting apparatus 102a and shown in FIG. 7. The inquired terminal ID 4904 is a terminal ID of a video recording apparatus that accepts an inquiry about searching for a relay-recorded content. In this example, the inquired terminal ID 4904 corresponds to the terminal ID 004 of the video recording and transmitting apparatus 102b.

The video recording and transmitting apparatus 102b that has received the content search request information 2807 checks whether or not its own terminal includes a relay-recorded content in association with the record identifier 4903 included in the content search request information 2807, and generates the search result notifying information 2808 that is information indicating a result of the search. Then, the message receiving and transmitting unit 603b packs the search result notifying information 2808 in an HTTP message according to the DLNA specification and UPnP specification, and returns the HTTP message to a video recording apparatus that has requested the relay recording (the video recording and transmitting apparatus 102a in this case).

FIG. 26 illustrates the example of the search result notifying information 2808. The search result notifying information 2808 includes: an information ID 5000 for identifying its own information (FIG. 18 shows that 008 indicates the search result notifying information 2808); a request ID 5001; a transmission terminal ID 5002 (the terminal in this case is the video recording and transmitting apparatus 102b and FIG. 1 shows the terminal ID of the video recording and transmitting apparatus 102b as 004); a content presence-or-absence information 5003; a record identifier 5004; a recording start time 5005; a recording end time 5006; and a recording time 5007.

The content presence-or-absence information 5003 is information indicating whether or not a relay-recorded content is present. In this case, the content presence-or-absence information 5003 indicates the presence of the relay-recorded content in association with the record identifier 4903 included in the content search request information 2807. Furthermore, when the content presence-or-absence information 5003 indicates the absence of a relay-recorded content, no information is held as the record identifier 5004, the recording start time 5005, the recording end time 5006, and the recording time 5007 (or information indicating that no information is held in the content presence-or-absence information 5003). The record identifier 5004 is a record identifier associated with recorded content information relevant to the relay-recorded content, and is held, for example, in the recording information management table 1200 of the video recording and transmitting apparatus 102b.

Figure 27:
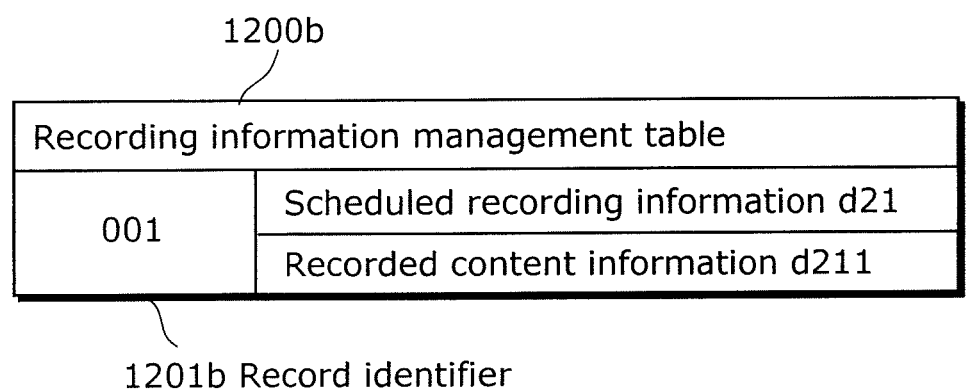
FIG. 27 illustrates an example of a recording information management table.

FIG. 27 illustrates an example of a recording information management table held by the video recording and transmitting apparatus 102b. A recording information management table 1200b includes a record identifier 1201b, and scheduled recording information d21, and recorded content information d211 that are associated with the record identifier 1201b, as in the recording information management table 1200 in FIG. 7.

FIG. 28 illustrates an example of the scheduled recording information d21 held by the video recording and transmitting apparatus 102b.

The scheduled recording information d21 includes a recording start time 2301, a recording end time 2302, a channel identifier 2303, a program number 2304, and a recording state 2305, as in the scheduled recording information d12 in FIG. 8.

FIG. 29 illustrates an example of the recorded content information d211 held by the video recording and transmitting apparatus 102b.

The recorded content information d211 includes a recording destination, a recording size, a recording time 2401, a recording bit rate, and a media identifier 2402 as the recorded content information d121 to d123 in FIGS. 9 to 11. The recorded content information d211 is associated with division recording information dd21.

In other words, the record identifier 5004 included in the search result notifying information 2808 indicates that a MPEG-2 transport stream identified by the media identifier 2402 (see FIG. 29) of the recorded content information d211 associated with the record identifier 1201b"001" is a relay-recorded content in the recording information management table 1200b (see FIG. 27).

Furthermore, the recording start time 5005 and the recording end time 5006 indicate a time when the relay recording has started and a time when the relay recording ends, respectively in the search result notifying information 2808 in FIG. 26. The recording time 5007 shows a period of time during which the relay recording has been performed.

In the aforementioned example, when the relay recording is completed, the relay recording manager 409 packs the recorded content information identified by a relay-destination-terminal record identifier in an HTTP message according to the DLNA specification and UPnP specification (using the message receiving and transmitting unit 603b), and returns the HTTP message to a video recording apparatus that has requested the relay recording (the video recording and transmitting apparatus 102a in this case).

Next, functions of the relay recording manager 409a of the video recording and transmitting apparatus 102a that requests relay recording will be described. Here, the content corresponding to the record identifier 002 in the recording information management table 1200 of FIG. 7 is assumed to be a content to be relay-recorded.

FIG. 30 illustrates an example of the scheduled recording information d13 associated with the record identifier 002 in the recording information management table 1200.

The scheduled recording information d13 includes a recording start time 1700, a recording end time 1701, a channel identifier 1702, a program number 1703, a recording state 1704, and a relay-recording requested terminal ID 1705.

FIG. 31 illustrates an example of recorded content information d131 associated with the record identifier 002 in the recording information management table 1200.

The recorded content information d131 includes a recording destination, a recording size, a recording time 1801, a recording bit rate, and a media identifier 1802. Here, the recorded content information d131 is associated with division recording information dd13.

The relay-recording control unit 703a includes a function of transmitting and receiving information to and from each constituent elements and a function of assessing each information so as to enable relay recording. When receiving scheduled recording information including a channel identifier, a recording start time, and a recording end time from the message receiving and transmitting unit 603 and determining information as scheduled recording information, the relay-recording control unit 703a notifies the recording registration unit 500 of the information, and receives the corresponding record identifier.

Next, the relay-recording control unit 703a transfers a request ID and the scheduled recording information to a relay-recording enabling terminal checking unit 700a in order to search for a terminal that can perform relay recording. Then, the relay-recording enabling terminal checking unit 700a transmits the request ID and scheduled recording information to video recording apparatuses on the network. Then, upon receipt of video-recording availability information from the relay-recording enabling terminal checking unit 700a, in the case where the recording is interrupted, the relay-recording control unit 703a selects a video recording apparatus that takes over the recording based on the received information. Here, a terminal that first replies to the inquiry may be selected, or a terminal may be selected based on additional information, such as the remaining capacity in a storage region, to be added with the recording availability response information 2802 in FIG. 20. When selecting a video recording apparatus based on such additional information, a certain waiting period may be set so that the recording availability response information 2802 of each of video recording apparatuses can be assessed.

When selecting a video recording apparatus that takes over the recording, the relay-recording control unit 703a transfers the request ID, the terminal ID of the video recording apparatus, and the corresponding record identifier to the relay-recording enabling terminal checking unit 700a and the recording state monitoring unit 701a. Furthermore, the relay-recording control unit 703a stores the relay-recording requested terminal ID 1705 (in this example, 004 is stored as the relay-recording requested terminal ID 1705 to request the video recording and transmitting apparatus 102b to perform relay recording) in association with the scheduled recording information d13 as in FIG. 30.

The relay-recording enabling terminal checking unit 700a includes a function of generating and reading a message for searching for a terminal and a function of generating a relay-recording scheduled message in order to enable the video recording and transmitting apparatus present on the network 104 to take over the recording (relay recording) when the recording is interrupted in the video recording and transmitting apparatus 102a. Upon receipt of scheduled recording information from the relay-recording control unit 703a, the relay-recording enabling terminal checking unit 700a generates the recording availability inquiry information 2801, and transfers the recording availability inquiry information 2801 to the message receiving and transmitting unit 603a so as to transmit it to the terminals present on the network 104. Then, upon receipt of the recording availability response information 2802 via the message receiving and transmitting unit 603a, the relay-recording enabling terminal checking unit 700a transfers the recording availability response information 2802 to the relay-recording control unit 703a. Furthermore, the relay-recording enabling terminal checking unit 700a also transfers to the relay-recording control unit 703a the additional information, such as the remaining capacity of a storage region held in the video recording apparatus that replies to the recording availability inquiry information 2801 for reference when selecting a video recording apparatus that takes over the recording.

Furthermore, upon receipt of a request ID and a terminal ID from the relay-recording control unit 703a, the relay-recording enabling terminal checking unit 700a generates the relay-recording scheduled information 2803 based on the scheduled recording information relevant to the request ID, the terminal ID received from the relay-recording control unit 703a, and the record identifier, and transmits the relay-recording scheduled information 2803 to the message receiving and transmitting unit 603a.

The recording state monitoring unit 701a includes a function of monitoring a content to be scheduled to be recorded by its own terminal and a recording state of a content that has been relay-recorded on the network 104 to update the recording-state information 2805. The recording state monitoring unit 701a issues a request to the recording registration unit 500a for notifying change in a state of the content upon receipt of a record identifier from the relay-recording control unit 703a. Furthermore, after determining a video recording apparatus that is scheduled to take over the recording, upon receipt of the request ID, the terminal ID of the video recording apparatus, and the corresponding record identifier from the relay-recording control unit 703a, the recording state monitoring unit 701a stores the information.

Upon receipt of a notification of starting the recording from the recording registration unit 500a, the recording state monitoring unit 701a transfers the recording state to the message receiving and transmitting unit 603a as the recording-state information 2805 as well as the held request ID, the terminal ID, and the record identifier and transmits the information to the video recording and transmitting apparatus 102b.

Furthermore, the recording state monitoring unit 701a also stores information of change in a recording state to be notified from the recording registration unit 500a as well as the corresponding request ID, the terminal ID and the record identifier. Upon receipt of the continued recording inquiry information 2804 from the message receiving and transmitting unit 603a, the recording state monitoring unit 701a transfers the recording-state information 2805 to the message receiving and transmitting unit 603a. The recording state monitoring unit 701a may transfer to the message receiving and transmitting unit 603a the recording-state information 2805 each time the recording state monitoring unit 701a receives the continued recording inquiry information 2804 from the message receiving and transmitting unit 603a. Alternatively, the recording state monitoring unit 701a may transfer to the message receiving and transmitting unit 603a the recording-state information 2805 at regular intervals, and transmit the information to the video recording and transmitting apparatus 102b.

There are cases where the recording state monitoring unit 701a receives the relay-recording-state information 2806. In other words, when the notification of change in the recording state received from the recording registration unit 500a indicates a state of interrupted recording, in other words, IN_PROGRESS_WITH_ERROR, and when another video recording apparatus on the network 104 takes over the recording, the recording state monitoring unit 701a receives the relay-recording-state information 2806 via the message receiving and transmitting unit 603a. Here, when the notification indicates IN_PROGRESS_INSUFFICIENT_SPACE and the recording is continued with the determination by the video recording and transmitting apparatus 102b before the recording is interrupted, the recording state monitoring unit 701a may receive the relay-recording-state information 2806 via the message receiving and transmitting unit 603a.

Upon notification of the start of relay recording in a video recording apparatus (in this case, the video recording and transmitting apparatus 102b) present on the network 104 from the recording state monitoring unit 701a, the relay-recording control unit 703a generates division recording information, and stores it in association with the recorded content information d131 as in FIG. 31. Here, the relay-recording control unit 703a may generate the division recording information when the video recording and transmitting apparatus 102b is determined to perform relay recording in advance or tentatively so as to support power shutdown in the video recording and transmitting apparatus 102a.

FIG. 32 illustrates an example of division recording information generated by the relay-recording control unit 703a.

Division recording information dd13 indicates the presence and absence of: relay recording; anterior division; and posterior division, and includes division-recording identification information d13A in association with the anterior division or the posterior division when the relay recording is present.

FIG. 33 illustrates an example of the division-recording identification information d13A included in the division recording information dd13.

The division-recording identification information d13A includes a terminal ID of a video recording apparatus having a content that has been relay-recorded (for example, the terminal ID 001 of the video recording and transmitting apparatus 102b).

Although the division-recording identification information d13A holds only the terminal ID in FIG. 33, a record identifier to be taken over may be held based on the information. Furthermore, when the recording is interrupted before the recording end time, the recording state notified from the recording registration unit 500a is described as IN_PROGRESS_WITH_ERROR. However, when the recording state of the content is transmitted to the receiving and playing apparatus 101, the recording state may be described as IN_PROGRESS_INCOMPLETE.

When the recording state received from the video recording and transmitting apparatus 102b (recording registration unit 500b) is IN_PROGRESS_WITH_ERROR, the recording state monitoring unit 701a may transfer the record identifier and the recording state to the relay-recording control unit 703a, and the relay-recording control unit 703a may request the relay-recording enabling terminal checking unit 700a to search for a terminal that takes over the recording. When there is any change in a terminal that has been requested to perform relay recording, the division recording information dd13 in FIG. 32 and the division-recording identification information d13A in FIG. 33 are updated through these processes.

The described is the operations for performing relay recording when the relay-recording control unit 703a receives recording information from the message receiving and transmitting unit 603a. Furthermore, when the recording registration unit 500a transfers scheduled recording information to the relay-recording control unit 703a and receives a request of scheduled recording from the Java API, the same relay recording may be performed. Furthermore, when the recording registration unit 500a transfers scheduled recording information to the relay-recording control unit 703a, the record identifiers 1201 is also transferred together with the scheduled recording information to prevent the relay-recording control unit 703a from registering scheduled recording to the recording registration unit 500a again.

The relay-recording content managing unit 702a includes a function of transmitting a request for obtaining a corresponding content when a recorded content is relay-recorded, and a function of generating a relay recording play list based on the received relay-recorded content. The relay-recording content managing unit 702a obtains the recording information management table 1200 from the recording registration unit 500a when receiving a recorded service list obtainment request from the message receiving and transmitting unit 603a. The recording information management table 1200 may be obtained when activating a terminal or a server function, or when the receiving and playing apparatus 101 issues a request for obtaining a content list, not when receiving the content search request information 2807, and may be held in the relay-recording content managing unit 702b. When recorded content information of a recorded service includes division recording information, the relay-recording content managing unit 702a transfers the terminal ID included in the division recording information and the record identifier of the content to the message receiving and transmitting unit 603a, and requests the terminal having the terminal ID to check whether or not a content that has been relay-recorded is present. Then, when obtaining, for example, the search result notifying information 2808 in FIG. 26 from the message receiving and transmitting unit 603a, the relay-recording content managing unit 702a checks the content presence-or-absence information 5003. When the content presence-or-absence information 5003 indicates "presence", the relay-recording content managing unit 702a generates a table in association with relay-recorded content as in FIG. 34, and stores the table.

FIG. 34 illustrates an example of relay recording service information in association with a content that has been originally scheduled to be recorded and a content that has been relay-recorded.

The relay recording service information sd13 includes a play list file name 4801, a track number 4802, a terminal ID 4803, a record identifier 4804, a program number 4805, a recording start time 4806, a recording end time 4807, and a recording time 4808 in FIG. 34.

For example, the relay recording service information sd13 indicates that the content identified by "1" of the track number 4802 (content identified by 002 of the terminal ID 4803 and the record identifier 002) is followed by the content identified by "2" of the track number 4802 (content identified by 004 of the terminal ID 4803 and the record identifier 001).

Furthermore, the relay recording content managing unit 702a generates a relay recording play list.

FIG. 35 illustrates an example of a relay recording play list.

A relay recording play list 5100 includes a relay recording play list file name 5101 and a play list 5102 including addresses.

Each of the addresses in the play list 5102 includes a terminal ID and a record identifier. The addresses in this case are an address including the terminal ID 002 and the record identifier 002, and an address including the terminal ID 004 and the record identifier 001 that are shown in FIG. 34.

These addresses are examples, and include information that can identify a terminal and a recorded content. Furthermore, "002.m3u" is used as the relay recording play list file name 5101 in FIG. 35. This file name is obtained by adding "m3u" that is generally used as an extension of a play list to the record identifier "002". The file name and the extension can be changed as long as they can be shared between a video recording apparatus and a playing apparatus.

Here, the relay recording play list 5100 specifies the terminal ID 002 and the record identifier 002 of the video recording and transmitting apparatus 102*a* to which the relay-recorded content is stored, and the terminal ID 004 and the record identifier 001 of the video recording and transmitting apparatus 102*b*. However, the relay recording play list 5100 may be set for redirecting information to another destination by describing the address of the video recording and transmitting apparatus 102*a* in replacement of the address of the video recording and transmitting apparatus 102*b*, and describing information for selecting the video recording and transmitting apparatus 102*b* and the record identifier 001 in a part pointed by the address. Furthermore, although the relay recording content managing unit 702*a* generates a relay recording play list upon receipt of a recorded service list obtainment request herein, it may generate a relay recording play list at a recording end time and at anytime.

Furthermore, the relay recording content managing unit 702*a* generates a relay recording play list for a relay-recorded content, it may generate a relay recording play list for all of the contents. In this case, a play list for a content that is not relay-recorded includes only an address of the content. Furthermore, the relay recording content managing unit 702*a* may generate and manage a play list not only for a relay-recorded content but also for a content to be divided into media by a single terminal and be recorded, for example, a recorded content of the record identifier 001 of the record identifiers 1201 in FIG. 7.

In the process of generating a play list, a recorded service can be handled as a content present in a storage region in a single terminal, by copying or moving the recorded service.

Next, functions of the relay recording manager 409*b* of the video recording and transmitting apparatus 102*b* that takes over the recording will be described.

Upon receipt of scheduled recording information 2803 including the scheduled recording information, the terminal ID of a terminal that requests relay recording, and the relay-requesting-terminal record identifier, and the request ID from the relay-recording enabling terminal checking unit 700*a*, the relay-recording control unit 703*b* transfers the information to a relay-recording registration unit 503*b*. The relay-recording registration unit 503*b* generates relay-recording scheduled information 2100 as in FIG. 36, based on the received information, and holds the relay-recording scheduled information 2100.

When a recording state is a state of notifying start of recording, the relay-recording control unit 703*b* generates the continued recording inquiry information 2804 for monitoring the recording-state information 2805 of the video recording and transmitting apparatus 102*a*, and transfers the continued recording inquiry information 2804 to the message receiving and transmitting unit 603. Here, the state of notifying start of recording is described as IN_PROGRESS and IN_PROGRESS_INSUFFICIENT_SPACE in FIG. 12. Since the recording has not been started in the case of IN_PROGRESS_WITH_ERROR described as the recording state, the relay-recording control unit 703*b* obtains the relay-recording scheduled information 2100 held in the relay-recording registration unit 503*b* and transfers to the recording registration unit 500*b* information of the scheduled recording in which the recording start time has been updated to the current time.

Furthermore, when receiving the relay-recording scheduled information 2803 via the message receiving and transmitting unit 603*b*, the relay-recording registration unit 503*b* generates the relay-recording scheduled information 2100 and transfers it to the relay-recording control unit 703*b*. When receiving the recording availability inquiry information 2801 from the message receiving and transmitting unit 603*b*, the relay-recording enabling terminal checking unit 700*b* transfers the request ID and the scheduled recording information to the relay-recording control unit 703*b*. Then, the relay-recording enabling terminal checking unit 700*b* transfers the recording availability response information 2802 to the message receiving and transmitting unit 603*b* when receiving the request ID and the video-recording availability information via the relay-recording control unit 703*b*.

When receiving the recording-state information 2805 via the message receiving and transmitting unit 603*b*, the recording state monitoring unit 701*b* transfers the recording-state information 2805 to the relay-recording control unit 703*b*. Then, the relay-recording control unit 703*b* checks the received recording state. When the recording is interrupted, the relay-recording control unit 703*b* obtains the relay-recording scheduled information 2803 held by the relay-recording registration unit 503*b*, and transfers to the recording registration unit 500*b* information of the scheduled recording in which the recording start time has been updated to the current time. The recording registration unit 500*b* generates the scheduled recording information d21 shown in FIG. 28, and transfers the record identifier to the relay-recording control unit 703*b*.

Furthermore, when relay recording is started, the recording control unit 501*b* generates the recorded content information d211 in FIG. 29, and updates the recording information management table 1200*b* in association with the record identifier. Furthermore, the recording state monitoring unit 701*b* receives the record identifier from the relay-recording control unit 703*b*, and starts monitoring the recording state.

Furthermore, the recording state monitoring unit 701*b* transfers the relay-recording-state information 2806 via the message receiving and transmitting unit 603*b* to notify the video recording apparatus that has requested the relay recording (video recording and transmitting apparatus 102*a*) of the information. The relay-recording-state information 2806 may be transmitted at regular intervals, or may be transmitted when the video recording apparatus that has requested the relay recording issues the request.

A result of the relay recording is written into the relay recording information (the recording information management table 1200*b*). FIG. 28 illustrates an example of the scheduled recording information d21 held in the recording information management table 1200*b*. In this example, the relay-recording control unit 703*b* checks the received recording state to determine that the recording is interrupted at 15:30. Then, the relay-recording control unit 703*b* obtains the relay-recording scheduled information 2100 held by the relay-recording registration unit 503*b*, and transfers to the recording registration unit 500*b* the relay-recording scheduled information 2100 in which the recording start time (15:00) has been updated to the current time (15:30) for the scheduled recording. The example in FIG. 28 indicates that the relay recording has been started at 15:30, it has been ended at 16:00, the channel identifier of the content that has been relay-recorded is 1, the program number is 101, and the recording state is COMPLETE (relay recording is completed).

FIG. 29 illustrates an example of the recorded content information d211 corresponding to a content that has been relay-recorded according to the scheduled recording information. The recorded content information d211 includes volume B as a recording destination, 400 Mbyte as a recording size, 00:30 as a recording time, "high" as a recording bit rate, and TS_211 as a media identifier, and is associated with the division recording information dd21.

FIG. 37 illustrates an example of the division recording information dd21. The division recording information dd21 indicates that: the relay recording is "present"; the anterior division indicating that a current content followed by a content is "present" (in other words, the division-recording identification information d21B); and the posterior division indicating a content following a current content is "absent".

FIG. 38 illustrates an example of the division-recording identification information d21B. The division-recording identification information d21B includes the terminal ID 002 and the record identifier 002.

The record content corresponding to the record identifier 001 in FIG. 27 can be identified as a content of the record identifier 002 that has been relay-recorded by the terminal ID 002 with reference to FIGS. 29, 37, and 38.

When reaching a recording end time, or when a recording state of the recording-state information 2805 received from the message receiving and transmitting unit 603b indicates the completion of recording, the relay-recording control unit 703b requests the relay-recording registration unit 503b to abandon the relay-recording scheduled information 2803.

The relay-recording content managing unit 702b receives the content search request information 2807 from the message receiving and transmitting unit 603b. The relay-recording content managing unit 702b obtains the recording information management table stored in its own terminal from the recording registration unit 500b. The recording information management table 1200 may be obtained when activating a terminal or a server function, or when the receiving and playing apparatus 101 issues a request for obtaining a content list, not when receiving the content search request information 2807, and may be held in the relay-recording content managing unit 702b.

The relay-recording content managing unit 702b searches, for example, the recording information management table 1200b shown in FIG. 27 for a recorded service including the division recording information dd21 including: the terminal ID of the video recording apparatus that inquires the relay recording; and the relay-requesting-terminal record identifier. For example, when a content corresponding to the division recording information including the terminal ID 002 and the record identifier 002 of the content to be taken over is inquired and such content is found, the relay-recording content managing unit 702b transfers the search result notifying information 2808 shown in FIG. 26 to the message receiving and transmitting unit 603b. Unless the content is found, the relay-recording content managing unit 702b transfers information indicating that the request ID, the terminal ID, and the corresponding content are not found to the message receiving and transmitting unit 603b. The message receiving and transmitting unit 603b transmits the received information to the terminal that has issued the inquiry.

FIG. 26 illustrates the example of the search result notifying information 2808 when a relay-recorded content is present. In the search result notifying information 2808 in FIG. 26, the information ID 5000 indicates 008 corresponding to the category of search result notifying information in FIG. 18, the transmission terminal ID 5002 indicates 004 that is a terminal ID of its own terminal, the record identifier 5004 indicates 001 in FIG. 27, the recording start time 5005 indicates 2007/4/2 15:30 that is the time when the relay recording has been started as in FIG. 28, the recording end time indicates 2007/4/2 16:00 that is the time when the relay recording has been ended as in FIG. 28, and the recording time indicates 00:30.

Although a recording time is equal to a period of time between a relay-recording start time and a relay-recording end time as an example herein, there are cases where the recording time is not equal to the period of time between the relay-recording start time and the relay-recording end time due to the delay in the actual recording start time caused by the operations for starting the relay recording.

Next, the configuration and the functions of the receiving and playing apparatus 101 in Embodiment will be described in detail.

Figure 39:
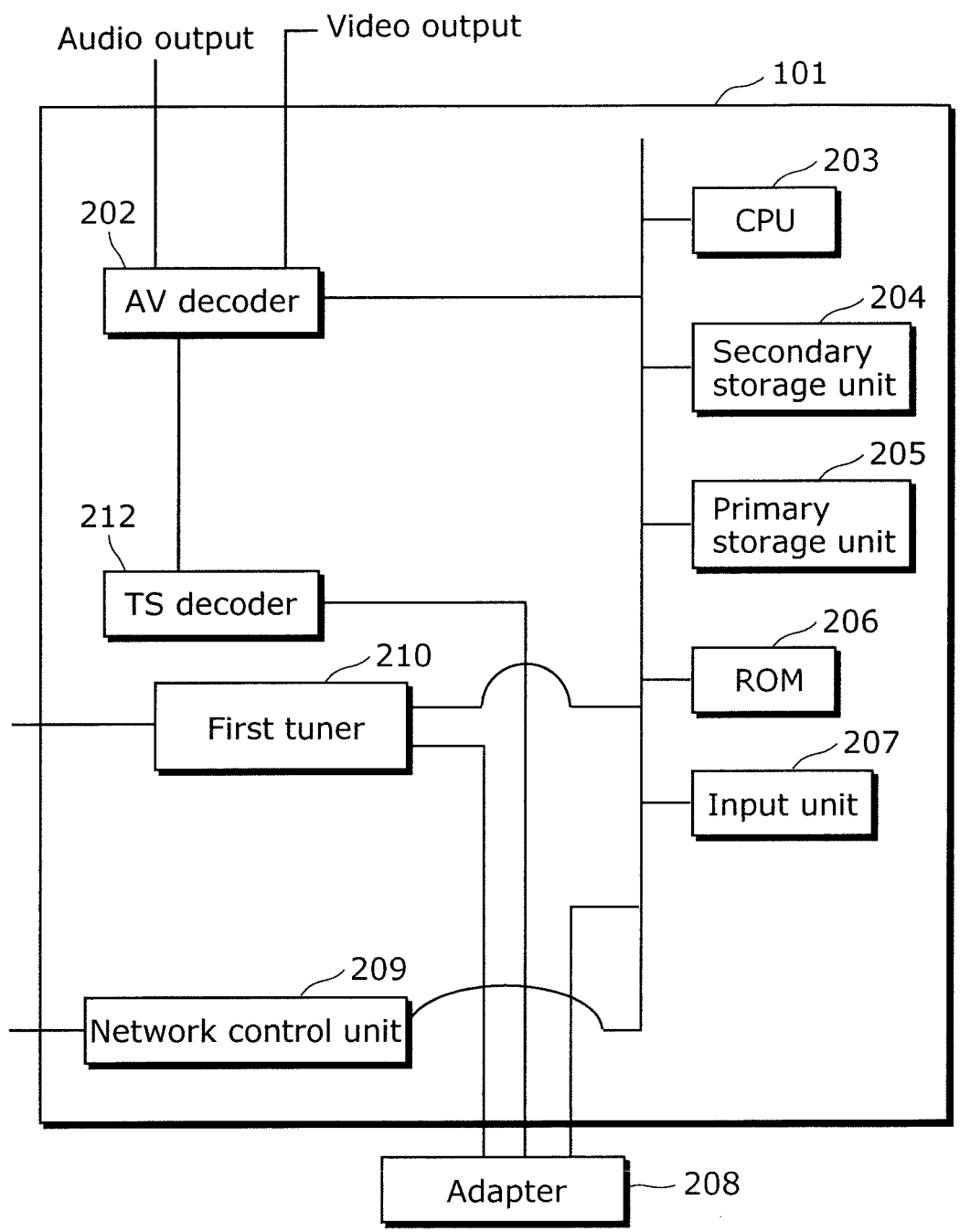
FIG. 39 illustrates an example of a hardware configuration of the receiving and playing apparatus.

FIG. 39 is a block diagram illustrating a general hardware configuration of the receiving and playing apparatus 101 in Embodiment. In other words, the configuration in FIG. 39 is the specific internal configuration of the receiving and playing apparatus 101 in FIG. 1. The receiving and playing apparatus 101 includes the first tuner 210, the secondary storage unit 204, the AV decoder 202, the TS decoder 212, the CPU 203, the primary storage unit 205, the ROM 206, the input unit 207, the adapter 208, and the network control unit 209.

Since the constituent elements included in FIG. 39 have the same functions as those elements included in the video recording and transmitting apparatus 102 in FIG. 2 and are labeled with the same reference numerals thereof, the description is omitted hereinafter. In other words, each of the first tuner 210, the secondary storage unit 204, the AV decoder 202, the TS decoder 212, the CPU 203, the primary storage unit 205, the ROM 206, the input unit 207, the adapter 208, the network control unit 209, an audio output, and a video output has the same element name and function as those elements in the video recording and transmitting apparatus 102. Since the receiving and playing apparatus 101 does not includes a function of recording a broadcast service, the secondary storage unit 204 does not record any MPEG-2 transport stream. Although the receiving and playing apparatus 101 includes one tuner as a general configuration, it may include two or more tuners.

Hereinafter, control over playing a service by the Java program and control over playing a service inputted via the network 104 that are main functions of a playing terminal of the present invention will be described.

Playing a service by the receiving and playing apparatus 101 of the present invention corresponds to receiving a service multiplexed onto a broadcast wave, and playing and executing video, audio, and a Java program that are included in the service, according to synchronization information of the Java program. Playing a service inputted via the network 104 corresponds to playing and executing video, audio, and a Java program that are included in the service, according to synchronization information of the Java program, instead of receiving a broadcast wave and playing the service. The result of receiving the broadcast wave and playing the service is necessary to be almost the same as the result of playing the service inputted via the network 104.

Figure 40:
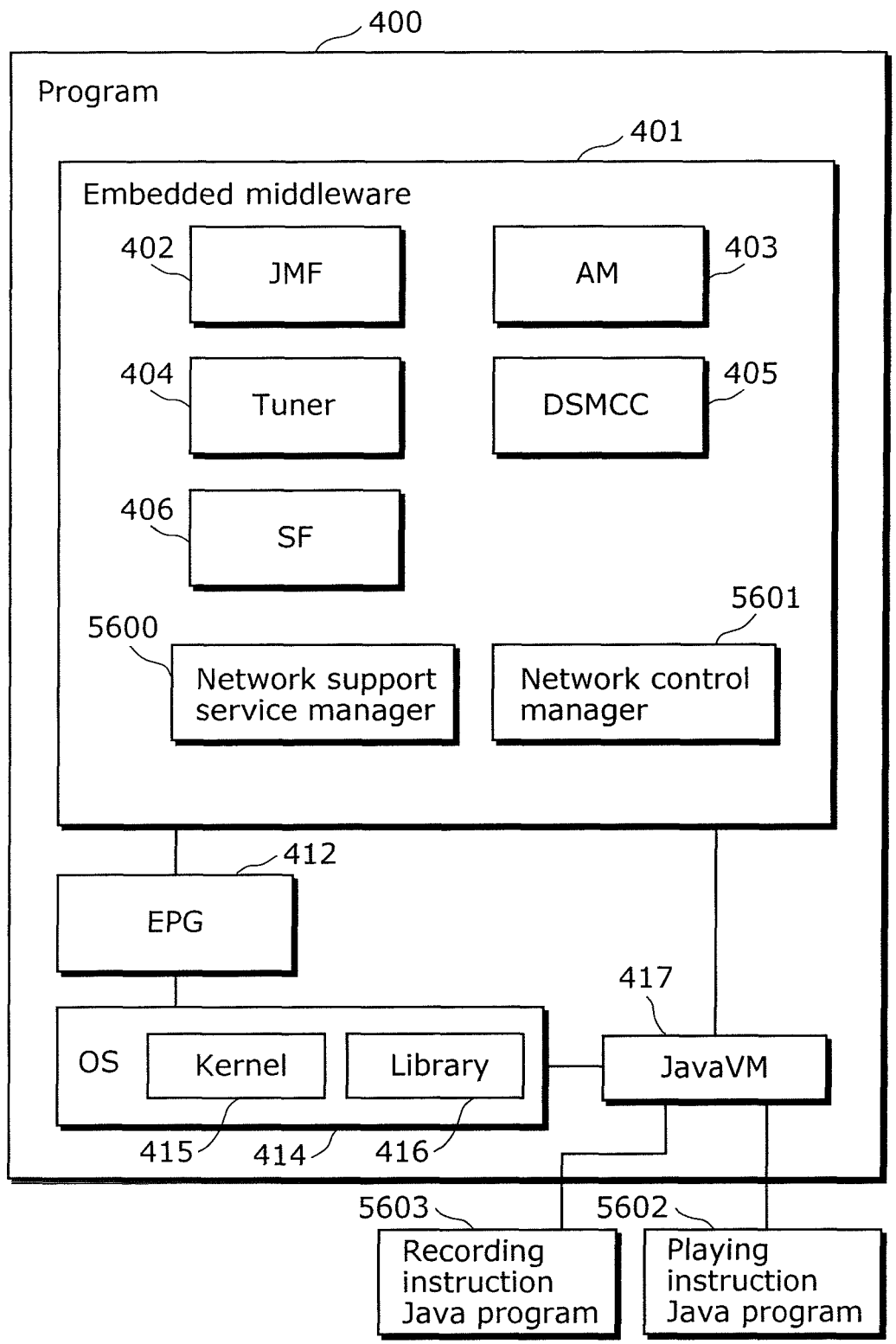
FIG. 40 illustrates an example of a software configuration of the receiving and playing apparatus.

FIG. 40 illustrates a configuration of a program necessary for control over playing a service by the Java program and for control over playing a service inputted via the network 104. The program 400 is the software stored in the ROM 206.

A program 400 includes the OS 414 that is a sub-program, the Java VM 417, the embedded middleware 401, and the EPG 412.

Since the Java VM 417 has the same element name and function as the Java VM 417 in the video recording apparatus in Embodiment, the description is omitted hereinafter.

The EPG 412 obtains a list of broadcast services using a function of a service listing unit 5705 to be described later. Then, the EPG 412 displays the list of broadcast services on a screen, and allows the user to select one of the services as the EPG of the video recording and transmitting apparatus 102. The selected broadcast service is played using a function of a service switching unit 5704.

The OS 414 is the same as the OS 414 included in the video recording and transmitting apparatus 102 of Embodiment. The kernel 415 included in the OS 414 is the same as the kernel 415 included in the video recording and transmitting apparatus 102 of Embodiment. Although the library 416 included in the OS 414 is the same as the library 416 included in the video recording and transmitting apparatus 102 of Embodiment, the library 416 does not read and write a MPEG-2 transport stream to and from a storage unit for recording a service due to the fact that the receiving and playing apparatus 101 is a playing apparatus.

The embedded middleware 401 has almost the same function as that of the embedded middleware 401 included in the video recording and transmitting apparatus 102 of Embodiment. The embedded middleware 401 includes the JMF 402, the AM 403, the tuner 404, the DSMCC 405, the SF 406, a network support service manager 5600, and a network control manager 5601.

Since the JMF 402, the AM 403, the tuner 404, the DSMCC 405, and the SF 406 have the same functions as each of those elements having the same names and included in the video recording and transmitting apparatus 102, the description is omitted hereinafter.

The network support service manager 5600 has a function of receiving a reply from a terminal other than the receiving and playing apparatus 101 by transmitting a message thereto via the network 104. The network support service manager 5600 is mainly used for transmitting a message to the video recording and transmitting apparatus 102 and receiving necessary data or the recorded MPEG-2 transport stream.

Figure 41:
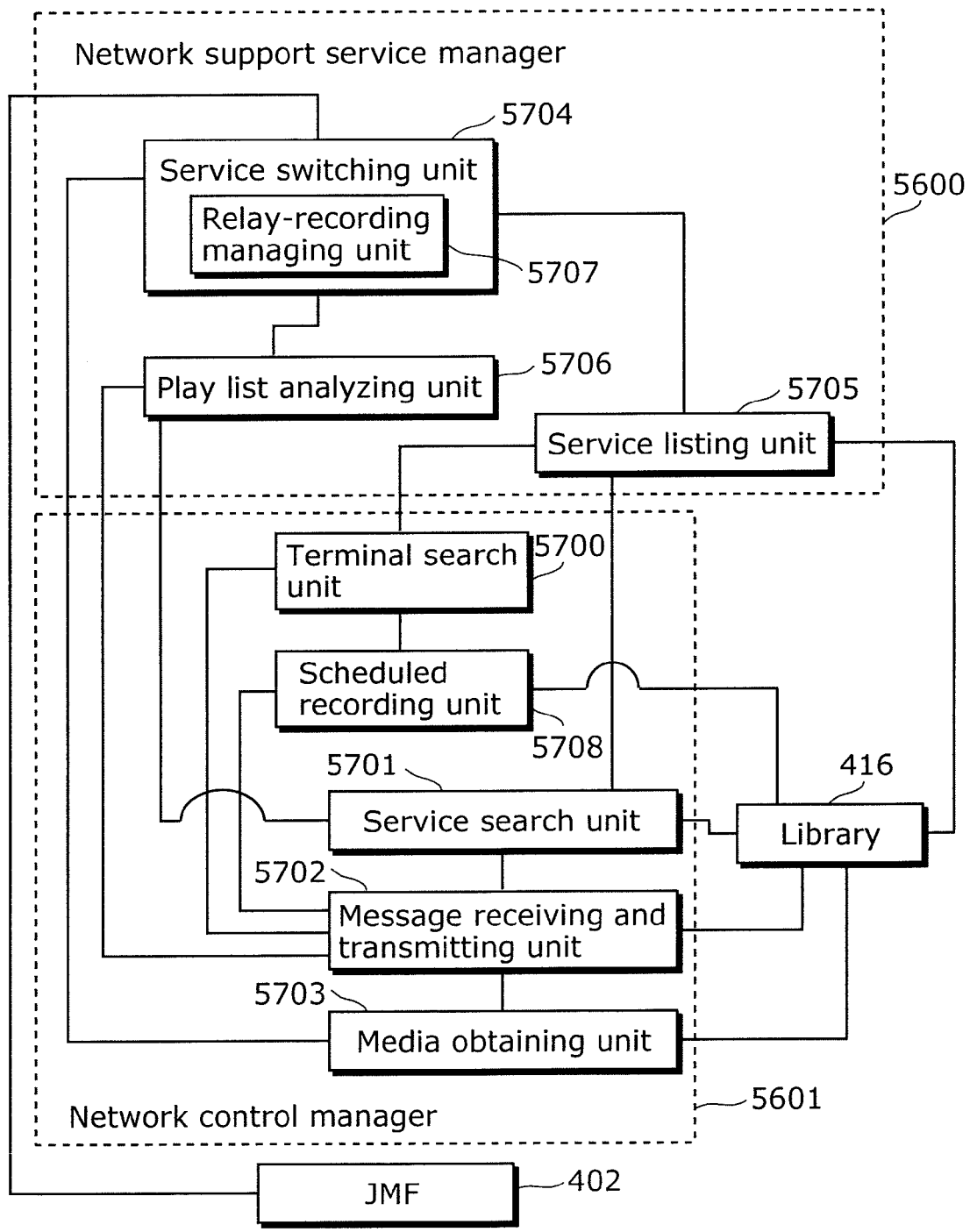
FIG. 41 illustrates a configuration of the network control manager and the network support service manager of the receiving and playing apparatus.

FIG. 41 illustrates a configuration of the network control manager 5601 and the network support service manager 5600. The network control manager 5601 includes a terminal search unit 5700, a service search unit 5701, a media obtaining unit 5703, a message receiving and transmitting unit 5702, and a scheduled recording unit 5708.

The message receiving and transmitting unit 5702 accepts a message generated by the terminal search unit 5700, the service search unit 5701, the media obtaining unit 5703, and the scheduled recording unit 5708, and transmits the message to outside the receiving and playing apparatus 101. Since the message is transmitted and received using the HTTP protocol, the message receiving and transmitting unit 5702 IP-packetizes the message according to the HTTP/TCP/IP protocol using the library 416. Then, the network control unit 209 included in the receiving and playing apparatus 101 modulates the obtained IP packet according to the MoCA standard, and transmits the IP packet to a destination terminal. Conversely, when the network control unit 209 receives the IP-packetized message, the library 416 unarchives the IP packet according to the HTTP/TCP/IP protocol, and transfers a command included in the IP packet to the message receiving and transmitting unit 5702. Then, the message receiving and transmitting unit 5702 transfers the message to one of the terminal search unit 5700, the service search unit 5701, the media obtaining unit 5703, and the scheduled recording unit 5708 according to the details of the message.

In Embodiment, the receiving and playing apparatus 101 uses the DLNA specification for communication between terminals via the network 104 as the video recording and transmitting apparatus 102 does. Since the DLNA is previously described for the video recording and transmitting apparatus 102, the description is omitted herein.

Upon receipt of a request for searching for a terminal from the service listing unit 5705 to be described later, the terminal search unit 5700 transfers the terminal search command to the message receiving and transmitting unit 5702 to request transmission of a message to destination terminals. Normally, the destination terminals are all terminals on the network 104. When the terminals that receive, via the network 104, the message packing the terminal search command are video recording apparatuses, the terminals return a response message indicating that the terminals are the video recording apparatuses, to the receiving and playing apparatus 101 that transmits the command. The message receiving and transmitting unit 5702 of the receiving and playing apparatus 101 extracts the command by unarchiving the message. When the command indicates that the terminals are the video recording apparatuses, the response command is transferred to the terminal search unit 5702. The terminal search unit 5700 can know the video recording apparatuses present on the network 104 with reference to the response message. The terminal search unit 5700 returns the IP addresses of all video recording apparatuses as the IDs for identifying the video recording apparatuses, to the service listing unit 5705. Here, the IP addresses of the video recording apparatuses can be obtained from the library 416 as the apparatuses that transmit the response message.

When receiving an ID (here, an IP address) identifying a video recording apparatus from the service listing unit 5705, or an ID identifying a video recording apparatus and a record identifier, the service search unit 5701 generates a recorded-service obtaining command and transfers the command together with the IP address to the message receiving and transmitting unit 5702. Then, the message receiving and transmitting unit 5702 transmits the message packing the recorded-service obtaining command to the video recording apparatus. The video recording apparatus that receives the message performs the aforementioned processing, and returns the following set for a recorded service to the receiving and playing apparatus 101 as the response message that is recorded-service information. The set includes the record identifier 1201, the channel identifier 1702, the recording start time 1700, the recording end time 1701, the recording time 1801, and the relay recording play list 5100, as described in the recording information management table 1200 in FIGS. 7, 30, and 31. The network control unit 209 that is included in the receiving and playing apparatus 101 and that receives the message transfers the message to the library 416. The library 416 unarchives the message according to the HTTP/TCP/IP protocol, and transfers the set of the recorded-service information to the message receiving and transmitting unit 5702. The message receiving and transmitting unit 5702 returns the received information to the service search unit 5701 when the received information is the set of the recorded-service information. The service search unit 5701 returns the information to the service listing unit 5705 as the set of the recorded service held in the video recording and transmitting apparatus 102 and specified by the service listing unit 5705.

The media obtaining unit 5703 receives, from the service switching unit 5704, an ID of a video recording apparatus, that is, the IP address, the record identifier 1201, and the first byte position and the last byte position that are desirably obtained as input in order to identify a recorded service that is desirably played by the receiving and playing apparatus 101. The media obtaining unit 5704 maps such information into an HTTP message using the library 416, IP-packetizes the message according to the HTTP/TCP/IP protocol, and transmits the message to the video recording apparatus using the network control unit 209. The video recording apparatus that receives the message performs the aforementioned processing, and replies binary data specified by the first byte position and the last byte position in the recorded MPEG-2 transport stream that is specified by the record identifier, according to the HTTP/TCP/IP protocol. The network control unit 209 that is included in the receiving and playing apparatus 101 and that receives the message transfers the message to the library 416. The library 416 unarchives the message according to the HTTP/TCP/IP protocol, and transfers the binary data of the encrypted MPEG-2 transport stream to the message receiving and transmitting unit 5702. The message receiving and transmitting unit 5702 returns the received information to the media obtaining unit 5703 when the information is the binary data of the encrypted MPEG-2 transport stream.

The scheduled recording unit 5708 provides the API for performing scheduled recording to the Java application, when a video recording apparatus is present on the network 104. A recording instruction Java program 5603 to be described later can perform remote scheduled recording on a video recording apparatus on the network 104, using the API. The scheduled recording unit 5708 first requests the terminal search unit 5700 to search for a terminal. Then, the terminal search unit 5700 returns the IP addresses of all video recording apparatuses on the network 104 as described above. Then, the scheduled recording unit 5708 presents a list of the video recording apparatuses to the recording instruction Java program 5603. The recording instruction Java program 5603 transfers the scheduled recording information that is the set of the channel identifier, the recording start time, and the recording end time to the scheduled recording unit 5708 by selecting one of the presented video recording apparatuses and a television program to be desirably recorded. The scheduled recording unit 5708 requests the selected video recording apparatus to transmit a message (scheduled recording information) by transferring the IP address and the scheduled recording command, of the video recording apparatus, which are selected by the message receiving and transmitting unit 5702.

The network support service manager 5600 manages playing of a service included in the MPEG-2 transport stream inputted from the adapter 208 and a service included in the encrypted MPEG-2 transport stream inputted by the network control unit 209 via the network 104. FIG. 41 illustrates the internal configuration of the network support service manager 5600. The network support service manager 5600 includes the service listing unit 5705, the service switching unit 5704, and a play list analyzing unit 5706. The operations of the service listing unit 5705 and the service switching unit 5704 are performed by switching different operations, depending on a case where a service included in a MPEG-2 transport stream in a broadcast wave is played and a case where a service of an encrypted MPEG-2 transport stream to be inputted via the network 104 is played. Thus, the operations in each of the cases will be described hereinafter in detail.

First, described is the case where a service included in a MPEG-2 transport stream in a broadcast wave to be inputted from the first tuner 210 is played. The case corresponds to playing a broadcast service.

The service listing unit 5705 includes an API for providing a list of playable services to a Java application. A playing instruction Java program 5602 can obtain the list of playable services using the API. The channel identifiers are used as IDs for identifying broadcast services. Information of broadcast services provided by the service listing unit 5705 includes channel identifiers. Upon input of a particular condition, the service listing unit 5705 returns an array of broadcast services that satisfy the condition. For example, when no condition is specified, the service listing unit 5705 returns a list of all broadcast services that can be viewed. The service listing unit 5705 checks channel identifiers of viewable broadcast services using the library 416, and returns a list of services to each of which the corresponding channel identifier is allocated.

The service switching unit 5704 starts playing a service by switching it to the specified broadcast service. The service switching unit 5704 provides the Java program with an API that specifies a service to be played. The playing instruction Java program 5602 specifies a broadcast service to be desirably played, using the API. The service switching unit 5704 can know the channel identifier of the service according to the specified service information. The service switching unit 5704 instructs, via the library 416, the MPEG-2 transport stream outputted from the adapter in FIG. 39 to be transmitted to the TS decoder 212. Furthermore, the output destinations of each hardware constituent elements are set using the library 416. Then, the service switching unit 5704 provides the JMF 402 with a channel identifier corresponding to an object to be reproduced. Then, the JMF 402 starts playing video and audio that are multiplexed onto the MPEG-2 transport stream. Furthermore, the service switching unit 5704 provides the AM 403 with a channel identifier corresponding to an object to be reproduced. Then, the AM 403 starts and finishes executing the Java program multiplexed onto the MPEG-2 transport stream.

In contrast, the operations for managing play of a service in a recorded MPEG-2 transport stream inputted by the network control unit 209 via the network 104 will be described hereinafter.

The service listing unit 5705 includes an API for providing a list of playable services recorded by a video recording apparatus present on the network 104. The playing instruction Java program can obtain the list of playable services using the API. The record identifiers 1201 are used as IDs for identifying recorded services. The recorded services provided by the service listing unit 5705 include record identifiers. Furthermore, the service listing unit 5705 includes a relay-recording managing unit 5707 that manages a recorded content that has been relay-recorded.

As described above, upon input of a particular condition, the service listing unit 5705 returns a list of recorded services that satisfy the condition. When specifying a condition for obtaining a recorded service, the service listing unit 5705 first requests the terminal search unit 5700 to search for a terminal. Then, the terminal search unit 5700 returns the IP addresses of all video recording apparatuses on the network 104 as described above. Then, the service listing unit 5705 inputs the returned IP addresses of the video recording apparatuses in the service search unit 5701. Then, the service search unit 5701 obtains recorded-service information from a particular video recording apparatus as a set of the record identifier 1201, the channel identifier, the program number, the recording start time, the recording end time, the recording time of a recorded service, and the file name of the relay recording play list 5100, and returns the information to the service listing unit 5705. Here, there are cases where the relay recording play list 5100 is not present. The service listing unit 5705 repeats the aforementioned operations in all of the video recording apparatuses, and finally obtains all of the recorded-service information on all of the video recording apparatus.

Next, the service listing unit 5705 sets, to each of the obtained recorded services, the record identifier, the channel identifier, the program number, the recording start time, the recording end time, the recording time, the relay recording play list, and the IP address of the video recording apparatus on which the recorded service is recorded. The service listing unit 5705 returns the list of the recorded services generated in such a manner.

The service switching unit 5704 plays the recorded service that has been specified, on the receiving and playing apparatus 101. Furthermore, the service switching unit 5704 includes the API. The playing instruction Java program can control playing the recorded services using the API. The specification of the recorded services can be known by the service listing unit 5705. As described above, the service switching unit 5704 provides the API that specifies a service to be played. The service switching unit 5704 can know the record identifier held in the recorded service information that has been specified. Furthermore, the service switching unit 5704 can know an IP address value of the video recording apparatus on which the recorded service is recorded.

The service switching unit 5704 plays the recorded MPEG-2 transport stream to be inputted via the network 104 using the record identifier of the recorded service and the IP address of the video recording apparatus. The detailed flow will be described hereinafter.

The service switching unit 5704 first determines the first byte position from which playing of the recorded MPEG-2 transport stream is desirably started and the last byte position at which playing of the recorded MPEG-2 transport stream is desirably ended. The MPEG-2 transport stream is indicated by a record identifier of a recorded service to be played. The play start byte position is normally zero because playing is started from the beginning of a recorded service. The last byte position at which playing is desirably ended is determined according to a temporary buffer size of the receiving and playing apparatus 101. Furthermore, a playing start position may be specified using the API provided from the playing instruction Java program to be described later. Playing a content via the network 104 needs the repeated processes of: obtaining media data via the network 104; temporarily storing the media data in the temporary buffer; inputting the data in a decoder; and obtaining the next media data and storing the data in the temporary buffer when the buffer has free space. Thus, the last byte position at which playing is desirably ended is determined according to a size of the temporary buffer.

Next, the service switching unit 5704 sets, via the library 416, a destination to which each hardware constituent element outputs to provide the JMF 402 with the channel identifier corresponding to an object to be reproduced. Then, the JMF 402 can start playing video and audio that are multiplexed onto the MPEG-2 transport stream outputted from the TS decoder 212 with the aforementioned operations.

Next, when the recorded service that is requested to be played is the service that has been relay-recorded, the service switching unit 5704 transfers the IP address of a video recording apparatus, the record identifier, and the play start byte position to the relay-recording managing unit 5707 before the service starts to be played. The relay-recording managing unit 5707 identifies the recorded service and the start position where the recorded service starts to be played, and returns such information to the service switching unit 5704. The functions of the relay-recording managing unit 5707 will be described later.

Next, the service switching unit 5704 provides the media obtaining unit 5703 with 3 values, that is, the determined record identifier, the first byte position from which playing the service is desirably started, and the last byte position at which playing the service is desirably ended. As described above, since the JMF 402 has been set, video, audio and the Java program of the recorded service are sequentially played.

Then, the service switching unit 5704 requests the media obtaining unit 5703 to obtain a next recorded MPEG-2 transport stream so that the media obtaining unit 5703 can play the recorded MPEG-2 transport streams without any interval in between. In other words, the service switching unit 5704 determines a value next to the previously requested last byte position at which playing a service is desirably ended as the first byte position from which playing the service is desirably started, and determines the last byte position at which playing a service is desirably ended, according to a temporary buffer size. Then, the service switching unit 5704 provides the media obtaining unit 5703 with a set of 3 values, that is, a record identifier, a first byte position from which playing the service is desirably started, and a last byte position at which playing the service is desirably ended. The repetition of these operations makes it possible to play the recorded MPEG-2 transport streams to the end.

The relay-recording managing unit 5707 includes a function of playing selected recorded services as a sequence of recorded services when the recorded services are relay-recorded. As described above, when a recorded service is specified by the service switching unit 5704, the service switching unit 5704 transfers the IP address of the video recording apparatus, a record identifier, a relay recording play list file name 5101, the play start byte position, and the play end byte position to the relay-recording managing unit 5707. Then, the relay-recording managing unit 5707 transfers the IP address of the video recording apparatus, the record identifier, and the relay recording play list file name 5101 to the play list analyzing unit 5706. The play list analyzing unit 5706 obtains all recorded-service information present in the play list according to a procedure to be described later, and returns all recorded-service information to the relay-recording managing unit 5707 together with the record identifiers. The relay-recording managing unit 5707 identifies a recorded service that matches a play start byte position and that is received from the service switching unit 5704, and calculates, from the start position where the recorded service is played, the first byte position from which playing a service is started and the last byte position at which playing a service is ended. Then, the relay-recording managing unit 5707 returns the IP address of the video recording apparatus storing the recorded service that starts to be played, the record identifier of the recorded service, and the calculated byte positions to the service switching unit 5704.

Although the processing in the relay-recording managing unit 5707 is performed before starting to play a service, the processing may be performed after playing the record identifier that identifies the recorded service selected by the service switching unit 5704.

The play list analyzing unit 5706 includes a function of obtaining information of a recorded service included in the received play list. The processing when the play list analyzing unit 5706 receives the relay recording play list file name 5101 from the service switching unit 5704 will be described in Embodiment. The play list analyzing unit 5706 receives an IP address of a video recording apparatus, a record identifier of a recorded service, and the relay recording play list file name 5101 from the service switching unit 5704. The play list analyzing unit 5706 transfers the IP address of the video recording apparatus, the record identifier of the recorded service, and the relay recording play list file name 5101 to the message receiving and transmitting unit 5702. The message receiving and transmitting unit 5702 inquires of the video recording apparatus. The message receiving and transmitting unit 5702 transfers a message of the relay recording play list 5100 to the play list analyzing unit 5706 when receiving the message. The play list analyzing unit 5706 identifies the IP address of the video recording apparatus and the record identifier of the recorded service from addresses listed on the play list 5102. The play list analyzing unit 5706 transfers the identified IP address of the video recording apparatus and the record identifier to the service search unit 5701. The service search unit 5701 obtains the recorded-service information in the aforementioned manner, and returns the information to the play list analyzing unit 5706. The play list analyzing unit 5706 performs processing for obtaining the recorded-service information on all of the addresses described in the play list 5102, and returns the obtained recorded-service information to the service switching unit 5704.

Here, the video recording apparatus and the recorded service are identified from the relay recording play list and recorded-service information is obtained from each video recording apparatus. When a video recording apparatus holding a relay recording play list obtains recorded-service information from each video recording apparatus, and holds the information as in FIG. 34, each ID of the video recording apparatuses and the information may be described in the play list 5102 so that the receiving and playing apparatus 101 can obtain each ID of the video recording apparatuses and the recorded-service information from the play list 5102.

Although the play list analyzing unit 5706 obtains recorded-service information, the information described in a play list may be files of video, audio, and images, and the play list analyzing unit 5706 obtains information corresponding to those files of video, audio, and images when such files are described in the play list.

The playing instruction Java program 5602 and the recording instruction Java program 5603 are software downloaded onto the primary storage unit 205 from the broadcast station system 100 and written in the Java language. Although the playing instruction Java program 5602 downloaded from the broadcast station system 100 is normally a program having various functions useful for the user, it is limited to a program including minimal functions in FIG. 40 to describe Embodiment.

The playing instruction Java program 5602 obtains a list of recorded services recorded on the video recording apparatus of the present invention, and instructs display of the detailed information and playing the services. The playing instruction Java program 5602 displays the list of the recorded services, for example, on a display screen 5800 illustrated in FIG. 42 to allow the user to select one of the services.

Figure 42:
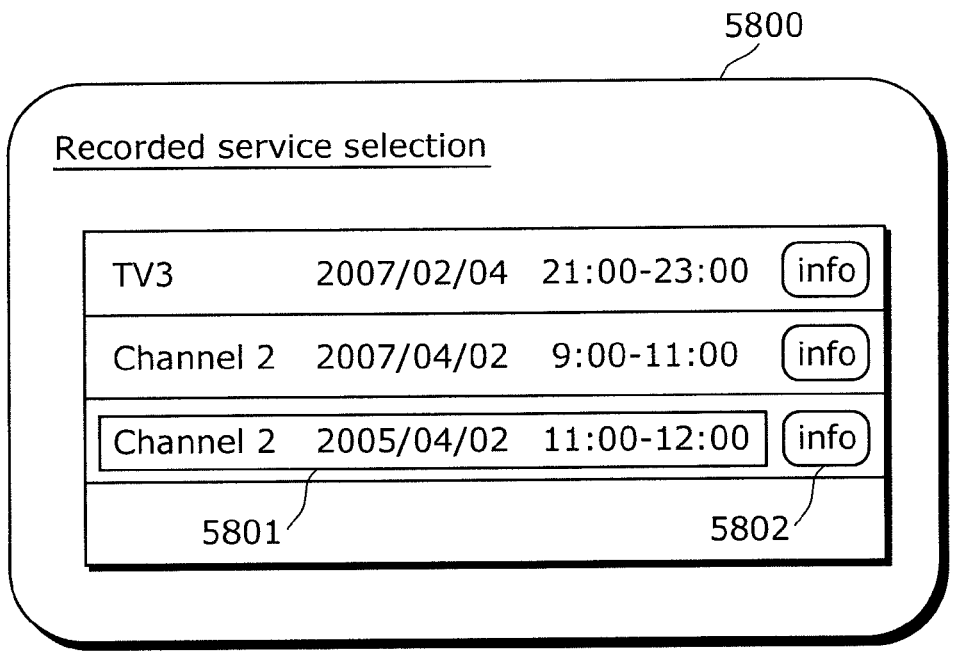
FIG. 42 illustrates an example of a list of recorded services.

FIG. 42 illustrates an example of a list of recorded services.

The user moves a cursor using an input device as illustrated in FIG. 3, and selects desired processing. For example, when the user puts the cursor on an "info" button 5802 to select it, the display screen transits to a recorded-service-information display mode screen as in FIG. 43.

Figure 43:
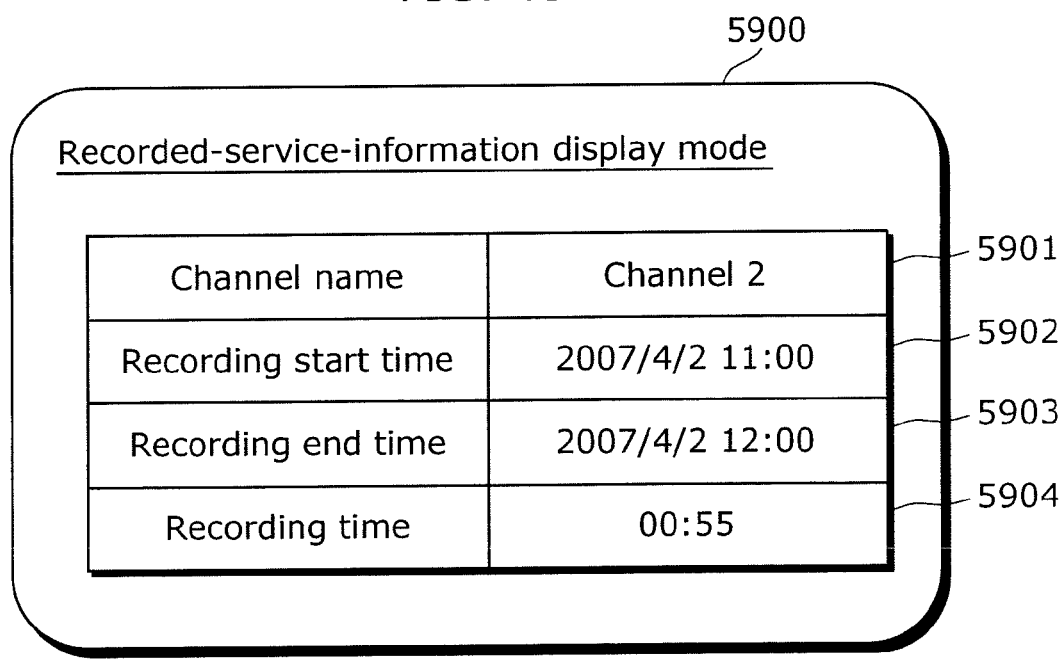
FIG. 43 illustrates an example of a recorded-service-information display mode screen.

FIG. 43 illustrates an example of the recorded-service-information display mode screen.

Upon selection of a relay-recorded content, a sum of recording times of all contents is indicated as a recording time 5904. Furthermore, the cursor is placed on a title of a recorded service and the OK button 307 are pressed, playing the recorded service is started. Here, the playing instruction Java program 5602 calls the APIs provided by the service switching unit 5704 by specifying the recorded service selected by the user in the APIs. Then, the service switching unit 5704 starts playing the recorded service specified via the network 104 with the aforementioned operations.

The recording instruction Java program 5603 instructs the video recording and transmitting apparatus 102 of Embodiment to perform remote scheduled recording.

Then, the recording instruction Java program 5603 obtains a list of the video recording apparatuses from the scheduled recording unit 5708 to allow the user to select one of the video recording apparatuses.

The user moves a cursor using an input device as illustrated in FIG. 3, and selects the video recording and transmitting apparatus 102. Then, the display screen transits to a video-recording selection mode screen as in FIG. 14. Furthermore, the user selects a television program to be desirably recorded. Then, the recording Java program specifies information of the video recording apparatus 102 and scheduled information of the television program to be recorded which have been selected by the user, in the APIs provided by the scheduled recording unit 5708. Then, the scheduled recording unit 5708 schedules the remote recording in the video recording apparatus via the network 104 with the aforementioned operations.

When playing a recorded service is requested, the service is played automatically in association with the relay recording play list 5100 in Embodiment. However, such association with the recorded service may not be necessary. In such a case, a play list screen is present other than the recorded service list screen, and a relay-recorded service can be played by selecting the play list. Furthermore, when a relay-recorded service is selected on the recorded service list screen, the video recording apparatus that has performed relay recording may play the relay-recorded service by buffering contents of another video recording apparatus. For example, when the video recording and transmitting apparatus 102a selects the content having the record identifier 002, the video recording and transmitting apparatus 102a plays the content by buffering contents of the video recording and transmitting apparatus 102b.

The software configuration and the functions of the receiving and playing apparatus 101 of Embodiment is described hereinbefore.

2. Operations of the Apparatuses Next, the Operations of Relay Recording Will be Described.

FIGS. 44 to 51, and 55 show flowcharts indicating steps of relay recording processing for the relay recording.

In Embodiment, an apparatus that requests relay recording is assumed to be the video recording and transmitting apparatus 102a and an apparatus that performs relay recording in response to the request is assumed to be the video recording and transmitting apparatus 102b.

FIGS. 44, 47, 48, and 50 show procedural steps of the video recording and transmitting apparatus 102a, and FIGS. 45, 46, 49, 51, and 55 show procedural steps of the video recording and transmitting apparatus 102b.

Figure 44:
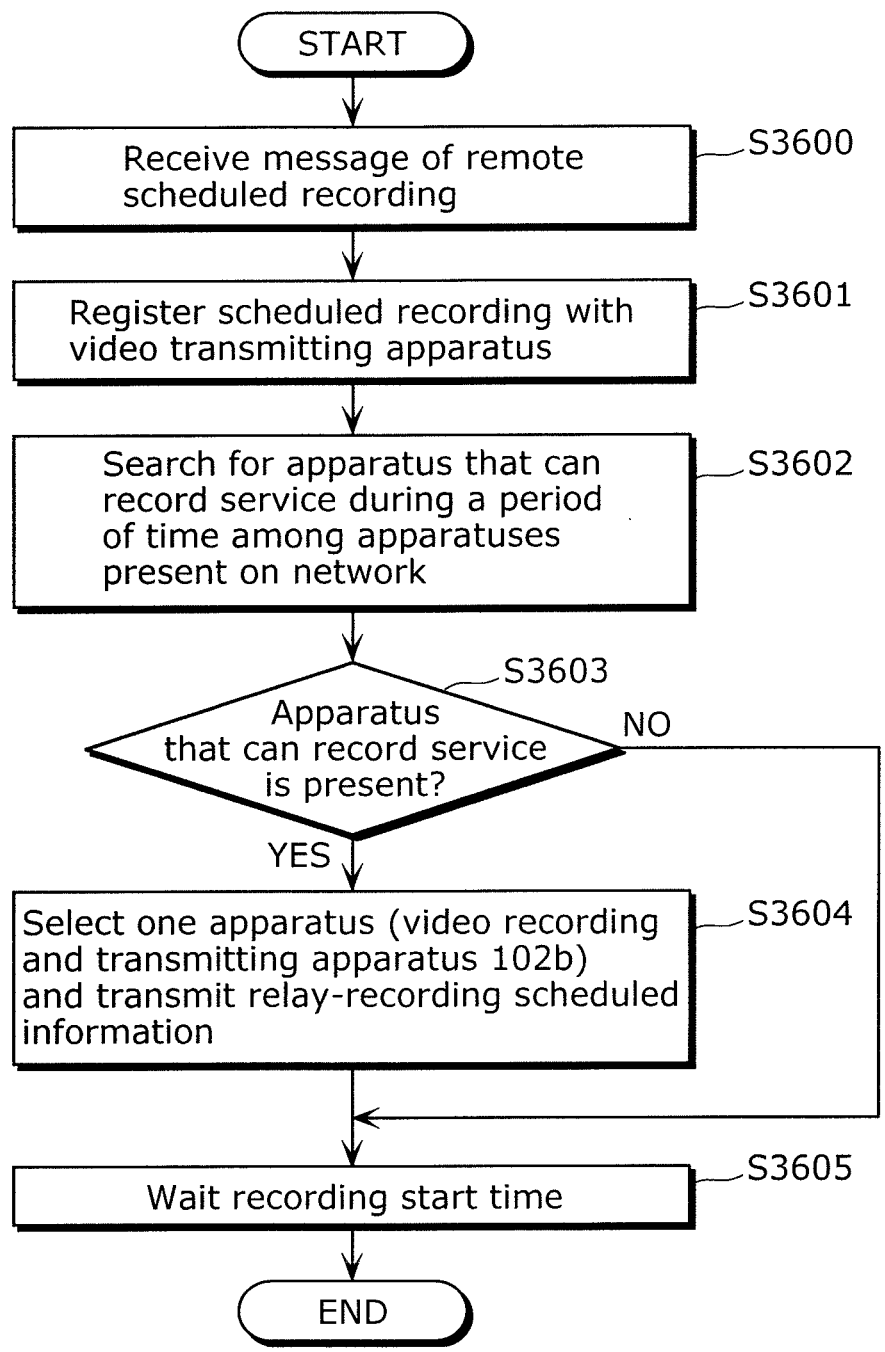
FIG. 44 shows a flowchart when the video recording and transmitting apparatus 102a searches for a video recording apparatus that can perform relay recording.
Figure 45:
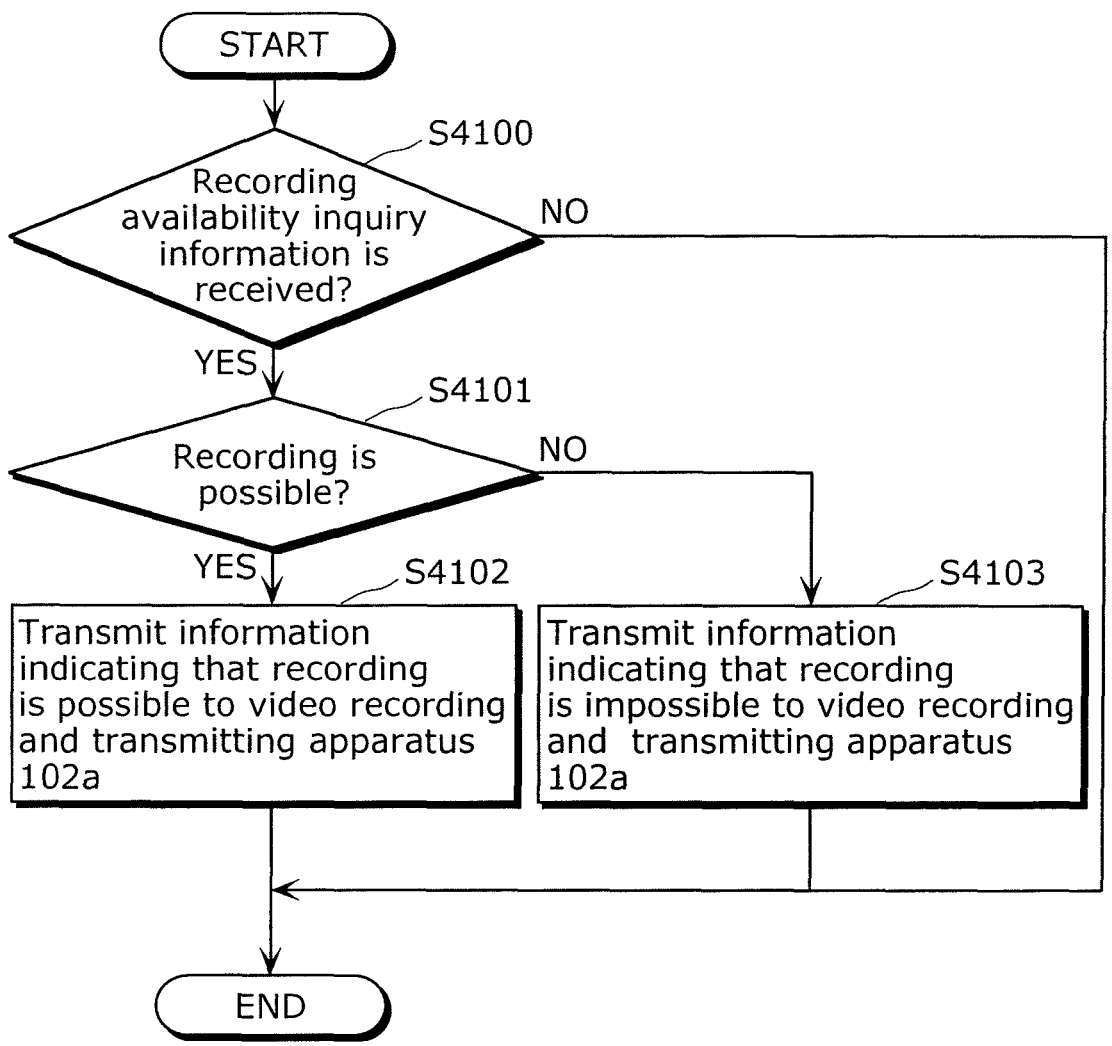

First, the processing in FIGS. 44 and 45 show the cooperative operations between the video recording and transmitting apparatuses 102a and 102b when relay recording is scheduled.

FIG. 44 shows a flowchart when the video recording and transmitting apparatus 102a searches for a video recording apparatus that can perform relay recording.

FIG. 45 shows a flowchart when the video recording and transmitting apparatus 102b replies to an inquiry from the video recording and transmitting apparatus 102a.

In FIG. 44, for example, when the receiving and playing apparatus 101 designates the video recording and transmitting apparatus 102 as an apparatus that performs remote scheduled recording, the receiving and playing apparatus 101 transmits a recording request to the video recording and transmitting apparatus 102a, and the relay-recording control unit 703a of the video recording and transmitting apparatus 102a receives a message of the remote scheduled recording (S3600).

The relay-recording control unit 703a of the video recording and transmitting apparatus 102a registers scheduled recording with the recording registration unit 500 (S3601).

Next, the relay-recording enabling terminal checking unit 700a transfers the recording availability inquiry information 2801 to the network 104 via the message receiving and transmitting unit 603a in order to search for an apparatus that can record a service during a period of time (interval between a recording start time and a recording end time indicated in the message of the remote scheduled recording), among the video recording and transmitting apparatuses 102 present on the network 104 (S3602).

In this case, the message receiving and transmitting unit 603b of the video recording and transmitting apparatus 102b connected to the network 104 always checks, for example, whether or not to receive a message. For example, the message receiving and transmitting unit 603b determines whether or not to receive the recording availability inquiry information 2801 (S4100). When the message receiving and transmitting unit 603b determines to receive the recording availability inquiry information 2801, the relay-recording enabling terminal checking unit 700b receives the information from the message receiving and transmitting unit 603b, and notifies the relay-recording control unit 703b of the information.

The relay-recording control unit 703b checks based on the recording availability inquiry information 2801 whether or not recording indicated in the recording availability inquiry information 2801 is possible (S4101). When the recording is possible (Yes in S4101), the relay-recording enabling terminal checking unit 700b transmits the recording availability response information 2802 indicating that the recording is possible to the video recording and transmitting apparatus 102a via the message receiving and transmitting unit 603b (S4102). When the recording is impossible (No in S4101), the relay-recording enabling terminal checking unit 700b transmits the recording availability response information 2802 indicating that the recording is impossible to the video recording and transmitting apparatus 102a via the message receiving and transmitting unit 603b (S4103).

On the other hand, the video recording and transmitting apparatus 102a that has transmitted the recording availability inquiry information 2801 in Step S3602 waits for reception of the recording availability response information 2802 from other video recording and transmitting apparatuses. Upon receipt of the recording availability response information 2808 via the message receiving and transmitting unit 603a, the relay-recording enabling terminal checking unit 700a of the video recording and transmitting apparatus 102a notifies the relay-recording control unit 703a of the information. When checking the recording availability response information 2802, the relay-recording control unit 703a determines that no video recording and transmitting apparatus that can perform relay recording is present on the network 104 as a result of the information indicated in each of the recording availability response information 2802 that recording is impossible (No in S3603). Then, the relay-recording control unit 703a waits a recording start time (S3605).

When determining that at least one video recording and transmitting apparatus that performs relay recording is present on the network 104 (Yes in S3603), the relay-recording enabling terminal checking unit 700a transmits the relay-recording scheduled information 2803 to the video recording and transmitting apparatus (S3604). Here, the video recording and transmitting apparatus 102b is assumed to be selected.

In the case of receiving a plurality of recording availability response information 2802 each indicating the recording is possible, the relay-recording control unit 703a selects one of the video recording and transmitting apparatuses and transmits the relay-recording scheduled information 2803 to the selected video recording and transmitting apparatus (S3604). The method for selecting one of the video recording and transmitting apparatuses may be, for example, a method for selecting a video recording and transmitting apparatus that supports the recording availability response information 2802 that is received first, and a method for selecting a video recording and transmitting apparatus that has the largest remaining capacity in an HDD based on information obtained by adding information of the remaining capacity in the HDD to the recording availability response information 2802. After transmitting the relay scheduled recording information 2803 in Step S3604, the video recording and transmitting apparatus 102a waits the recording start time (S3605).

Next, the operations when the video recording and transmitting apparatus 102b selected as a relaying apparatus receives the relay-recording scheduled information 2803 from the video recording and transmitting apparatus 102a will be described with reference to FIG. 46.

Figure 46:
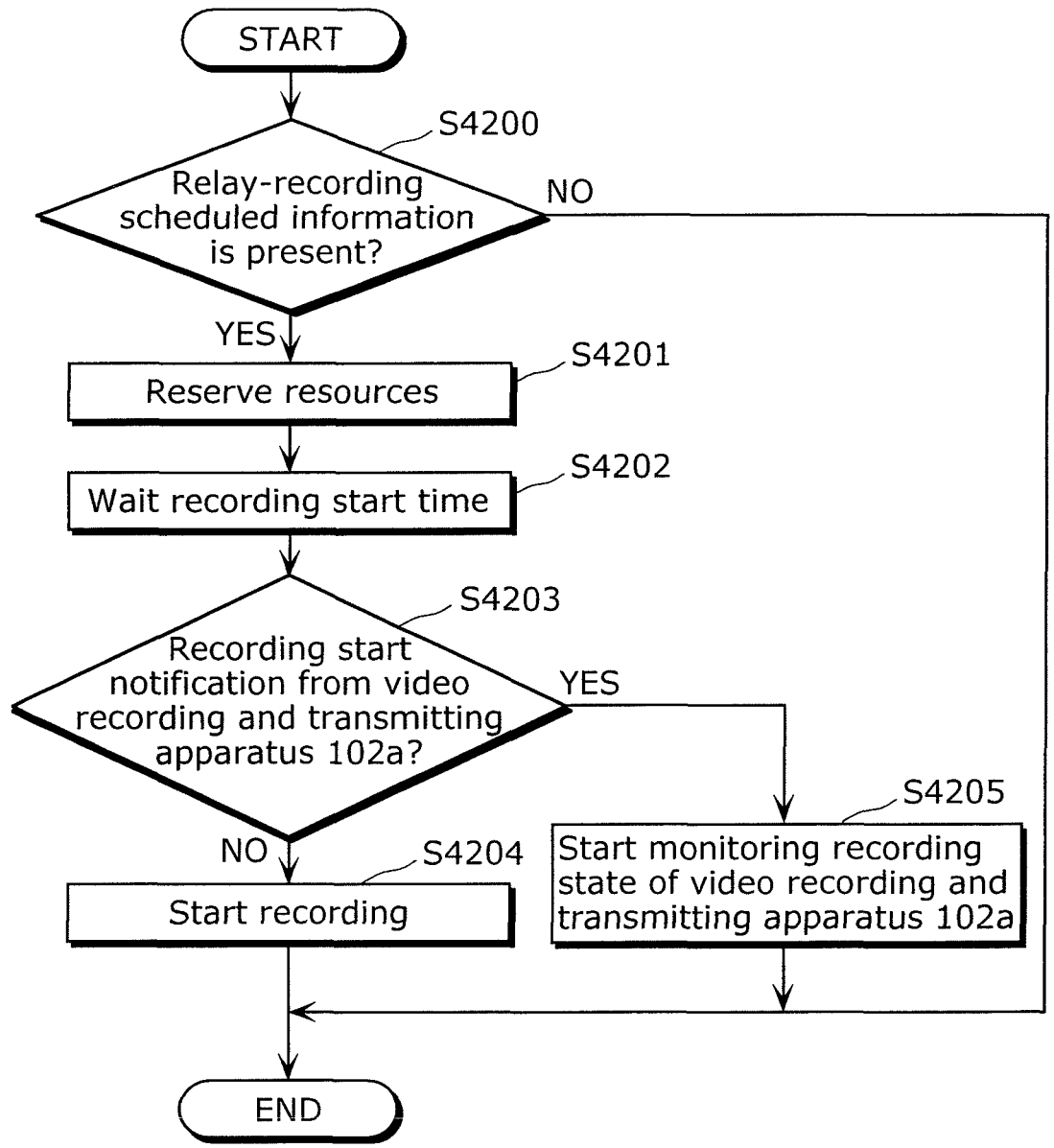
FIG. 46 shows a flowchart when the video recording and transmitting apparatus 102b receives the relay-recording scheduled information.

FIG. 46 shows a flowchart when the video recording and transmitting apparatus 102b receives the relay-recording scheduled information 2803.

Figure 47:
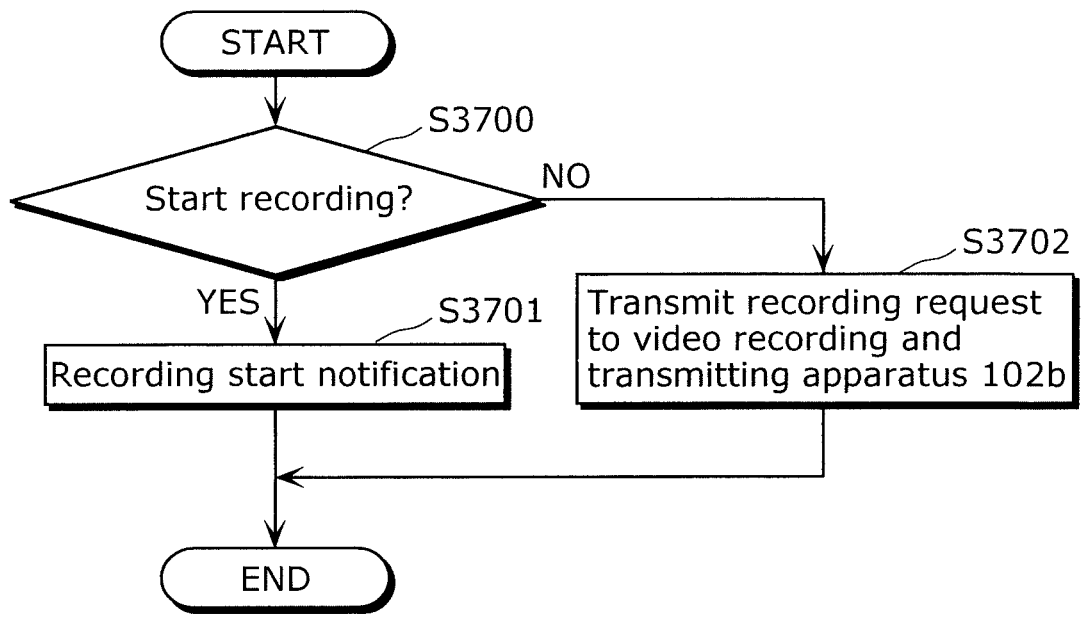
FIG. 47 shows a flowchart when the video recording and transmitting apparatus 102a performs scheduled recording.

FIG. 47 shows a flowchart when the video recording and transmitting apparatus 102a performs scheduled recording.

The message receiving and transmitting unit 603b of the video recording and transmitting apparatus 102b always checks, for example, whether or not to receive a message. For example, the message receiving and transmitting unit 603b determines whether or not to receive the relay-recording scheduled information 2803 (S4200). When determining the reception (Yes in S4200), the message receiving and transmitting unit 603b transmits the relay-recording scheduled information 2803 to the relay-recording enabling terminal checking unit 700b. Here, the relay-recording control unit 703b notifies the relay-recording registration unit 503b of the received relay-recording scheduled information 2803. The relay-recording registration unit 503b reserves terminals necessary for recording a service in the video recording and transmitting apparatus 102b so that the devices can be used at a recording start time (S4201). Then, the video recording and transmitting apparatus 102b waits a recording start time (S4202).

In the case of reaching a scheduled recording start time, the recording registration unit 500a determines whether or not the recording has been started at the recording start time (S3700), and notifies the recording state monitoring unit 701a of a result of the determination. Upon notification of start of the recording (Yes in S3700), the recording state monitoring unit 701a transfers, to the message receiving and transmitting unit 603a, the recording-state information 2805 including a recording start notification indicating that recording is started together with the held request ID, the terminal ID, and the record identifier, and transmits the recording-state information 2805 to the corresponding video recording and transmitting apparatus (the video recording and transmitting apparatus 102b in this example) (S3701).

In contrast, when the recording state monitoring unit 701a is notified by the recording registration unit 500a that the recording is not started at the recording start time (No in S3700), the recording state monitoring unit 701a transmits recording request information to the video recording and transmitting apparatus 102b via the message receiving and transmitting unit 603a (S3702).

In contrast, when the video recording and transmitting apparatus 102b receives the recording start notification from the video recording and transmitting apparatus 102a (Yes in S4203), the recording state monitoring unit 701b starts monitoring a recording state of the video recording and transmitting apparatus 102a (S4205). Unless receiving the recording start notification (No in S4203), the relay-recording control unit 703b determines that the video recording and transmitting apparatus 102a does not perform scheduled recording, and obtains the scheduled recording information from the relay-recording registration unit 503b. After updating the recording start time to a current time, the relay-recording control unit 703b registers the scheduled recording with the recording registration unit 500b, and start recording the service (performs the relay recording) (S4204). In this case, the relay-recording control unit 703b may obtain the scheduled device setting information and transfer it to the recording registration unit 500b. Alternatively, the relay-recording control unit 703b may notify the recording registration unit 500b that the information is scheduled, and obtain the device setting information from the recording registration unit 500b.

Although whether or not to perform scheduled recording is determined by the presence or absence of receipt of the recording start notification in S4203 as an example, the determination may be made, for example, by a notification whether or not the recording in the video recording and transmitting apparatus 102a is successful.

When receiving a notification that the recording is successful, the steps may proceed to Step S4205. Unless receiving the notification that the recording is successful, the steps may proceed to Step S4204.

Furthermore, when the video recording and transmitting apparatus 102a does not start the recording, it may search for a terminal that can record a service again and change a terminal that requests recording the service. In such a case, the operations may be notified to the video recording and transmitting apparatus 102b.

Monitoring a recording state herein is performed by transmitting the continued recording inquiry information 2804 for inquiring whether or not scheduled recording is continued in the video recording and transmitting apparatus 102a, from the video recording and transmitting apparatus 102b to the video recording and transmitting apparatus 102a.

Figure 48:
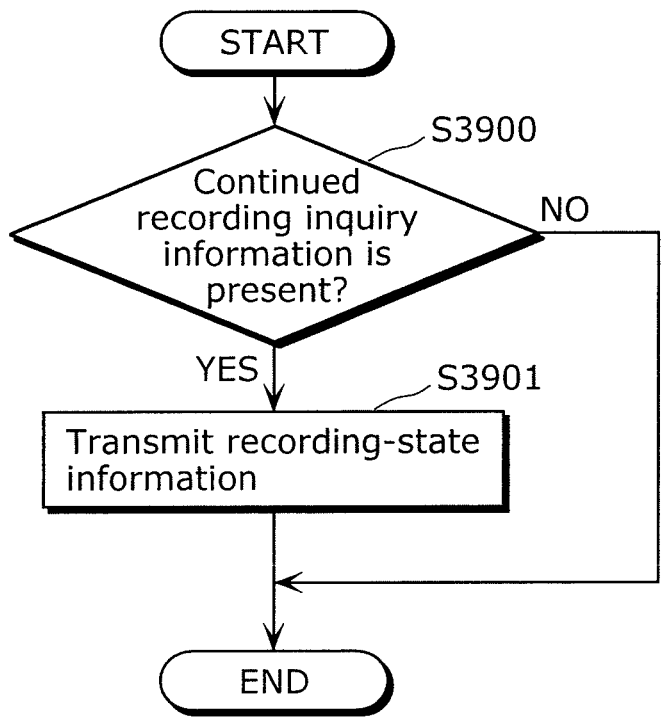
FIG. 48 shows a flowchart of the operations of the video recording and transmitting apparatus 102a when the transmitting apparatus 102a receives the continued recording inquiry information from the video recording and transmitting apparatus 102b.

FIG. 48 shows a flowchart of the operations of the video recording and transmitting apparatus 102a (a video recording and transmitting apparatus that transmits a request for relay recording) when the video recording and transmitting apparatus 102a receives the continued recording inquiry information 2804 from the video recording and transmitting apparatus 102b (a video recording and transmitting apparatus that receives the request for relay recording).

The message receiving and transmitting unit 603a of the video recording and transmitting apparatus 102a always checks, for example, whether or not to receive a message. For example, the message receiving and transmitting unit 603a determines whether or not to receive the continued recording inquiry information 2804 (S3900). When determining the reception (Yes in S3900), the message receiving and transmitting unit 603a notifies the recording state monitoring unit 701a of the reception, and transmits the recording-state information 2805 to the video recording and transmitting apparatus 102b (S3901).

Figure 49:
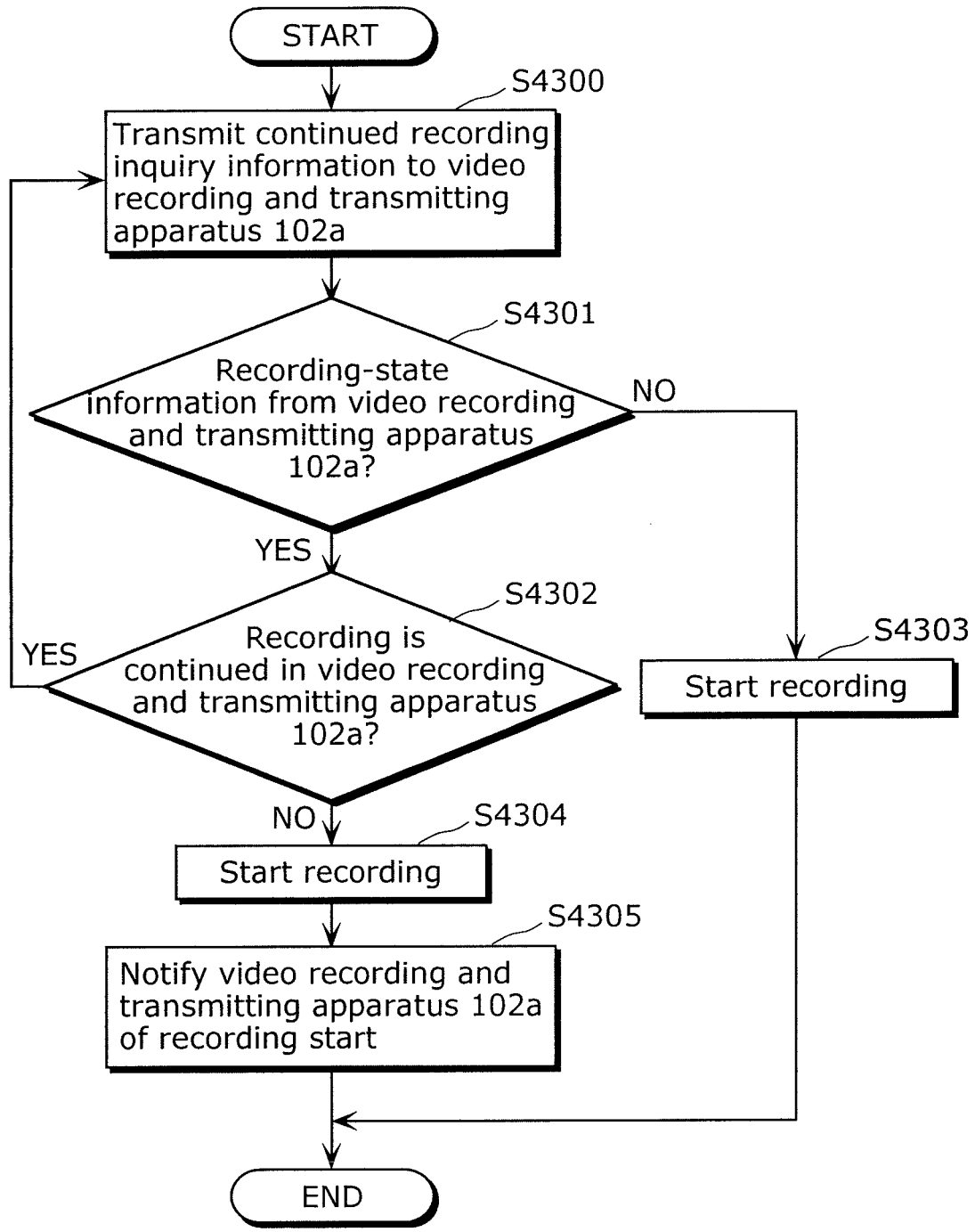

FIG. 49 shows a flowchart when the video recording and transmitting apparatus 102b starts recording a service according to the recording-state information 2805 transmitted from the video recording and transmitting apparatus 102a.

The recording state monitoring unit 701b of the video recording and transmitting apparatus 102b transmits the continued recording inquiry information 2804 to the video recording and transmitting apparatus 102a via the message receiving and transmitting unit 603b at regular intervals (S4300).

When the recording state monitoring unit 701b of the video recording and transmitting apparatus 102b does not receive any information (the recording-state information 2805) for a predetermined period of time from the video recording and transmitting apparatus 102a via the message receiving and transmitting unit 603b (No in S4301), the recording state monitoring unit 701b obtains scheduled recording information from the relay-recording registration unit 503b. After updating the recording start time to a current time, the recording state monitoring unit 701b registers the scheduled recording with the recording registration unit 500b (S4303). Thereby, the power shutdown in the video recording and transmitting apparatus 102a can be supported. In other words, the video recording and transmitting apparatus 102b can start relay recording.

When receiving the recording-state information 2805 (Yes in S4301), the relay-recording control unit 703b checks the received recording-state information 2805, and determines whether or not recording is continued (S4302). When the recording is continued (Yes in S4302), the process in Step S4300 is again performed after a predetermined period of time (the recording state is again checked). Unless the recording is continued (No in S4302), as in the case of no reception of information by the recording state monitoring unit 701b from the video recording and transmitting apparatus 102a, the relay-recording control unit 703b obtains scheduled recording information. After updating the recording start time to a current time, the relay-recording control unit 703b registers the scheduled recording with the recording registration unit 500b and starts recording a service (S4304). When the recording state included in the received recording-state information 2805 is IN_PROGRESS_INSUFFICIENT_SPACE (recording a service in a storage region with an insufficient space is in progress), it is probable that the storage region is lacking despite the fact that the video recording and transmitting apparatus 102a continues to record the service. Thus, the relay-recording control unit 703b may register the scheduled recording information with the recording registration unit 500b in this case by assuming that the recording may be interrupted.

When the video recording and transmitting apparatus 102b starts recording a service through these processes and can communicate with the video recording and transmitting apparatus 102a, the recording state monitoring unit 701b of the video recording and transmitting apparatus 102b notifies the video recording and transmitting apparatus 102a of the start of recording via the message receiving and transmitting unit 603b (S4305).

Figure 50:
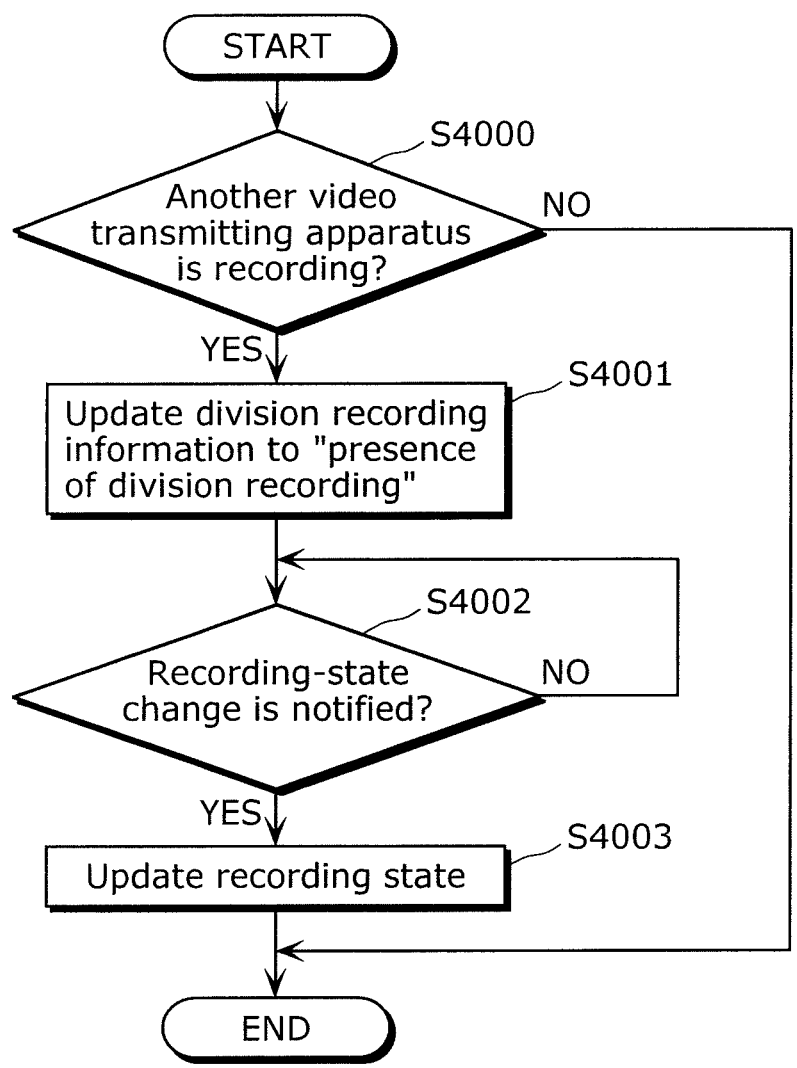
FIG. 50 shows a flowchart of the operations of the video recording and transmitting apparatus 102a when a content recorded by the video recording and transmitting apparatus 102a is divided.

FIG. 50 shows a flowchart of the operations of the video recording and transmitting apparatus 102a when a content recorded by the video recording and transmitting apparatus 102a is divided.

When division recording information is present or when the relay-recording control unit 703a of the video recording and transmitting apparatus 102a receives the relay-recording start notification (Yes in S4000), the relay-recording control unit 703a updates the division recording information (S4001). Furthermore, when receiving the relay-recording-state information 2806 via the message receiving and transmitting unit 603a (Yes in S4002), the relay-recording control unit 703a updates the recording state (S4003).

Figure 51:
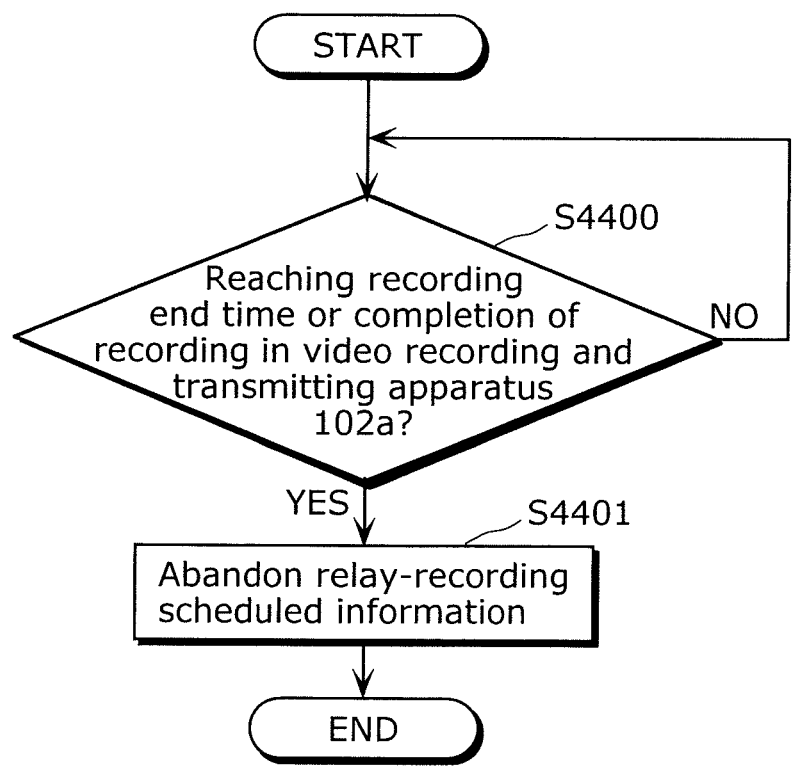
FIG. 51 shows a flowchart of the operations of the video recording and transmitting apparatus 102b when reaching a recording end time without starting the recording by the video recording and transmitting apparatus 102b, or when a recording state of the recording-state information received from the video recording and transmitting apparatus 102a indicates the completion of recording.

FIG. 51 shows a flowchart of the operations of the video recording and transmitting apparatus 102b when reaching a recording end time without starting the recording by the video recording and transmitting apparatus 102b, or when a recording state of the recording-state information 2805 received from the video recording and transmitting apparatus 102a indicates the completion of recording.

The video recording and transmitting apparatus 102b checks whether or not to reach a recording end time without starting the recording, or whether or not a recording state of the recording-state information 2805 received from the video recording and transmitting apparatus 102a indicates the completion of recording. When one of the states holds true for a current state (Yes in S4400), the relay-recording control unit 703b requests the relay-recording registration unit 503b to abandon the relay-recording scheduled information 2803 (S4401).

When the recording becomes possible again after recording is interrupted, there are cases where the video recording and transmitting apparatus 102 in Embodiment includes a function of autonomously resuming recording a service. When the video recording and transmitting apparatus 102a recovers from the power shutdown and another terminal performs relay recording, the recording may be resumed by the video recording and transmitting apparatus 102a or may be continued by the video recording and transmitting apparatus 102b alone. Furthermore, the video recording and transmitting apparatus 102 may provide the APIs that allow such selection of the operations so that the downloaded Java program may select the operations.

Figure 52:
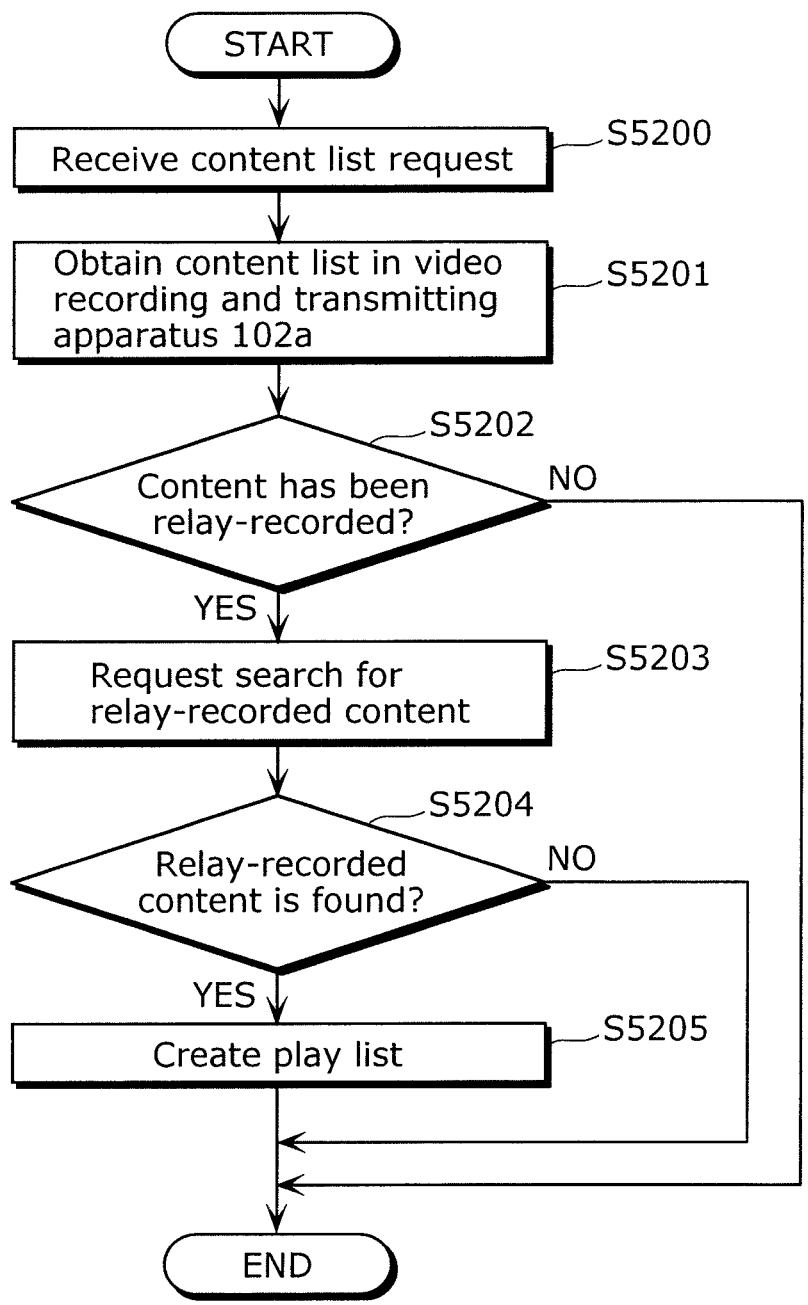
Figure 53:
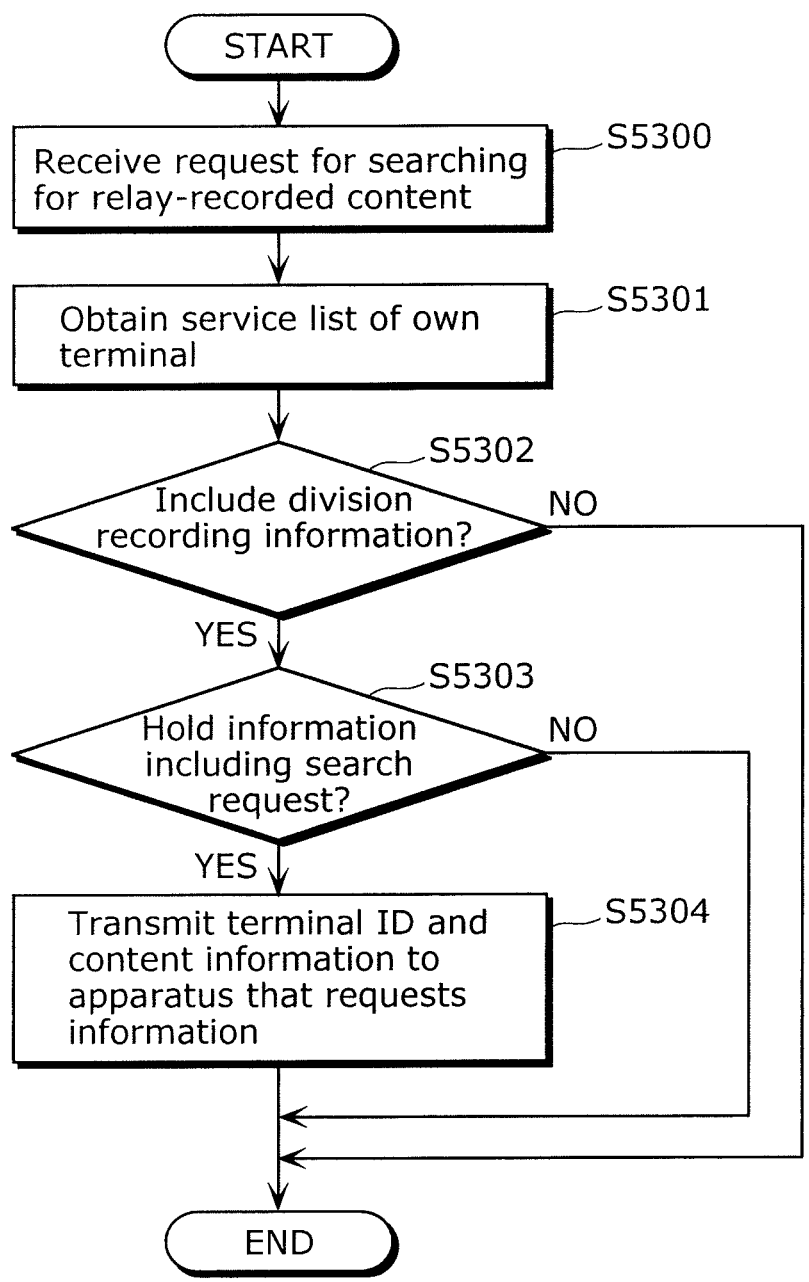
FIG. 53 shows a flowchart of the operations in the video recording and transmitting apparatus 102b.

Next, FIGS. 52 and 53 show flowcharts for displaying a content in the video recording and transmitting apparatus 102.

FIG. 52 shows a flowchart of the operations in the video recording and transmitting apparatus 102a. FIG. 53 shows a flowchart of the operations in the video recording and transmitting apparatus 102b.

First, the receiving and playing apparatus 101 that requests scheduled recording requests a list of contents from the video recording and transmitting apparatus 102a. Upon receipt of a content list transmission request message from the message receiving and transmitting unit 603a (S5200), the relay-recording content managing unit 702a of the video recording and transmitting apparatus 102a obtains the list of contents included in its own terminal from the recording registration unit 500a (S5201). When the obtained recorded service list includes a content that has been relay-recorded, in other words, when the recorded content information includes division recording information (Yes in S5202), the relay-recording content managing unit 702a requests a terminal identified by division-recording identification information included in the division recording information (more specifically, a terminal ID included in the division-recording identification information) to search for the relay-recorded content (S5203).

Here, it is assumed that the request is issued to the video recording and transmitting apparatus 102b having the terminal ID 004 according to the division-recording identification information in FIG. 33.

When receiving a request for searching for the relay-recorded content (S5300), the relay-recording content managing unit 702b of the video recording and transmitting apparatus 102b obtains a recorded service list of its own terminal from the recording registration unit 500b (S5301). When the recorded service list includes a content including division recording information in the recorded content information (Yes in S5302), the relay-recording content managing unit 702b checks whether or not the division recording information includes a terminal ID of a terminal that receives the inquiry and a relay-requesting-terminal record identifier (S5303). When the division recording information includes the terminal ID and the record identifier (Yes in S5303), the relay-recording content managing unit 702b transmits the content information and the terminal ID of its own terminal to the video recording and transmitting apparatus 102a that requests the information (S5304).

When the video recording and transmitting apparatus 102b notifies the video recording and transmitting apparatus 102a that the relay-recorded content is found (Yes in S5204), the video recording and transmitting apparatus 102a creates a relay recording play list based on the recorded service including the division recording information and the continued recorded service that has been found (S5205).

These processes are performed on all of the contents listed in the recorded service list.

Figure 54:
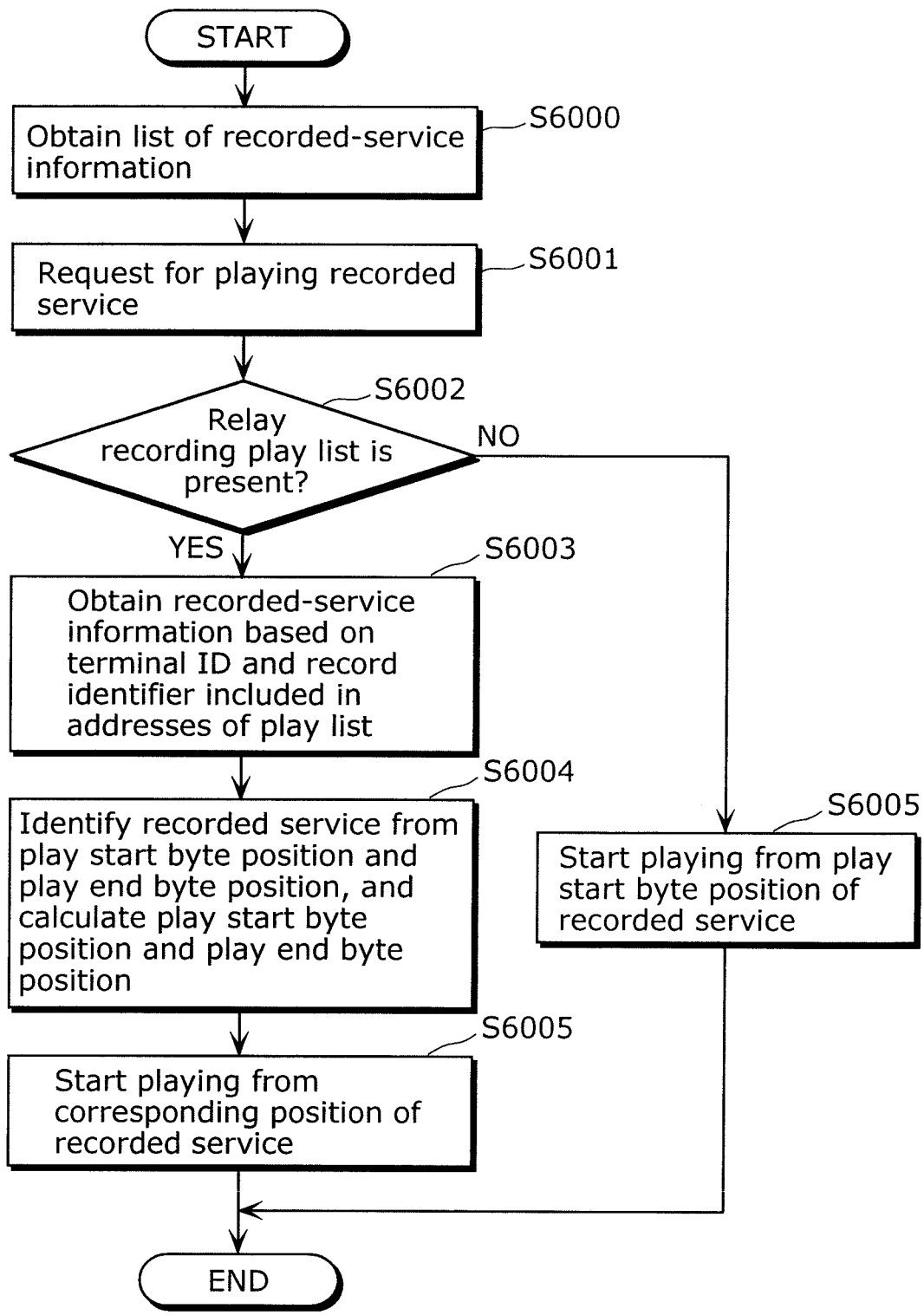
FIG. 54 shows a flowchart when a relay-recorded service is played.

FIG. 54 shows a flowchart when a relay-recorded service is played. This flowchart is intended for playing a service in the receiving and playing apparatus 101.

When the playing instruction Java program 5602 issues a recorded service list obtainment request, the service listing unit 5705 obtains a list of recorded-service information from the service search unit 5701, and returns the list to the playing instruction Java program 5602 (S6000). Next, when the playing instruction Java program 5602 requests the service switching unit 5704 to play a recorded service (S6001), the service switching unit 5704 checks whether or not a relay recording play list file name is present in the recorded-service information (S6002). When the relay recording play list file name is not present (No in S6002), playing the selected recorded-service is started from the designated play start byte position (S6005). When the relay recording play list file name is present (Yes in S6002), the service switching unit 5704 transfers the IP address of the video recording apparatus, the record identifier, the relay recording play list file name, a play start byte position, and a play end byte position to the relay-recording managing unit 5707. The relay-recording managing unit 5707 obtains recorded-service information based on such information (S6003). Next, the relay-recording managing unit 5707 identifies a recorded service to be played from the play start byte position to the play end byte position, and calculates a play start byte position and a play end byte position corresponding to the identified recorded service (S6004). The relay-recording managing unit 5707 returns the IP address of the video recording apparatus holding the identified recorded-service, the record identifier of the identified recorded-service, and the calculated play start byte position and play end byte position to the service switching unit 5704. The service switching unit 5704 requests the media obtaining unit 5703 to obtain a content from such information, and starts playing the service (S6005).

Figure 55:
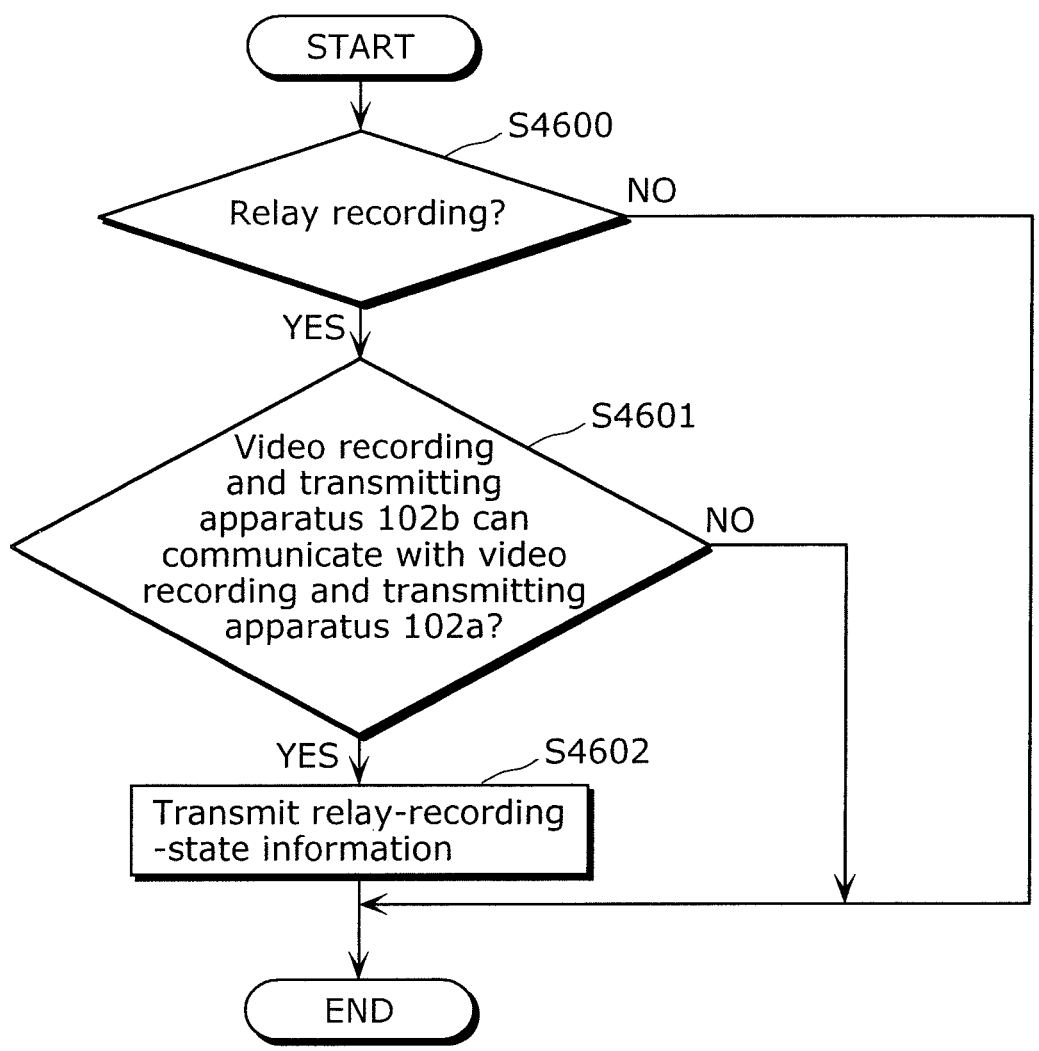
FIG. 55 shows a flowchart when the video recording and transmitting apparatus 102b transmits the relay-recording-state information.

FIG. 55 shows a flowchart when the video recording and transmitting apparatus 102b transmits the relay-recording-state information 2806.

The video recording and transmitting apparatus 102b determines whether or not to perform relay recording (S4600). When determining the execution (Yes in S4600), the video recording and transmitting apparatus 102b determines whether or not it can communicate with the video recording and transmitting apparatus 102a (S4601). Here, when determining that the communication is possible (Yes in S4601), the video recording and transmitting apparatus 102b transmits the relay-recording-state information 2806 to the video recording and transmitting apparatus 102a (S4602).

The relay recording, output of the content list, and playing a service between one receiving and playing apparatus and two video recording and transmitting apparatuses are described hereinbefore as in FIG. 1. Although Embodiment is described using the configuration illustrated in FIG. 1 as a minimal configuration, there may be three video recording and transmitting apparatus, and the receiving and playing apparatus 101 may include a relay recording function. In such a case, the video recording and transmitting apparatus 102a may transmit a recording start notification and the recording-state information 2805 to all of the video recording apparatuses on the network 104. Furthermore, when recording in the video recording and transmitting apparatus 102a is interrupted and communication of the video recording and transmitting apparatus 102a stops dead, a destination apparatus that takes over the recording from the video recording and transmitting apparatus 102a may be changed with the coordination among the video recording and transmitting apparatus 102b and other video recording apparatuses on the network 104. When changing the destination, the destination may be registered beforehand with the video recording and transmitting apparatus 102b to allow the video recording and transmitting apparatus 102a to search for the destination. Furthermore, the video recording and transmitting apparatus 102a may request all video recording apparatuses on the network 104 to search for a content that has been relay-recorded, when searching for such a content.

Furthermore, the video recording and transmitting apparatus 102b may perform relay recording on other video recording apparatuses on the network 104 as the video recording and transmitting apparatus 102a does.

The entire processing of the video recording system according to Embodiment will be hereinafter described with reference to sequence diagrams.

Here, the video recording system includes apparatuses which have a count "n" and each of which corresponds to the video recording and transmitting apparatus 102, where n is an integer of two or more. The "n" video recording and transmitting apparatuses are distinguished with one another as a video recording and transmitting apparatus 1, a video recording and transmitting apparatus 2, . . . , and a video recording and transmitting apparatus n. Furthermore, the video recording and transmitting apparatus 1 corresponds to the video recording and transmitting apparatus 102a that requests relay recording to other video recording and transmitting apparatuses, and the video recording and transmitting apparatuses 2 to n correspond to the video recording and transmitting apparatuses 102b that may accept the request of relay recording from the video recording and transmitting apparatus 1.

Furthermore, when the video recording and transmitting apparatus 1 registers scheduled recording information, in other words, performs scheduled recording, it determines a video recording and transmitting apparatus that takes over the recording temporarily but not formally, and formally determines the video recording and transmitting apparatus that takes over the recording immediately before a recording start time, for example, x minutes before the recording start time (for example, x=1 to 3). Furthermore, the video recording and transmitting apparatus that is formally determined as a relay-recording destination may determine another video recording and transmitting apparatus as a new relay-recording destination by assuming a responsibility as an apparatus that requests relay recording. In other words, relay recording may be managed over generations of video recording and transmitting apparatuses.

Figure 56:
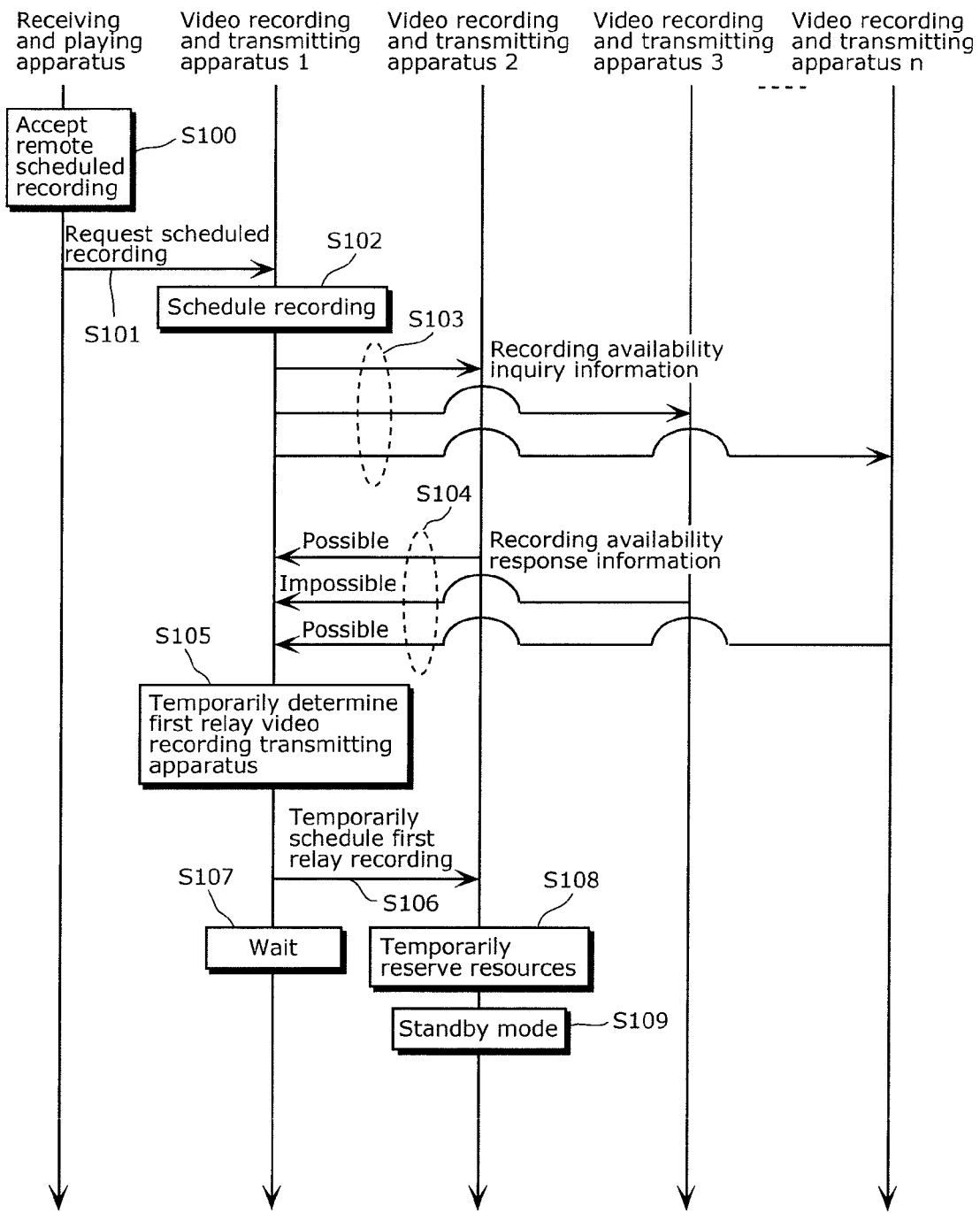
FIG. 56 illustrates a sequence diagram showing the operations of the video recording system when a video recording and transmitting apparatus to be a relay-recording destination is temporarily determined.

FIG. 56 illustrates a sequence diagram showing the operations of the video recording system when a video recording and transmitting apparatus to be a relay-recording destination is temporarily determined.

First, the receiving and playing apparatus 101 accepts remote scheduled recording (S100), and requests the scheduled recording to the video recording and transmitting apparatus 1 by transmitting scheduled recording information (S101). The video recording and transmitting apparatus 1 that accepts the request performs scheduled recording by registering the scheduled recording information (S102). Then, the video recording and transmitting apparatus 1 becomes an apparatus that requests relay recording, and transmits the recording availability inquiry information 2801 to the video recording and transmitting apparatus 2 to n that are connected to the network 104 (S103).

Each of the video recording and transmitting apparatus 2 to n determines whether or not recording is possible based on the recording start time, the recording end time, and the channel identifier indicated in the recording availability inquiry information 2801, and transmits the recording availability response information 2802 indicating a result of the determination to the video recording and transmitting apparatus 1 (S104).

Upon receipt of the recording availability response information 2802 from each of the video recording and transmitting apparatuses 2 to n, the video recording and transmitting apparatus 1 temporarily determines one of the video recording and transmitting apparatuses 2 to n as a relay-recording destination (a first-relay video recording and transmitting apparatus) based on the received recording availability response information 2802 (S105). For example, when a plurality of the recording availability response information 2802 transmitted from the video recording and transmitting apparatuses indicates the remaining capacity in recording media of the video recording and transmitting apparatuses, the video recording and transmitting apparatus 1 temporarily determines, as the first-relay video recording and transmitting apparatus, one of the video recording and transmitting apparatuses that transmits the recording availability response information 2802 indicating the largest remaining capacity from among the plurality of recording availability response information 2802. More specifically, the recording availability response information 2802 transmitted from the video recording and transmitting apparatus 2 indicates a remaining capacity 200 GB and that recording is possible, while the plurality of recording availability response information 2802 transmitted from the video recording and transmitting apparatuses 3 to (n−1) indicates a remaining capacity 100 GB and that the recording is impossible. In this case, the video recording and transmitting apparatus 1 temporarily determines, as the first-relay video recording and transmitting apparatus, the video recording and transmitting apparatus 2 that transmits the recording availability response information 2802 indicating the largest remaining capacity from among the plurality of recording availability response information 2802 each indicating that the recording is possible. Here, the video recording and transmitting apparatus 1 may temporarily determine a video recording and transmitting apparatus that first transmits the recording availability response information 2802 indicating that the recording is possible (for example, the video recording and transmitting apparatus 2) as the first-relay video recording and transmitting apparatus.

Next, the video recording and transmitting apparatus 1 requests the video recording and transmitting apparatus 2 to temporarily schedule the first relay recording (S106) by transmitting the relay-recording scheduled information 2803 to the video recording and transmitting apparatus 2 that is the first-relay video recording and transmitting apparatus, and waits x minutes before the recording start time (S107).

Then, the video recording and transmitting apparatus 2 that accepts the request of temporary scheduling of the first relay recording temporarily reserves resources necessary for the first relay recording (S108), and enters standby mode (S109). Here, temporarily reserving resources corresponds to setting recording priorities for use of the resources according to the relay scheduled recording information 2803. When a priority for using the resources is lower and another processing having the higher priority is requested (for example, when receiving emergency information from the Emergency Alert System (EAS)), the resources are used for such processing having the higher priority.

Figure 57:
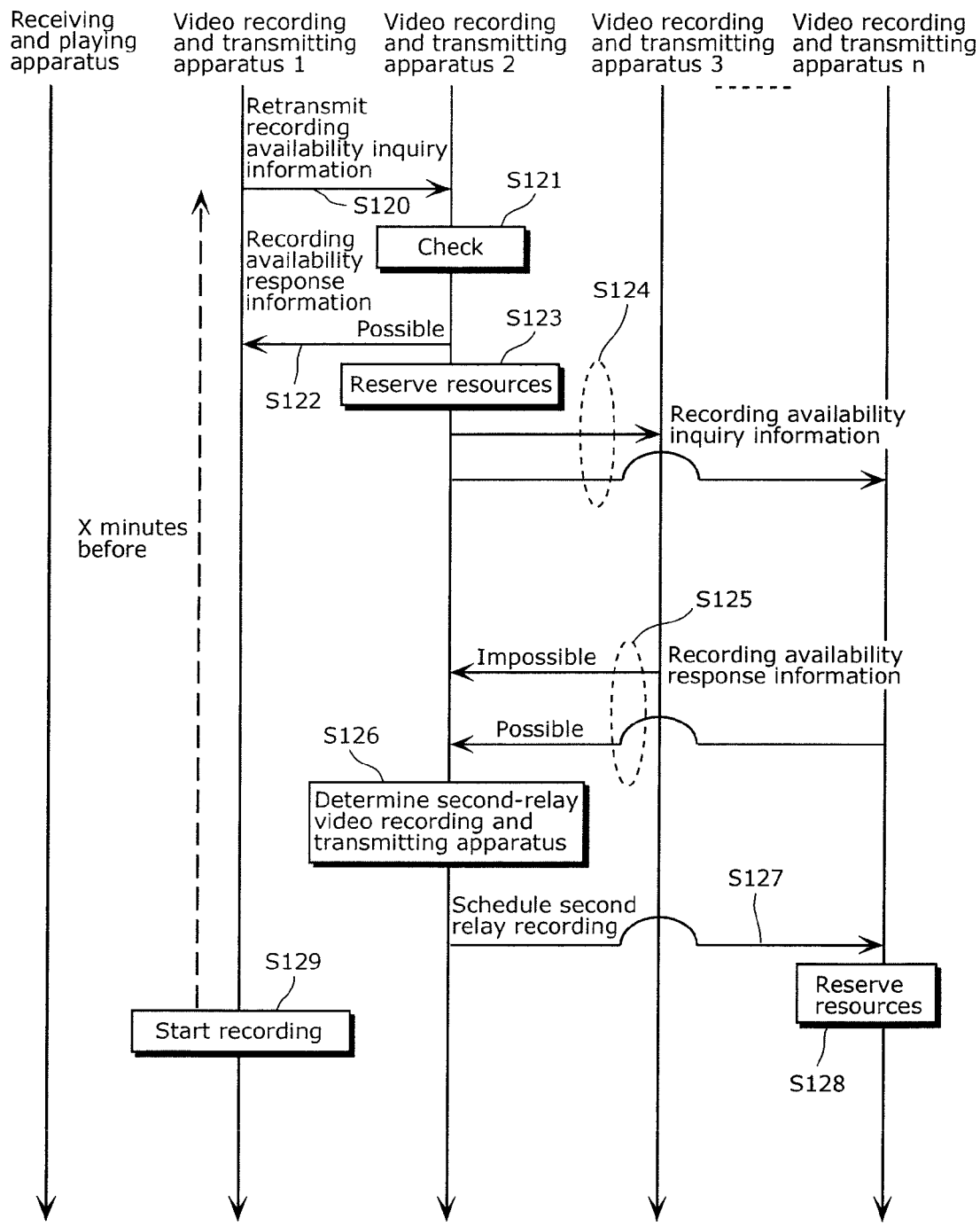
FIG. 57 illustrates a sequence diagram showing the operations of the video recording system when a video recording and transmitting apparatus to be a relay-recording destination is formally determined and starts recording a content.

FIG. 57 illustrates a sequence diagram showing the operations of the video recording system when a video recording and transmitting apparatus to be a relay-recording destination is formally determined and starts recording a content.

The video recording and transmitting apparatus 1 that requests relay recording retransmits the recording availability inquiry information 2801 to the video recording and transmitting apparatus 2 to check whether or not the video recording and transmitting apparatus 2 that has been temporarily determined as the first-relay video recording and transmitting apparatus can perform relay recording x minutes before the recording start time (S120). Upon receipt of the recording availability inquiry information 2801, the video recording and transmitting apparatus 2 checks whether or not the replay recording is possible (S121), and transmits the recording availability response information 2802 indicating a result of the check to the video recording and transmitting apparatus 1 (S122). For example, the video recording and transmitting apparatus 2 checks that the relay recording is possible, and transmits the recording availability response information 2802 indicating that recording is possible to the video recording and transmitting apparatus 1. Thereby, the video recording and transmitting apparatus 2 is formally determined as the first-relay video recording and transmitting apparatus, and formally reserves the resources that have been temporarily reserved (S123). In other words, the recording priority that has been set for use of the resources according to the relay scheduled recording information 2803 is recharged to give a higher priority.

Furthermore, when the video recording and transmitting apparatus 2 is formally determined as the first-relay video recording and transmitting apparatus, it transmits the recording availability inquiry information 2801 to the video recording and transmitting apparatuses 3 to n by assuming a responsibility as an apparatus that requests relay recording (S124). Each of the video recording and transmitting apparatus 3 to n that receive the recording availability inquiry information 2801 determines whether or not recording is possible based on the recording start time, the recording end time, and the channel identifier indicated in the recording availability inquiry information 2801, and transmits the recording availability response information 2802 indicating a result of the determination to the video recording and transmitting apparatus 2 (S125). Upon receipt of the recording availability response information 2802 from each of the video recording and transmitting apparatuses 3 to n, the video recording and transmitting apparatus 2 determines one of the video recording and transmitting apparatuses 3 to n, for example the video recording and transmitting apparatus n as a next relay-recording destination (a second-relay video recording and transmitting apparatus) based on the received recording availability response information 2802 as previously described (S126). In other words, the video recording and transmitting apparatus n is determined as the second-generation relay video recording and transmitting apparatus. Then, the video recording and transmitting apparatus 2 requests the video recording and transmitting apparatus n to schedule the second relay recording by transmitting the relay-recording scheduled information 2803 to the video recording and transmitting apparatus n that is the second-relay video recording and transmitting apparatus (S127). The video recording and transmitting apparatus n that accepts the request of the second relay recording reserves resources necessary for the second relay recording (S128).

Then, the video recording and transmitting apparatus 1 starts recording the service from the recording start time after x minutes has passed since the retransmission of the recording availability inquiry information 2801 in Step S120 (S129).

Since the relay recording is managed over generations of the video recording and transmitting apparatuses, even when the first-relay video recording and transmitting apparatus cannot record a content (service), the second-relay video recording and transmitting apparatus can record it instead, thus enabling recording the content for certain. Although the video recording and transmitting apparatus to be a relay-recording destination is determined to the second generation in the aforementioned case, the video recording and transmitting apparatus may be further determined to the third generation or more. Furthermore, as the number of generation increases, the priority of the relay recording by the video recording and transmitting apparatus to be a relay-recording destination in the next generation may be set lower.

Figure 58:
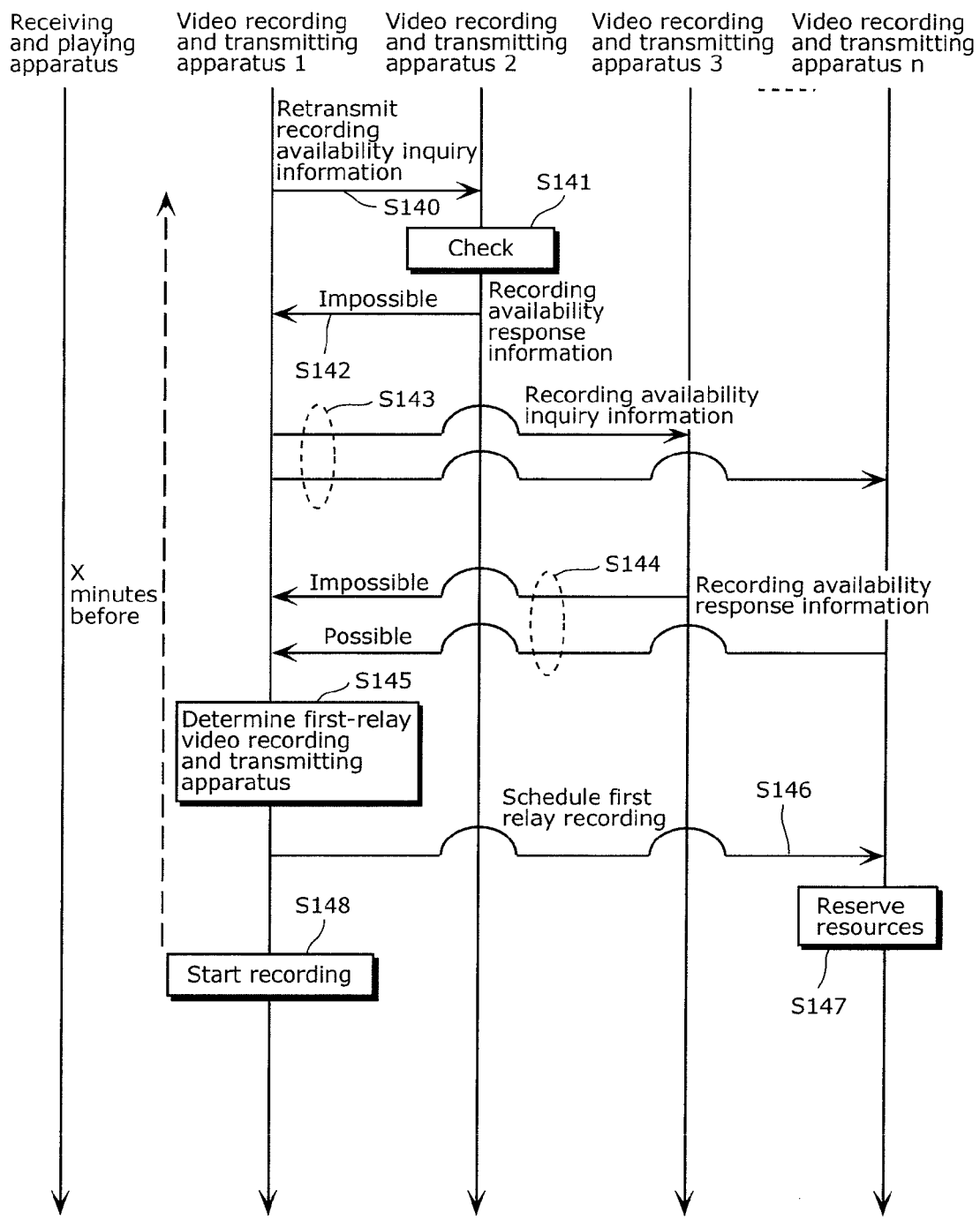
FIG. 58 illustrates a sequence diagram showing the operations of the video recording system when the video recording and transmitting apparatus is not formally determined as the first relay-recorded-video recording and transmitting apparatus.

FIG. 58 illustrates a sequence diagram showing the operations of the video recording system when the video recording and transmitting apparatus 2 is not formally determined as the first-relay video recording and transmitting apparatus.

The video recording and transmitting apparatus 1 that requests relay recording retransmits the recording availability inquiry information 2801 to the video recording and transmitting apparatus 2 x minutes before the recording start time as described above (S140). Upon receipt of the recording availability inquiry information 2801, the video recording and transmitting apparatus 2 checks whether or not the replay recording is possible (S141), and transmits the recording availability response information 2802 indicating a result of the check to the video recording and transmitting apparatus 1 (S142). For example, the video recording and transmitting apparatus 2 checks that the relay recording is impossible, and transmits the recording availability response information 2802 indicating that the recording is impossible to the video recording and transmitting apparatus 1.

Upon receipt of the recording availability response information 2802 indicating that the recording is impossible from the video recording and transmitting apparatus 2, the video recording and transmitting apparatus 1 retransmits the recording availability inquiry information 2801 to the video recording and transmitting apparatuses 3 to n (S143). Each of the video recording and transmitting apparatus 3 to n that receive the recording availability inquiry information 2801 determines whether or not recording is possible based on the recording start time, the recording end time, and the channel identifier indicated in the recording availability inquiry information 2801, and transmits the recording availability response information 2802 indicating a result of the determination to the video recording and transmitting apparatus 1 (S144). Upon receipt of the recording availability response information 2802 from each of the video recording and transmitting apparatuses 3 to n, the video recording and transmitting apparatus 1 determines one of the video recording and transmitting apparatuses 3 to n, for example the video recording and transmitting apparatus n as the first-relay video recording and transmitting apparatus based on the recording availability response information 2802 (S145). In other words, the first-relay video recording and transmitting apparatus is reselected. Then, the video recording and transmitting apparatus 1 requests the video recording and transmitting apparatus n to schedule the first relay recording by transmitting the relay-recording scheduled information 2803 to the video recording and transmitting apparatus n that is the first-relay video recording and transmitting apparatus (S146). The video recording and transmitting apparatus n that accepts the request of the first relay recording reserves resources necessary for the first relay recording (S147).

Then, the video recording and transmitting apparatus 1 starts recording the service from the recording start time after x minutes has passed since the retransmission of the recording availability inquiry information 2801 in Step S140 (S148).

As such, the video recording and transmitting apparatus 1 temporarily determines another video recording and transmitting apparatus as the first-relay video recording and transmitting apparatus at a scheduled recording time, and checks whether or not the determined video recording and transmitting apparatus can record the service immediately before the recording start time. If impossible, the video recording and transmitting apparatus 1 reselects another video recording and transmitting apparatus as the first-relay video recording and transmitting apparatus. Thus, relay recording of the content (service) can be performed for certain.

Here, the video recording and transmitting apparatus 1 may formally determine the first and second-relay video recording and transmitting apparatuses x minutes before the recording start time without temporarily determining the first-relay video recording and transmitting apparatus at a scheduled recording time as illustrated in FIG. 56.

Figure 59:
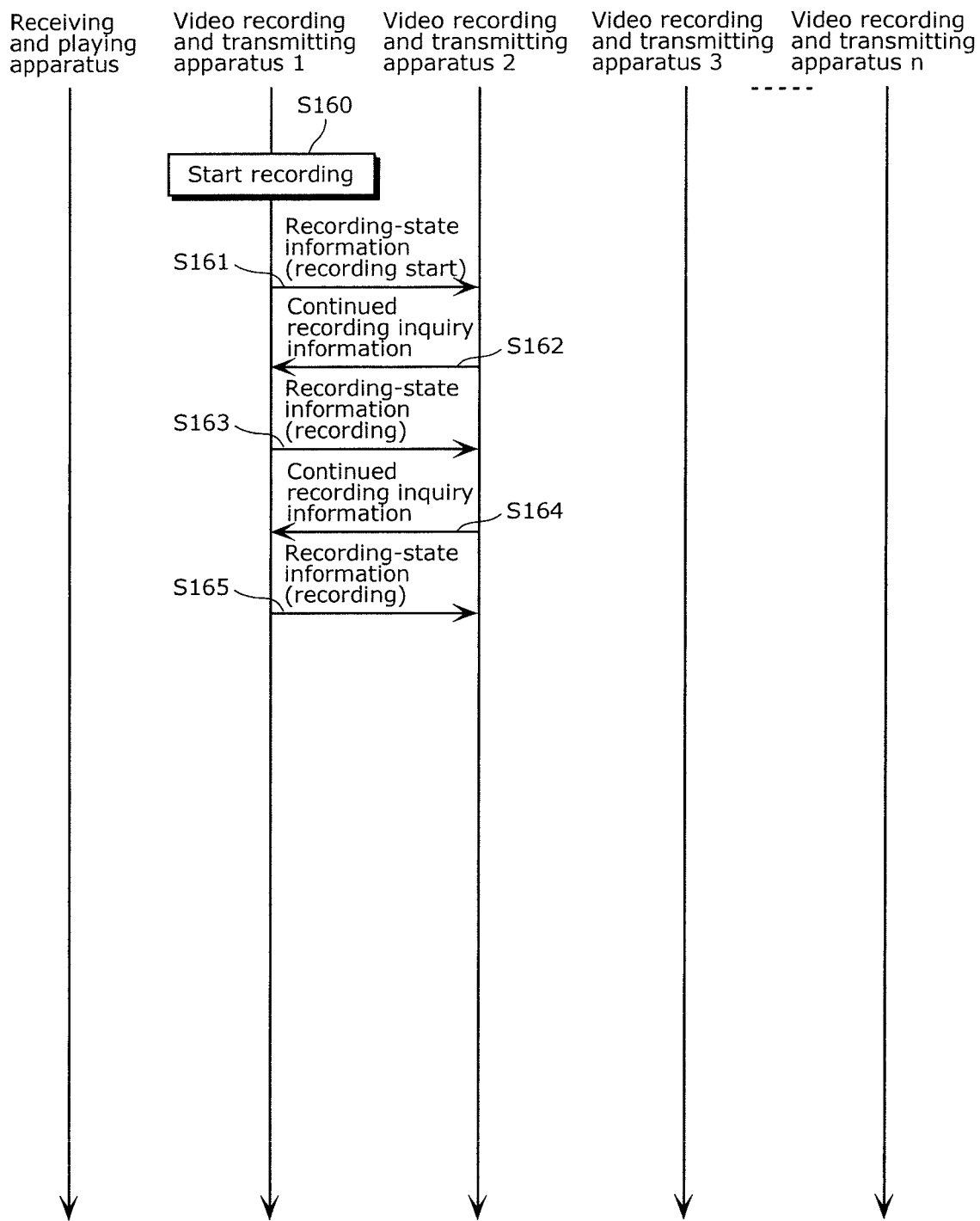
FIG. 59 illustrates a sequence diagram showing the polling performed after the video recording system starts recording.

FIG. 59 illustrates a sequence diagram showing the polling performed after the video recording system starts recording.

When the video recording and transmitting apparatus 1 that requests relay recording starts recording a service from a recording start time (S160), it transmits the recording-state information 2805 indicating the recording start to the video recording and transmitting apparatus 2 determined as the first-relay video recording and transmitting apparatus (S161). When the video recording and transmitting apparatus 2 receives the recording-state information 2805, it transmits the continued recording inquiry information 2804 to the video recording and transmitting apparatus 1 after a predetermined time since its reception (S162). Upon receipt of the continued recording inquiry information 2804, when the video recording and transmitting apparatus 1 is recording the service, it transmits the recording-state information 2805 indicating that the recording is being performed to the video recording and transmitting apparatus 2 (S163). Then, the video recording and transmitting apparatuses 1 and 2 repeatedly transmits and receives the continued recording inquiry information 2804 and the recording-state information 2805 (S164 and S165).

As such, the video recording and transmitting apparatus 2 monitors the recording state of the video recording and transmitting apparatus 1 by repeatedly transmitting the continued recording inquiry information 2804 to the video recording and transmitting apparatus 1 at predetermined intervals and receiving the continued recording inquiry information 2804. In other words, the recording state of the video recording and transmitting apparatus 1 is monitored through the polling.

Here, the timing when the video recording and transmitting apparatus 2 transmits the continued recording inquiry information 2804 is desired to be the timing when a recording position by the video recording and transmitting apparatus 1 corresponds to an interval between frames. The processes described above can prevent the transmission of the continued recording inquiry information 2804 from interrupting the recording by the video recording and transmitting apparatus 1.

Figure 60:
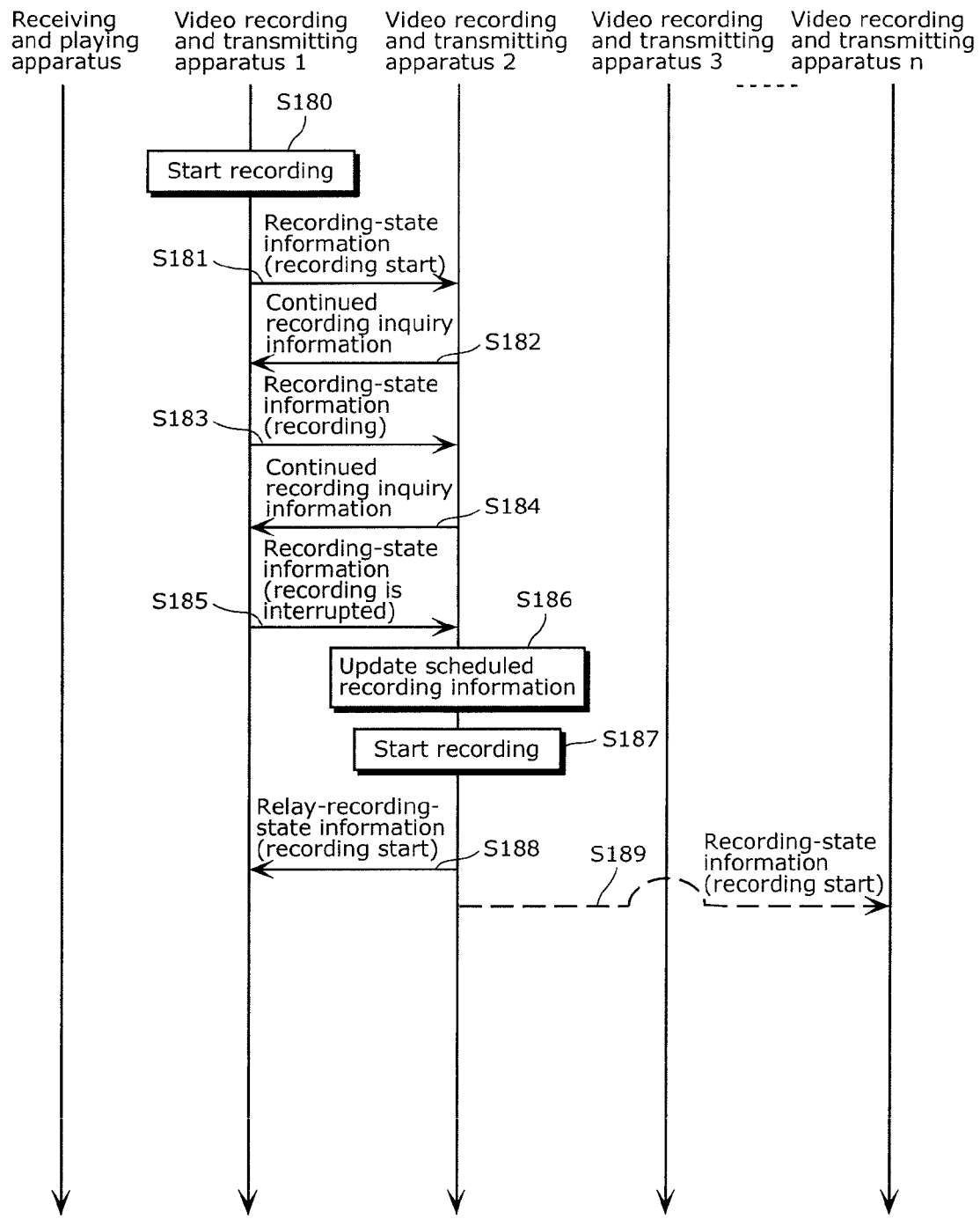
FIG. 60 illustrates a sequence diagram showing the operations of the video recording system when recording in the video recording and transmitting apparatus is interrupted.

FIG. 60 illustrates a sequence diagram showing the operations of the video recording system when recording in the video recording and transmitting apparatus 1 is interrupted.

When the video recording and transmitting apparatus 1 that requests relay recording starts recording a service from a recording start time as described above (S180), it transmits the recording-state information 2805 indicating the recording start to the video recording and transmitting apparatus 2 determined as the first-relay video recording and transmitting apparatus (S181). When the video recording and transmitting apparatus 2 receives the recording-state information 2805, it transmits the continued recording inquiry information 2804 to the video recording and transmitting apparatus 1 after a predetermined time since its reception (S182). Upon receipt of the continued recording inquiry information 2804, when the video recording and transmitting apparatus 1 is recording the service, it transmits the recording-state information 2805 indicating that the recording is being performed to the video recording and transmitting apparatus 2 (S183).

Then, the video recording and transmitting apparatus 2 receives the recording-state information 2805, and transmits the continued recording inquiry information 2804 again to the video recording and transmitting apparatus 1 after a predetermined time has passed since its transmission of the continued recording inquiry information 2804 in Step S182 (S184). Upon receipt of the continued recording inquiry information 2804, when the recording is interrupted, the video recording and transmitting apparatus 1 transmits the recording-state information 2805 indicating that the recording is interrupted to the video recording and transmitting apparatus 2 (S185). For example, the video recording and transmitting apparatus 1 suspends the recording when a tuner for use in the recording is used for receiving emergency information via the EAS. Furthermore, when the video recording and transmitting apparatus 1 is recording a service and the remaining capacity in a recording medium becomes equal to or smaller than a predetermined threshold, the video recording and transmitting apparatus 1 suspends the recording.

Upon receipt of the recording-state information 2805 indicating that the recording is suspended, the video recording and transmitting apparatus 2 updates the recording start time indicated by the scheduled recording information to a current time (S186), and starts recording the service according to the scheduled recording information (S187). Furthermore, the video recording and transmitting apparatus 2 transmits the relay-recording-state information 2806 indicating the recording start to the video recording and transmitting apparatus 1 (S188). Thus, even when the video recording and transmitting apparatus 1 returns to a recording possible state, it is possible to prevent the video recording and transmitting apparatus 1 from resuming the recording. Furthermore, when the video recording and transmitting apparatus n is determined as the second-relay video recording and transmitting apparatus, the video recording and transmitting apparatus 2 transmits the recording-state information 2805 indicating the recording start to the video recording and transmitting apparatus n (S189). Thereby, the video recording and transmitting apparatus n can start monitoring a recording state of the video recording and transmitting apparatus 2.

Figure 61:
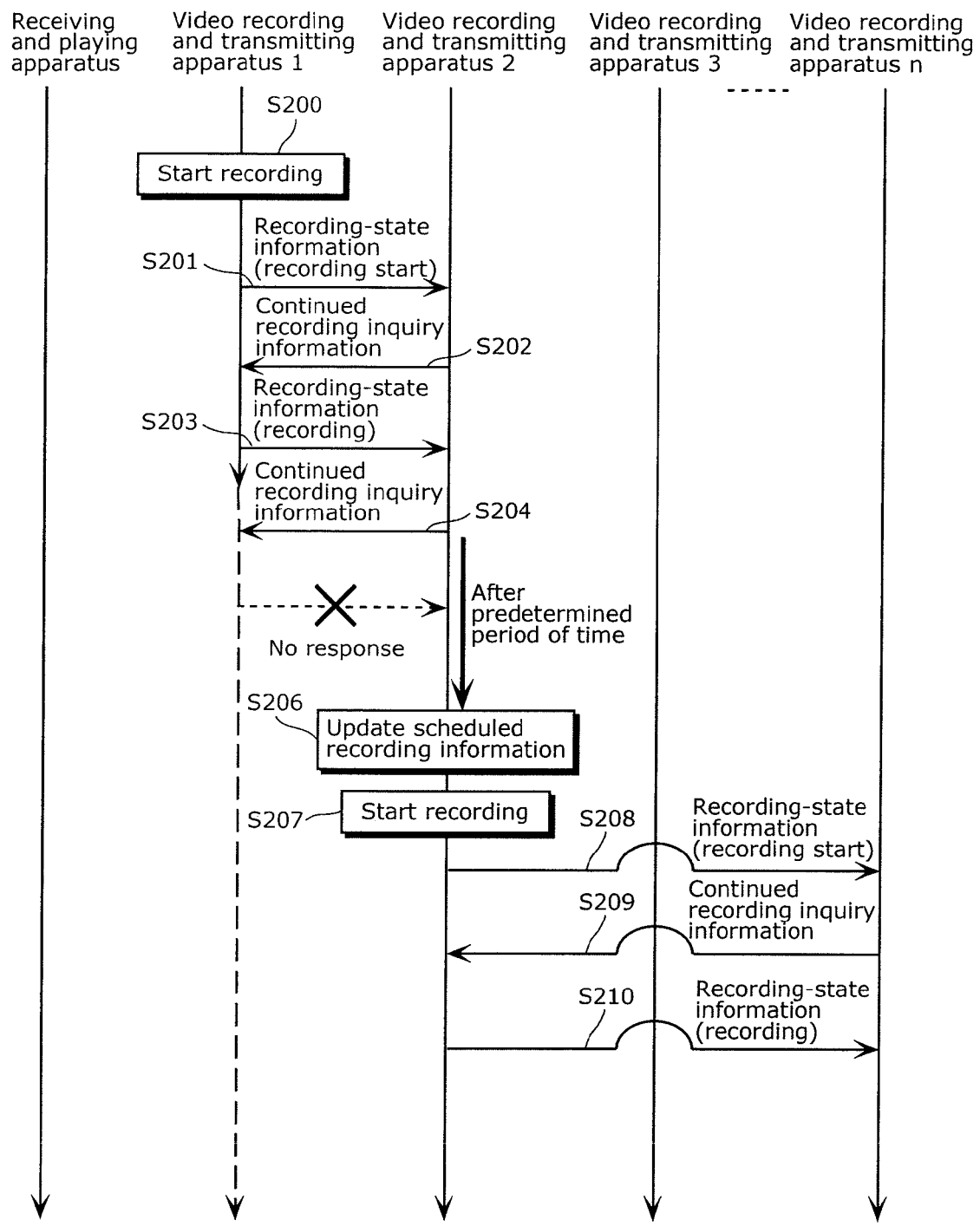
FIG. 61 illustrates a sequence diagram showing the operations of the video recording system in the case of power shutdown in the video recording and transmitting apparatus.

FIG. 61 illustrates a sequence diagram showing the operations of the video recording system in the case of power shutdown in the video recording and transmitting apparatus 1.

When the video recording and transmitting apparatus 1 that requests relay recording starts recording a service from a recording start time as described above (S200), it transmits the recording-state information 2805 indicating the recording start to the video recording and transmitting apparatus 2 determined as the first-relay video recording and transmitting apparatus (S201). When the video recording and transmitting apparatus 2 receives the recording-state information 2805, it transmits the continued recording inquiry information 2804 to the video recording and transmitting apparatus 1 after a predetermined time since its reception (S202). Upon receipt of the continued recording inquiry information 2804, when the video recording and transmitting apparatus 1 is recording the service, it transmits the recording-state information 2805 indicating that the recording is being performed to the video recording and transmitting apparatus 2 (S203).

Then, the video recording and transmitting apparatus 2 receives the recording-state information 2805, and transmits the continued recording inquiry information 2804 again to the video recording and transmitting apparatus 1 after a predetermined time has passed since its transmission of the continued recording inquiry information 2804 in Step S202 (S204). When the continued recording inquiry information 2804 is transmitted and power has already been shut down, the video recording and transmitting apparatus 1 cannot transmit the recording-state information 2805 to the video recording and transmitting apparatus 2 in response to the continued recording inquiry information 2804. In other words, the regular transmission of the recording-state information 2805 is suspended.

As a result, the video recording and transmitting apparatus 2 determines that the regular receipt of the recording-state information 2805 is suspended without receiving the recording-state information 2805, after a predetermined time has passed since the transmission of the continued recording inquiry information 2804 in Step S204. Furthermore, since the video recording and transmitting apparatus 2 determines that the recording in the video recording and transmitting apparatus 1 is interrupted, it updates the recording start time indicated by the scheduled recording information to a current time (S206), and starts recording the service according to the scheduled recording information (S207). Here, the predetermined time is set longer than a maximum value of a period of time between a time when the video recording and transmitting apparatus 2 transmits the continued recording inquiry information 2804 to the video recording and transmitting apparatus 1 and a time when the video recording and transmitting apparatus 2 receives the recording-state information 2805 from the video recording and transmitting apparatus 1, under a condition in which the power continues to be supplied to the video recording and transmitting apparatus 1.

Furthermore, the video recording and transmitting apparatus 2 transmits the recording-state information 2805 indicating the recording start to the video recording and transmitting apparatus n, when the video recording and transmitting apparatus n is determined as the second-relay video recording and transmitting apparatus (S208). Thereby, the video recording and transmitting apparatus n can start monitoring a recording state of the video recording and transmitting apparatus 2. In other words, the video recording and transmitting apparatus n starts the polling. More specifically, when the video recording and transmitting apparatus n receives the recording-state information 2805, it transmits the continued recording inquiry information 2804 to the video recording and transmitting apparatus 2 after a predetermined time since its reception (S209). Upon receipt of the continued recording inquiry information 2804, when the video recording and transmitting apparatus 2 is recording the service, it transmits the recording-state information 2805 indicating that the recording is being performed to the video recording and transmitting apparatus n (S210).

Thus, even when recording a content (service) in the video recording and transmitting apparatus 1 is interrupted due to the power shutdown, the video recording and transmitting apparatus 2 can continue to record the content in replacement of the video recording and transmitting apparatus 1, thus enabling recording the content for certain.

Although the video recording and transmitting apparatus 2 starts recording the content after a predetermined time since its transmission of the continued recording inquiry information 2804 in the aforementioned example, it may operate to record the content only during a period of time since its transmission each time it receives the continued recording inquiry information 2804. Furthermore, the video recording and transmitting apparatus 2 may delete recorded contents (services) each time it receives recording-state information indicating that recording is being performed. Thereby, relay recording is possible without any interval by preventing a state where the content cannot be recorded during the predetermined period of time. Furthermore, although the video recording and transmitting apparatus 1 transmits the recording-state information 2805 at regular intervals, as long as the recording-state information 2805 is information or a signal that can prove that the video recording and transmitting apparatus 1 is turned on, the video recording and transmitting apparatus may transmit any information or signal other than the recording-state information 2805. Furthermore, when transmitting a signal different from the recording-state information 2805, as long as the transmission is continuous, the video recording and transmitting apparatus 1 may successively (regularly) transmit the signal as the recording-state information 2805, and may always transmit such signal.

Figure 62:
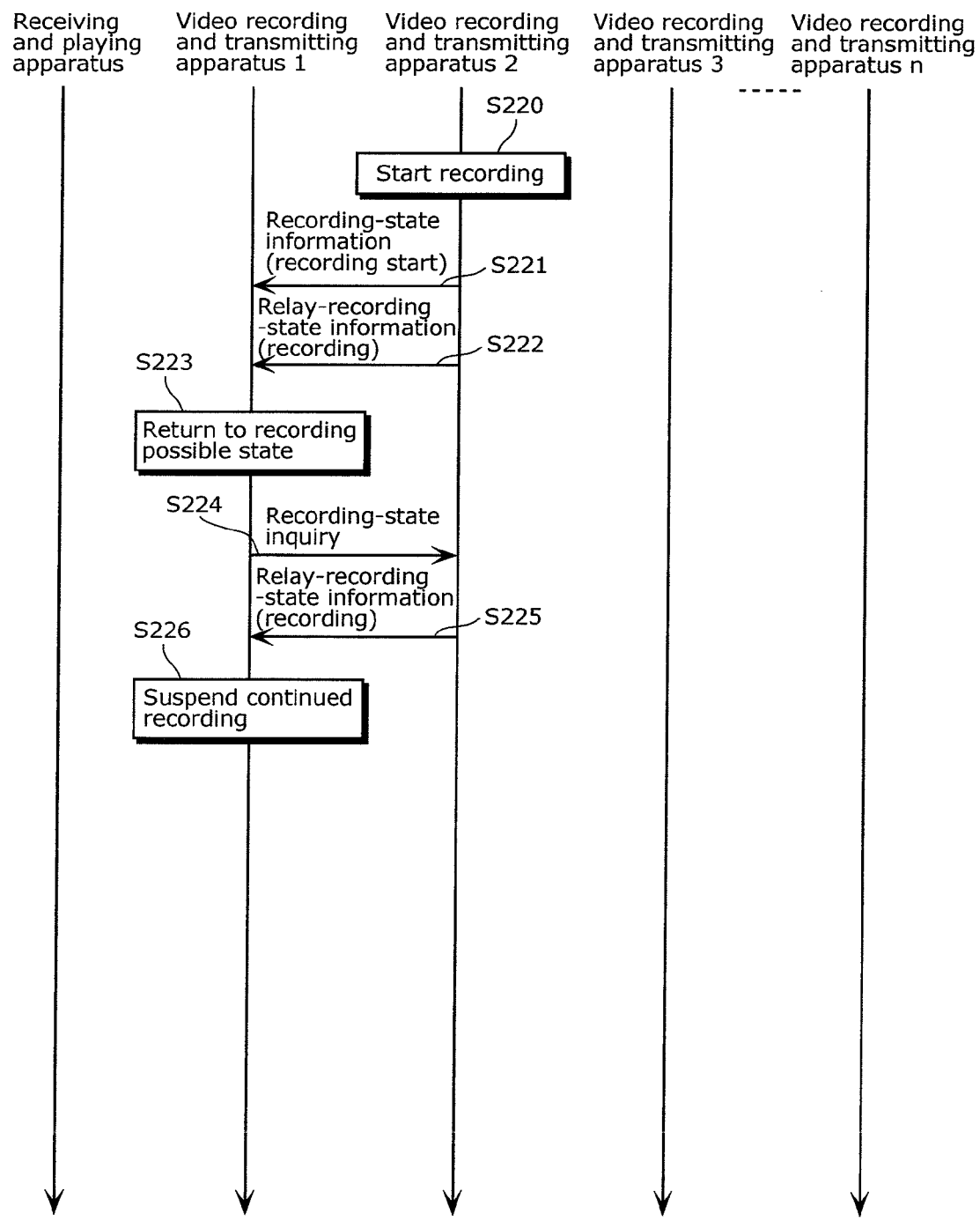
FIG. 62 illustrates a sequence diagram showing the operations of the video recording system when the video recording and transmitting apparatus returns from a recording impossible state to a recording possible state.

FIG. 62 illustrates a sequence diagram showing the operations of the video recording system when the video recording and transmitting apparatus 1 returns from a recording impossible state to a recording possible state.

When the video recording and transmitting apparatus 2 starts recording a service in replacement of the video recording and transmitting apparatus 1 (S220), it transmits the recording-state information 2805 indicating the recording start to the video recording and transmitting apparatus 1 that has requested the relay recording (S221). After a predetermined time, the video recording and transmitting apparatus 2 transmits the relay-recording-state information 2806 indicating the recording is being performed to the video recording and transmitting apparatus 1 (S222).

Then, when the video recording and transmitting apparatus 1 returns from a recording impossible state to a recording possible state (S223), it inquires of the video recording and transmitting apparatus 2 about the recording state (S224). Upon receipt of the inquiry of the recording state, the video recording and transmitting apparatus 2 transmits the relay-recording-state information 2806 indicating the recording is being performed to the video recording and transmitting apparatus 1.

When the video recording and transmitting apparatus 1 receives the relay-recording-state information 2806 from the video recording and transmitting apparatus 2, it determines that the video recording and transmitting apparatus 2 records the service in replacement of the video recording and transmitting apparatus 1, and suspends the continued recording (S226). In other words, even when the video recording and transmitting apparatus 1 returns to a recording possible state, it assigns the task of recording to the video recording and transmitting apparatus 2.

Here, when the video recording and transmitting apparatus 1 returns to the recording possible state, it may suspend the recording by the video recording and transmitting apparatus 2 and resume the recording. Furthermore, the video recording and transmitting apparatus 1 may allow the user to select whether or not to resume the recording or to select whether or not to resume the recording beforehand, when the video recording and transmitting apparatus 1 returns to the recording possible state.

Furthermore, although the video recording and transmitting apparatus 2 monitors the recording state of the video recording and transmitting apparatus 1 by polling, it may monitor the recording state by registering a listener with the video recording and transmitting apparatus 1.

Figure 63:
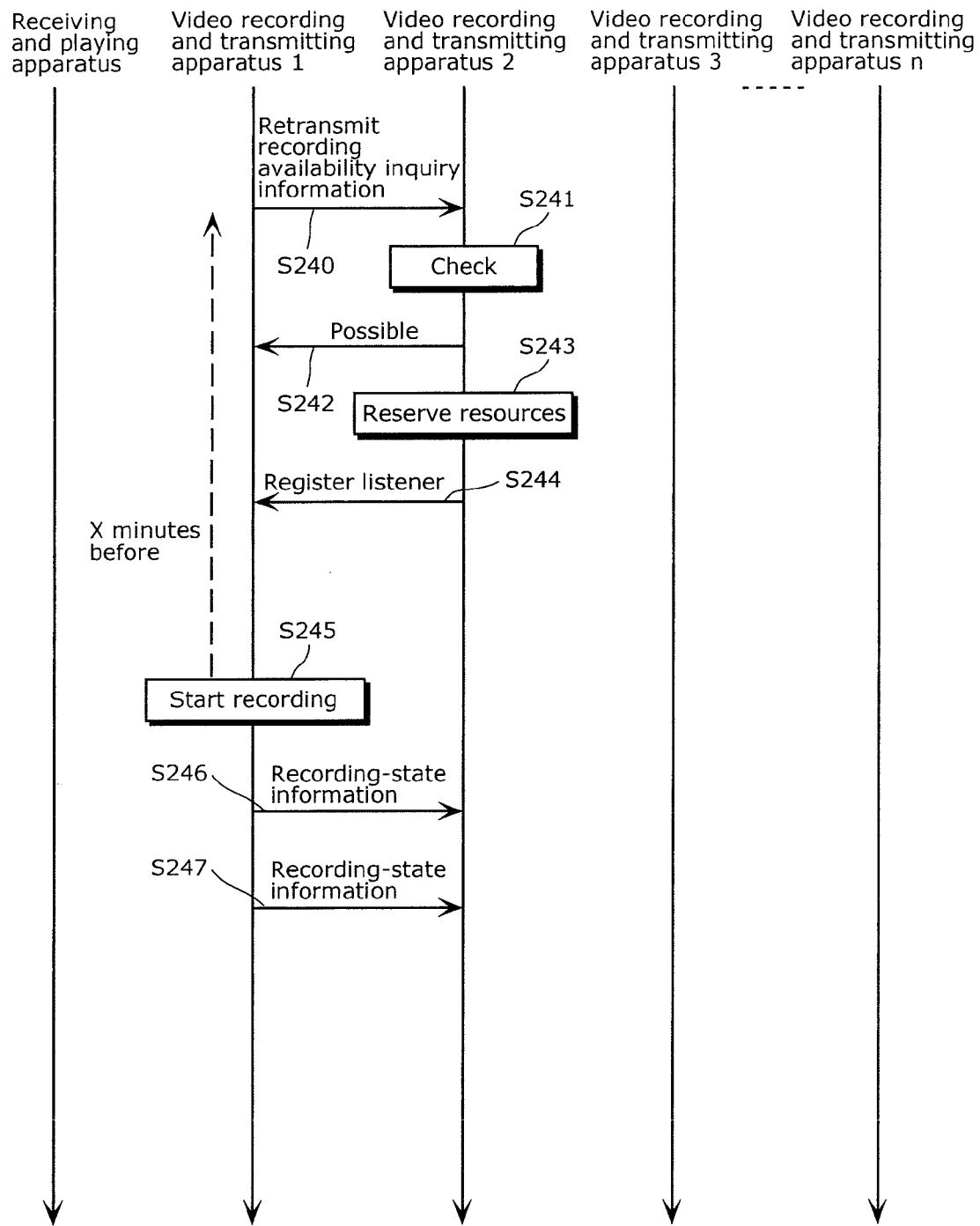
FIG. 63 illustrates a sequence diagram showing the operations of the video recording system when the listener is registered.

FIG. 63 illustrates a sequence diagram showing the operations of the video recording system when the listener is registered.

The video recording and transmitting apparatus 1 that requests relay recording retransmits the video-recording availability inquiry information 2801 to the video recording and transmitting apparatus 2 to check whether or not the video recording and transmitting apparatus 2 that has been temporarily determined as the first-relay video recording and transmitting apparatus can perform relay recording x minutes before the recording start time (S240). Upon receipt of the video-recording availability inquiry information 2801, the video recording and transmitting apparatus 2 checks whether or not the replay recording is possible (S241), and transmits the video-recording availability response information 2802 indicating a result of the check to the video recording and transmitting apparatus 1 (S242). For example, the video recording and transmitting apparatus 2 checks that the relay recording is possible, and transmits the video-recording availability response information 2802 indicating that the recording is possible to the video recording and transmitting apparatus 1. Thereby, the video recording and transmitting apparatus 2 is formally determined as the first-relay video recording and transmitting apparatus, and formally reserves the resources that have been temporarily reserved (S243).

Next, the video recording and transmitting apparatus 2 registers a listener with the video recording and transmitting apparatus 1, for example, using the UPnP specification (S244). Since the address of the video recording and transmitting apparatus 2 and other information are set in the listener, the video recording and transmitting apparatus 1 in which the listener is registered can transmit the recording-state information 2805 to the video recording and transmitting apparatus 2 at regular intervals without receiving the continued recording inquiry information 2804 from the video recording and transmitting apparatus 2. Here, the video recording and transmitting apparatuses 1 and 2 may uniquely define a listener that can communicate with each other so that the video recording and transmitting apparatus 2 can transmit the recording-state information 2805 to the video recording and transmitting apparatus 1 using the listeners.

As a result, when the video recording and transmitting apparatus 1 starts recording from a recording start time (S245), it repeatedly transmits the recording-state information 2805 indicating a recording state at a point in time to the video recording and transmitting apparatus 2 (S246 and S247).

Thereby, the video recording and transmitting apparatus 2 can monitor the recording state of the video recording and transmitting apparatus 1 without transmitting the continued recording inquiry information 2804 to the video recording and transmitting apparatus 1 at regular intervals.

Figure 64:
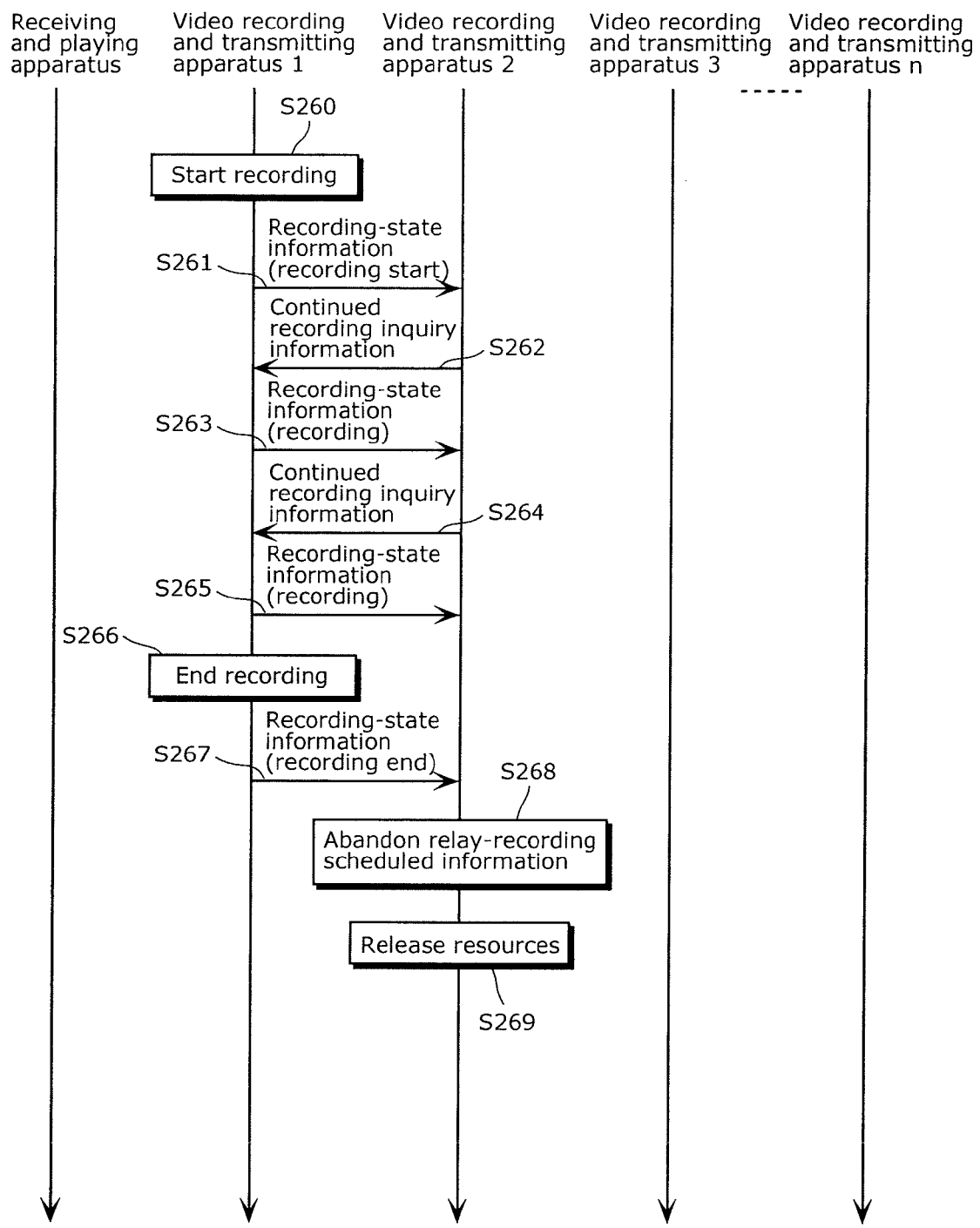
FIG. 64 illustrates a sequence diagram showing the operations of the video recording system when the video recording and transmitting apparatus records a service to the recording end time.

FIG. 64 illustrates a sequence diagram showing the operations of the video recording system when the video recording and transmitting apparatus 1 records a service until the recording end time.

When the video recording and transmitting apparatus 1 that requests relay recording starts recording the service from a recording start time (S260), it transmits the recording-state information 2805 indicating the recording start to the video recording and transmitting apparatus 2 determined as the first-relay video recording and transmitting apparatus (S261). When the video recording and transmitting apparatus 2 receives the recording-state information 2805, it transmits the continued recording inquiry information 2804 to the video recording and transmitting apparatus 1 after a predetermined time since its reception (S262). Upon receipt of the continued recording inquiry information 2804, when the video recording and transmitting apparatus 1 is recording the service, it transmits the recording-state information 2805 indicating that the recording is being performed to the video recording and transmitting apparatus 2 (S263). Then, the video recording and transmitting apparatuses 1 and 2 repeatedly transmit and receive the continued recording inquiry information 2804 and the recording-state information 2805 (S264 and S265).

When the video recording and transmitting apparatus 1 ends the recording at a recording end time (S266), it transmits the recording-state information 2805 indicating the recording end to the video recording and transmitting apparatus 2 (S267). When the video recording and transmitting apparatus 2 receives the recording-state information 2805, it abandons relay-recording scheduled information that has been registered (S268), and releases the resources that have been temporarily reserved (S269). Here, the video recording and transmitting apparatus 2 may abandon relay-recording scheduled information when a current time reaches the recording end time indicated by the relay-recording scheduled information, regardless of the receipt of the recording-state information 2805.

Figure 65:
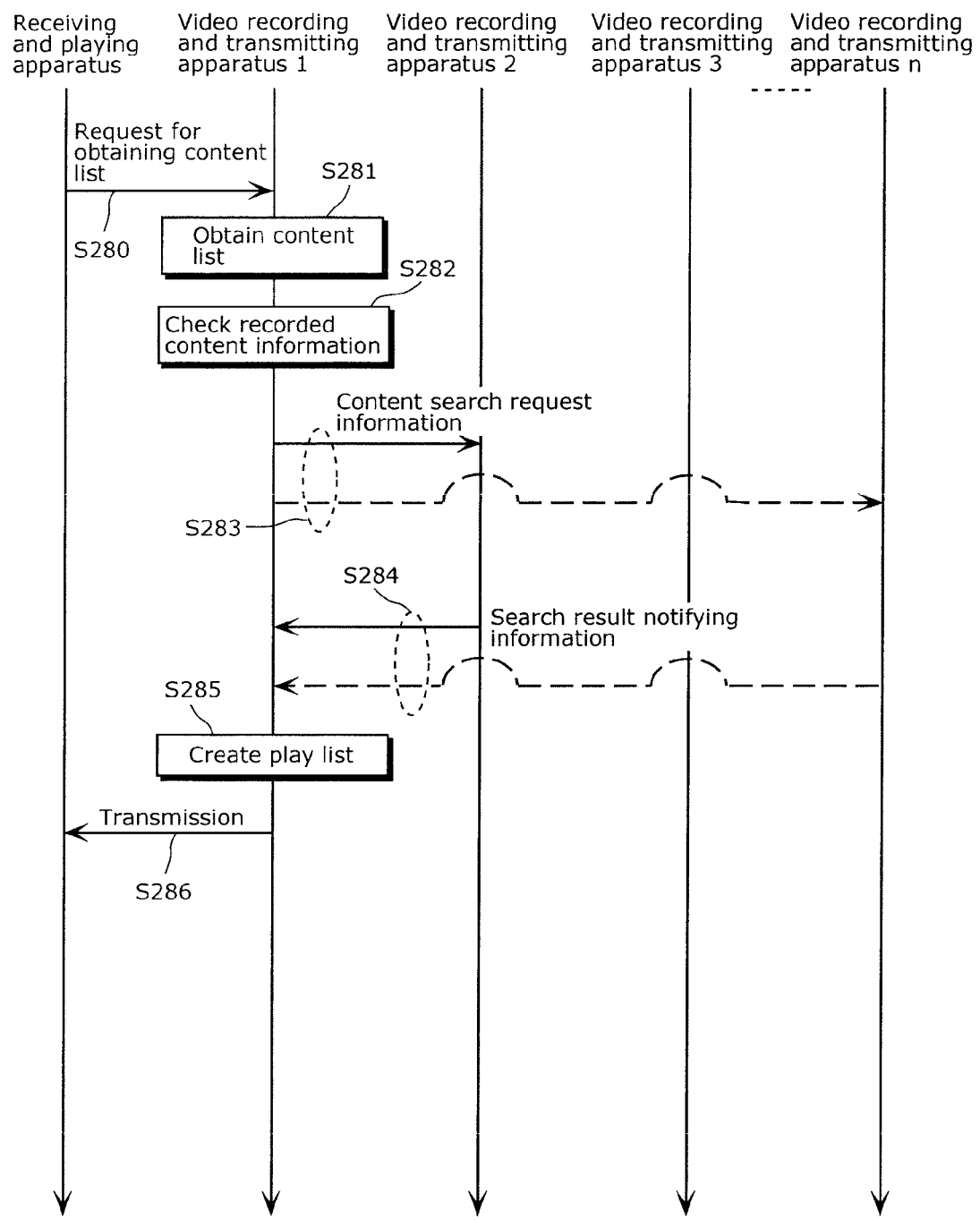
FIG. 65 illustrates a sequence diagram showing the operations of the video recording system when the receiving and playing apparatus obtains a content list.

FIG. 65 illustrates a sequence diagram showing the operations of the video recording system when the receiving and playing apparatus 101 obtains a content list.

First, the receiving and playing apparatus 101 transmits a request for obtaining a content list to the video recording and transmitting apparatus 1 (S280). Thereby, the video recording and transmitting apparatus 1 obtains the content list (a recording information management table or a recorded service list) within the video recording and transmitting apparatus 1 (S281), and checks the recorded content information included in the content list (S282). For example, the recorded content information is associated with division recording information, and the division recording information indicates that the content is divided into sections some of which are recorded by the video recording and transmitting apparatus 2 (and the video recording and transmitting apparatus n). In this case, the video recording and transmitting apparatus 1 transmits content search request information to the video recording and transmitting apparatus 2 (and the video recording and transmitting apparatus n) identified based on the recorded content information (S283). When the video recording and transmitting apparatus 2 that has received the content search request information (and the video recording and transmitting apparatus n) has recorded a content corresponding to the content search request information, it transmits the recorded content information of the content and the terminal ID of its own terminal as search result notifying information to the video recording and transmitting apparatus 1 (S284).

The video recording and transmitting apparatus 1 creates a relay recording play list based on the search result notifying information received from the video recording and transmitting apparatus 2 (and the video recording and transmitting apparatus n) (S285), and transmits the content list including the relay recording play list to the receiving and playing apparatus 101 (S286).

Figure 66:
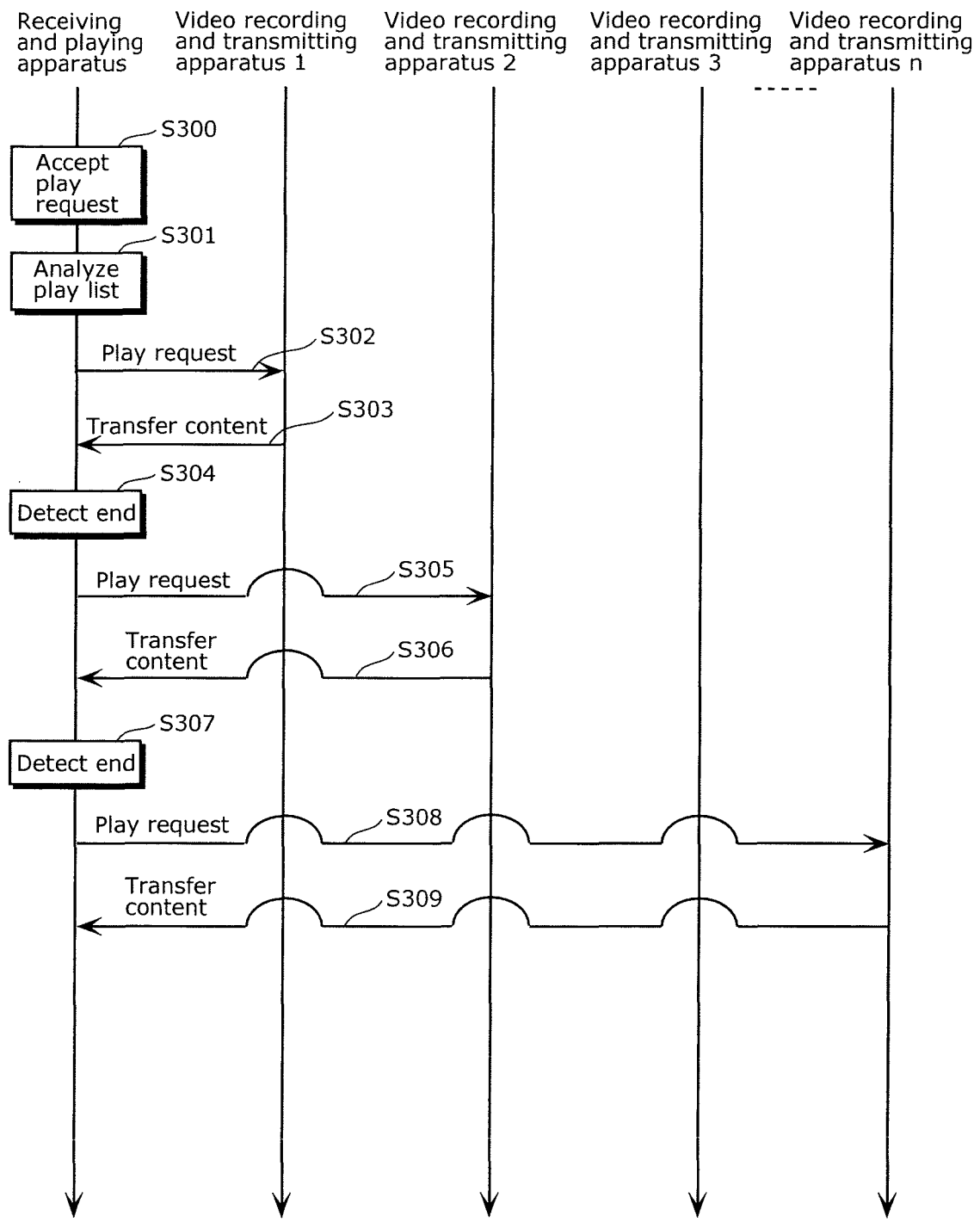
FIG. 66 illustrates a sequence diagram showing the operations of the video recording system when the receiving and playing apparatus plays a content.

FIG. 66 illustrates a sequence diagram showing the operations of the video recording system when the receiving and playing apparatus 101 plays a content.

The receiving and playing apparatus 101 accepts a play request from the user (S300), and analyzes a relay recording play list corresponding to the request (S301). As a result, the receiving and playing apparatus 101 transmits the play request to the video recording and transmitting apparatus 1 holding an initial part of the content (S302). The video recording and transmitting apparatus 1 that has received the play request transfers the content corresponding to the play request (S303).

While playing the content transferred from the video recording and transmitting apparatus 1, the receiving and playing apparatus 101 detects the end of the content (S304). Then, the receiving and playing apparatus 101 transmits a play request to the video recording and transmitting apparatus 2 holding the next part of the content (S305). The video recording and transmitting apparatus 2 that has received the play request transfers the content corresponding to the play request (S306).

Furthermore, while playing the content transferred from the video recording and transmitting apparatus 2, the receiving and playing apparatus 101 detects the end of the content (S307). Then, the receiving and playing apparatus 101 transmits a play request to the video recording and transmitting apparatus n holding the next part of the content (S308). The video recording and transmitting apparatus n that has received the play request transfers the content corresponding to the play request (S309).

Here, the receiving and playing apparatus 101 detects a point in time when the content ends by analyzing the relay recording play list, in other words, by obtaining the recorded-service information (recorded content information) based on the addresses and record identifiers described in the relay recording play list. Furthermore, the receiving and playing apparatus 101 may transmit a play request to a video recording and transmitting apparatus several minutes before the end of a content. Thereby, the divided content can be played seamlessly.

FIG. 67 illustrates a sequence diagram showing the operations of the video recording system when the receiving and playing apparatus 101 performs trick play of a content.

The receiving and playing apparatus 101 accepts a request for performing trick play (such as rewinding play) from the user (S320), and analyzes the relay recording play list corresponding to the request (S321). When normal play has been performed before the trick play and the relay recording play list has already been analyzed, the receiving and playing apparatus 101 uses a result of the analysis held in the memory without reanalyzing the relay recording play list in Step S321.

Next, the receiving and playing apparatus 101 calculates a play position of the content (S322), and transmits a play request to the video recording and transmitting apparatus n holding a part corresponding to the play position (S323). The video recording and transmitting apparatus n that has received the play request transfers a content corresponding to the play request (S324).

While playing the content transferred from the video recording and transmitting apparatus n, the receiving and playing apparatus 101 detects the end of the content (S325). Then, the receiving and playing apparatus 101 transmits a play request to the video recording and transmitting apparatus 1 holding a forward part of the content (S326). The video recording and transmitting apparatus n that has received the play request transfers a content corresponding to the play request (S327).

When a recording operation in one video recording apparatus present in a home network environment is interrupted for some reasons, another video recording apparatus takes over the recording so that the recording can be resumed in a shorter period of interruption time according to Embodiment. Furthermore, even when power in a video recording apparatus that is recording a content is shut down, another video recording apparatus on the network 104 can take over the recording. Furthermore, when a recorded content is divided into sections, and the sections are respectively stored by video recording apparatuses, the content can be played as if the divided sections were one single content without any interval in between. Furthermore, trick play in playing the content (forwarding, rewinding, skip, and other modes) can also be supported. Furthermore, copying and moving a recorded content that is stored with such division enables the divided sections to be easily restored as one content.

(Variations)

Although the present invention is described hereinbefore based on Embodiment, the present invention is not limited to Embodiment. The present invention includes the following cases.

(1) In Embodiment, the video recording and transmitting apparatus 102*a* generates play list information obtained as a result of relay recording. Then, the receiving and playing apparatus 101 receives the play list information from the video recording and transmitting apparatus 102*a*, identifies a video recording and transmitting apparatus having data necessary for playing a content by analyzing the play list information, requests the identified video recording and transmitting apparatus to transmit the data, and plays the content by receiving the data. However, when the video recording and transmitting apparatus 102*a* performs relay recording, it may designate a Uniformed Resource Identifier (URI) to be accessed as one content. When the receiving and playing apparatus 101 accesses the URI, the video recording and transmitting apparatus 102*a* may analyze play list information, identify a video recording and transmitting apparatus having necessary data so as to receive the necessary data from the identified video recording and transmitting apparatus, and transmit the received data to the receiving and playing apparatus 101.

According to the variation in (1), the receiving and playing apparatus 101 can play a content even at the time of relay recording with the processing solely by the video recording and transmitting apparatus 102*a*. In other words, the receiving and playing apparatus 101 performs the same processing regardless whether or not the video recording and transmitting apparatus 102*a* has all data. Thus, the receiving and playing apparatus 101 can support the conventional configuration that includes a client terminal in accordance with the DLNA specification.

(2) In Embodiment, the video recording and transmitting apparatus 102*a* generates play list information obtained as a result of relay recording. Then, the receiving and playing apparatus 101 receives the play list information from the video recording and transmitting apparatus 102a, identifies a video recording and transmitting apparatus having data necessary for playing a content by analyzing the play list information, requests the identified video recording and transmitting apparatus to transmit the data, and plays the content by receiving the data. However, when the video recording and transmitting apparatus 102a performs relay recording, it may designate a URI to be accessed as one content to the receiving and playing apparatus 101. When the receiving and playing apparatus 101 accesses the URI, the video recording and transmitting apparatus 102a may analyze play list information, identify a URI for accessing the video recording and transmitting apparatus having necessary data and accessing the data itself, notify the receiving and playing apparatus 101 of the URI. Then, the receiving and playing apparatus 101 may access the notified URI, and may receive and play the data. Furthermore, the URI is notified unless the video recording and transmitting apparatus having necessary data is a video recording and transmitting apparatus 102a that receives an access request from the receiving and playing apparatus 101. When the video recording and transmitting apparatus having necessary data is a video recording and transmitting apparatus 102a, data may be transmitted to the receiving and playing apparatus 101.

As such, when HTTP is used as a data communication protocol, a URI may be notified from the video recording and transmitting apparatus 102a to the receiving and playing apparatus 101, subsequently, data transmission is requested from the receiving and playing apparatus 101, and the requested data is received, using a "307 Temporary Redirect" response as a response for an HTTP-GET request. In other words, the receiving and playing apparatus 101 issues an HTTP-GET request to the video recording and transmitting apparatus 102a, and then, the video recording and transmitting apparatus 102a returns a "307 Temporary Redirect" response including a URI to be notified to a header "Location" in response to the request. The receiving and playing apparatus 101 that has received the response reads the URI from the header "Location", and transmits an HTTP-GET request again to the URI. Here, when the video recording and transmitting apparatus ends the transmission of data stored therein to the end, it notifies the video recording and transmitting apparatus of the end of the data transmission. The end of the data transmission may be notified by cutting off the connection that performs data communication in HTTP. Alternatively, when data is transferred using the Chunked Transfer Coding defined in the HTTP specification, the end of the data transmission may be notified by transmitting a chunk having a size zero. Furthermore, a data size of data to be transferred and a data amount of data to be transmitted by a context-length header may be transmitted to a client terminal as a response to the HTTP-GET request. Furthermore, a data range of data to be transmitted may be notified using a Content-Range header. The aforementioned information may be used for a method for detecting an end of data transmission by the receiving and playing apparatus 101. For more details, the HTTP specification (RFC2616) should be referred to.

Furthermore, when the URI is notified, the video recording and transmitting apparatus 102a may notify the receiving and playing apparatus 101 of a start point of necessary data or the range of the data, out of the data to be referenced to by the URI. For example, when performing trick play, there are cases where a part of data to be referenced to by the URI is necessary. In this case, the video recording and transmitting apparatus 102a may identify a start point of necessary data or the range of the data with reference to play list information and recorded content information and notify the receiving and playing apparatus 101 of such information. The start point or the range may be a byte position having 0 as a header of the data, and play time information having 0 as a header of the data. When HTTP is used as a data communication protocol, such information may be notified by adding a separate header to the "307 Temporary Redirect" response.

Furthermore, when the Real-time Transport Protocol (RTP) and the Real-Time Streaming Protocol (RTSP) are used as data communication protocols, the URI may be notified by transmitting a REDIRECT method from a server to a client terminal. For more details, the RTSP specification (RFC2326) should be referred to.

According to the variation in (2), the receiving and playing apparatus 101 has only to follow an instruction from the video recording and transmitting apparatus 102a so that the receiving and playing apparatus 101 can play a content even at the time of relay recording with the processing by the video recording and transmitting apparatus 102a. Thus, the present invention has an advantage of simplifying the configuration of the receiving and playing apparatus 101. In the variation (1), a video recording and transmitting apparatus having data transfers the data to the video recording and transmitting apparatus 102a, and further the video recording and transmitting apparatus 102a transfers the same data to the receiving and playing apparatus 101. Thus, compared to the variation (2), these operations in the variation (1) consume double the network bandwidth. In contrast, since the video recording and transmitting apparatus having data directly transfers the data to the receiving and playing apparatus 101, the variation (2) has an advantage of suppressing the increasing network bandwidth consumption.

(3) The video recording and transmitting apparatus 102a generates play list information obtained as a result of relay recording. Then, the receiving and playing apparatus 101 receives the play list information from the video recording and transmitting apparatus 102a, identifies a video recording and transmitting apparatus having data necessary for playing a content by analyzing the play list information, requests the identified video recording and transmitting apparatus to transmit the data, and plays the content by receiving the data in Embodiment. However, after the recording in a video recording and transmitting apparatus that requests the relay recording ends, the video recording and transmitting apparatus 102a may receive the recorded data from the video recording and transmitting apparatus and store the data. Then, the data in the video recording and transmitting apparatus may be deleted.

(4) The present invention may be implemented as a method for use in the video recording and transmitting apparatus and the receiving and playing apparatus. Furthermore, the method may be a computer program and a digital signal including the computer program.

Furthermore, the video recording and transmitting apparatus and the receiving and playing apparatus according to the present invention may also be realized by storing the computer program and the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention may also include the computer program and the digital signal recorded in these recording media.

Furthermore, the video recording and transmitting apparatus and the receiving and playing apparatus according to the present invention may also be realized by the transmission of the aforementioned computer program or the digital signal via a telecommunication line, a wireless or wired communication line, a network represented by the Internet, a data broadcast and so on.

Furthermore, the video recording and transmitting apparatus and the receiving and playing apparatus according to the present invention may also be a computer system including a microprocessor and a memory, in which the memory may store the aforementioned computer program and the microprocessor may operate according to the computer program.

Furthermore, by transferring the program or the digital signal by recording onto the aforementioned recording media, or by transferring the program or digital signal via the aforementioned network, execution using another independent computer system may also be made possible.

Accordingly, arbitrary combination of the aforementioned modifications and embodiment may be included within the scope of this invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The video recording system, the video recording apparatus, and the video recording method according to the present invention are applicable for the consumer appliance industry relating to apparatuses that records broadcast contents. The present invention is applicable, for example, as a cable Set Top Box (STB) and a digital TV. Furthermore, the present invention is applicable to a terminal having a function of receiving broadcast contents, such as a cellular phone.

What is claimed is:

1. A video recording system for recording a content that has been broadcasted or distributed, said video recording system comprising:
a first video recording apparatus and a second video recording apparatus that are connected to each other via a network,
said first video recording apparatus including:
a recording registrar configured to accept scheduled recording information indicating a period of time during which the content is to be recorded;
a first recording controller configured to start recording the content when the period of time indicated by the scheduled recording information starts;
a scheduled information transmitter configured to transmit relay-recording scheduled information to said second video recording apparatus, the relay-recording scheduled information notifying said second video recording apparatus of the period of time indicated by the scheduled recording information; and
a signal transmitter configured to continue to transmit a signal to said second video recording apparatus during the period of time indicated by the scheduled recording information, the signal including recording state information of the first video recording apparatus and
said second video recording apparatus including:
a receiver configured to receive the relay-recording scheduled information and the signal, including the recording state information of the first video recording apparatus, that have been transmitted from said first video recording apparatus;
a partner-recording-state monitor configured to determine whether or not the recording by said first video recording apparatus is interrupted, based on the recording state information of the first video recording apparatus included in the signal, and whether or not said receiver continues to receive the signal for a predetermined time during a period of time indicated by the relay-recording scheduled information; and
a second recording controller configured to switch a state of said second video recording apparatus from a state in which the content is not recorded to a state in which the content is being recorded and start recording the content, to set only one of said first video recording apparatus and said second video recording apparatus to the state in which the content is being recorded, when said partner-recording-state monitor determines that the recording by said first video recording apparatus is interrupted.

2. The video recording system according to claim 1, wherein said first video recording apparatus further includes:
a first own recording state monitor configured to monitor a recording state of said first video recording apparatus, and
said signal transmitter is configured to continue to transmit the signal by transmitting, at regular intervals, recording-state information indicating the recording state identified through monitoring of said first own recording state monitor.

3. The video recording system according to claim 2, wherein said partner-recording-state monitor included in said second video recording apparatus is further configured to transmit continued recording inquiry information for inquiring the recording state of said first video recording apparatus to said first video recording apparatus at regular intervals, and
said signal transmitter included in said first video recording apparatus is configured to transmit the recording-state information each time said signal transmitter receives the continued recording inquiry information.

4. The video recording system according to claim 2, wherein said partner-recording-state monitor included in said second video recording apparatus is further configured to register a listener with said first video recording apparatus, the listener notifying said second video recording apparatus of the recording state of said first video recording apparatus, and
said signal transmitter included in said first video recording apparatus is configured to transmit the recording-state information at regular intervals using the listener.

5. The video recording system according to claim 2, further comprising:
a playing apparatus configured to play the content, said playing apparatus being connected to said first video recording apparatus and said second video recording apparatus via the network, said playing apparatus including:
a scheduled recorder configured to transmit the scheduled recording information to said first video recording apparatus;
a network controller configured, when the content is divided into a first section and a second section so that said first video recording apparatus records the first section and said second video recording apparatus records the second section, to request said first video recording apparatus to transfer the first section and request said second video recording apparatus to transfer the second section to obtain the divided content; and a service manager configured to play the divided content.

6. The video recording system according to claim 5, wherein said first video recording apparatus further includes:

a relay-recording content manager configured, when the content is divided into the first section and the second section so that said first video recording apparatus records the first section and said second video recording apparatus records the second section, to generate a list indicating information of the first and second sections of the divided content, and to transmit the list to said playing apparatus.

7. The video recording system according to claim 2, wherein said first video recording apparatus further includes:

a checker configured to transmit video-recording availability inquiry information to said second video recording apparatus, and to check whether or not said second video recording apparatus can record the content, based on a response from said second video recording apparatus to the recording availability inquiry information, the recording availability inquiry information inquiring whether or not the content can be recorded during the period of time indicated by the scheduled recording information, said second video recording apparatus further includes:

a relay-recording controller configured to determine whether or not said second recording controller can record the content during the period of time indicated by the scheduled recording information upon receipt of the recording availability inquiry information, and to transmit recording availability response information to said first video recording apparatus in response to the recording availability inquiry information, the recording availability response information indicating a result of the determination, and said scheduled information transmitter included in said first video recording apparatus is configured to transmit the relay-recording scheduled information to said second video recording apparatus when said checker determines that the content can be recorded.

8. The video recording system according to claim 7, wherein said checker included in said first video recording apparatus is configured to check whether or not the content can be recorded at a scheduled recording time when said recording registrar accepts the scheduled recording information, and at a pre-recording time that is after the scheduled recording time and before start of the period of time indicated by the scheduled recording information, said scheduled information transmitter is configured to transmit the relay-recording scheduled information in the case where said checker determines that the content can be recorded at the scheduled recording time, said second video recording apparatus further includes a recording device setter configured, when said receiver receives the relay-recording scheduled information, to temporarily reserve resources necessary for use in recording the content by setting a priority to the resources, and said recording device setter is configured to formally reserve the resources by giving a higher priority to the resources that have been temporarily reserved, when said checker included in said first video recording apparatus determines at the pre-recording time that the content can be recorded.

9. The video recording system according to claim 8, wherein said signal transmitter included in said first video recording apparatus is configured to transmit the recording-state information indicating that the recording is completed to said second recording apparatus in the case where said first own recording state monitor identifies a state in which the recording is completed when the period of time indicated by the scheduled recording information ends, and said recording device setter included in said second video recording apparatus is configured to release the resources that have been temporarily reserved, when said second video recording apparatus receives the recording-state information indicating that the recording is completed.

10. The video recording system according to claim 8, further comprising:

a third video recording apparatus connected to the network, wherein said scheduled information transmitter is configured to transmit the relay-recording scheduled information to said third video recording apparatus when said checker determines at the pre-recording time that the content cannot be recorded.

11. The video recording system according to claim 7, further comprising:

a third video recording apparatus connected to the network, wherein said checker included in said first video recording apparatus is further configured to transmit the recording availability inquiry information to said third video recording apparatus, and to check whether or not the content can be recorded based on a response from said third video recording apparatus to the recording availability inquiry information, and said scheduled information transmitter included in said first video recording apparatus is configured to transmit the relay-recording scheduled information to said second video recording apparatus when said checker determines that said third video recording apparatus cannot record the content and said second video recording apparatus can record the content.

12. The video recording system according to claim 2, further comprising:

a third video recording apparatus connected to the network, wherein said second video recording apparatus further includes:

a next-generation scheduled information transmitter configured to transmit the relay scheduled recording information to said third video recording apparatus;

a next-generation recording start information transmitter configured to transmit recording start information to said third video recording apparatus, the recording start information indicating that said second recording controller has started recording the content; and a next-generation signal transmitter configured to continue to transmit the signal to said third video recording apparatus during a period of time between a time when said second recording controller has started recording the content and a time when the period of time indicated by the relay scheduled recording information ends, and said third video recording apparatus including:
- a next-generation receiver configured to receive the relay-recording scheduled information and the signal that have been transmitted from said second video recording apparatus;
- a next-generation partner-recording-state monitor configured to determine whether or not said next-generation receiver has suspended the continued reception of the signal during a period of time between a time when said third video recording apparatus has received the recording start information and a time when the period of time indicated by the relay scheduled recording information ends; and
- a next-generation recording controller configured to start recording the content when said next-generation partner-recording-state monitor determines that said next-generation receiver has suspended the continued reception of the signal.

13. The video recording system according to claim 2,
wherein said signal transmitter included in said first video recording apparatus is configured to transmit the recording-state information indicating that the recording is interrupted to said second video recording apparatus, when said first own recording state monitor identifies a state in which the recording is interrupted, and
said second recording controller included in said second video recording apparatus is further configured to start recording the content when said second video recording apparatus receives the recording-state information indicating that the recording is interrupted.

14. The video recording system according to claim 13, wherein said second video recording apparatus further includes:
- a second own recording state monitor configured to monitor a recording state of said second recording controller; and
- a relay-recording controller configured to determine whether or not the recording state of said first video recording apparatus returns from a state being interrupted to a recording possible state based on the recording-state information transmitted from said signal transmitter included in said first video recording apparatus, and to transmit relay-recording-state information to said first video recording apparatus when the recording state returns to the recording possible state, the relay-recording-state information indicating that a state identified by said second own recording state monitor is a state being recorded.

15. The video recording system according to claim 2,
wherein said signal transmitter included in said first video recording apparatus is configured to transmit the recording-state information indicating that the recording is completed to said second video recording apparatus when said first own recording state monitor identifies a state in which the recording ends when the period of time indicated by the scheduled recording information ends, and
said second video recording apparatus further includes a relay-recording controller configured to abandon the relay-recording scheduled information received by said receiver when said second video recording apparatus receives the recording-state information indicating that the recording is completed.

16. The video recording system according to claim 1,
wherein the first video recording apparatus and the second video recording apparatus are each connected to a broadcast or distribution system that provides the content.

17. A method for recording a content that has been broadcasted or distributed using a first video recording apparatus and a second video recording apparatus that are connected to each other via a network, said method comprising:
in the first video recording apparatus:
- accepting scheduled recording information indicating a period of time during which the content is to be recorded;
- starting recording the content when the period of time indicated by the scheduled recording information starts;
- transmitting a signal, including recording state information of the first video recording apparatus, and relay-recording scheduled information to the second video recording apparatus, the relay-recording scheduled information notifying the second video recording apparatus of the period of time indicated by the scheduled recording information; and
- continuing to transmit the signal to the second video recording apparatus during the period of time indicated by the scheduled recording information; and in the second video recording apparatus:
- receiving the relay-recording scheduled information and the signal, including the recording state information of the first video recording apparatus, that have been transmitted from the first video recording apparatus;
- determining whether or not the recording by the first video recording apparatus is interrupted, based on the recording state information of the first video recording apparatus including in the signal, and whether or not the signal continues to be received for a predetermined time during a period of time indicated by the relay-recording scheduled information; and
- switching a state of the second video recording apparatus from a state in which the content is not recorded to a state in which the content is being recorded and start recording the content, to set only one of said first video recording apparatus and the second video recording apparatus to the state in which the content is being recorded when it is determined in said determining that the recording by said first video recording apparatus is interrupted.

18. A video recording apparatus in a video recording system for recording a content that has been broadcasted or distributed, the video recording system including said video recording apparatus and an other video recording apparatus that are connected to each other via a network, the other video recording apparatus:
- accepting scheduled recording information indicating a period of time during which the content is to be recorded;
- starting recording the content when the period of time indicated by the scheduled recording information starts;
- transmitting a signal, including recording state information of the video apparatus, and relay-recording scheduled information to said video recording apparatus, the relay-recording scheduled information notifying said video recording apparatus of the period of time indicated by the scheduled recording information; and
- continuing to transmit the signal to said video recording apparatus during the period of time indicated by the scheduled recording information, said video recording apparatus comprising:
- a receiver configured to receive the relay-recording scheduled information and the signal, including the recording state information of the video recording apparatus, that have been transmitted from the other video recording apparatus;
- a partner-recording-state monitor configured to determine whether or not the recording by the other video recording apparatus is interrupted, based on the recording state information of the video recording apparatus including in the signal, and whether or not said receiver continues to receive the signal for a predetermined time during a period of time indicated by the relay-recording scheduled information; and
- a recording controller configured to switch a state of the video recording apparatus from a state in which the content is not recorded to a state in which the content is being recorded and start recording the content, to set only one of the video recording apparatus and the other video recording apparatus to the state in which the content is being recorded, when said partner-recording-state monitor determines that the recording by said first video recording apparatus is interrupted.

19. The video recording apparatus according to claim 18, further comprising:
- a next-generation scheduled information transmitter configured to transmit the relay scheduled recording information to still an other video recording apparatus which is connected to the network and different from the other video recording apparatus;
- a next-generation recording start information transmitter configured to transmit recording start information to still the other video recording apparatus, the recording start information indicating that said recording controller has started recording the content; and
- a next-generation signal transmitter configured to continue to transmit the signal to still the other video recording apparatus during a period of time between a time when said recording controller starts recording the content and a time when the period of time indicated by the relay scheduled recording information ends.

* * * * *